United States Patent
Bi

(10) Patent No.: US 11,470,153 B2
(45) Date of Patent: Oct. 11, 2022

(54) PHOTO SHARING METHOD AND ELECTRONIC DEVICE

(71) Applicant: Huawei Technologies Co., Ltd., Shenzhen (CN)

(72) Inventor: Sheng Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 17/268,415

(22) PCT Filed: Aug. 13, 2018

(86) PCT No.: PCT/CN2018/100304
§ 371 (c)(1),
(2) Date: Feb. 12, 2021

(87) PCT Pub. No.: WO2020/034075
PCT Pub. Date: Feb. 20, 2020

(65) Prior Publication Data
US 2021/0320974 A1 Oct. 14, 2021

(51) Int. Cl.
*H04L 67/1095* (2022.01)
*G06F 16/178* (2019.01)
(Continued)

(52) U.S. Cl.
CPC ........ *H04L 67/1095* (2013.01); *G06F 3/0488* (2013.01); *G06F 16/178* (2019.01);
(Continued)

(58) Field of Classification Search
CPC . H04L 67/1095; H04L 65/403; G06F 3/0488; G06Q 10/1095
See application file for complete search history.

(56) References Cited

U.S. PATENT DOCUMENTS 8,943,140 B1 * 1/2015 Kothari .............. G06Q 10/1095
709/219
2010/0211863 A1 8/2010 Jones et al.
(Continued)

FOREIGN PATENT DOCUMENTS

CN 1531700 A 9/2004
CN 101039250 A 9/2007
(Continued)

OTHER PUBLICATIONS

ITU-T, "Series H: Audiovisual and Multimedia Systems Infrastructure of audiovisual services—Coding of moving video, Advanced video coding for generic audiovisual services", Recommendation ITU-T H.264, ITU-T, Telecommunication Standardization Sector of ITU, H.264, Apr. 2017, 812 Pages.

*Primary Examiner* — Barbara B Anyan
(74) *Attorney, Agent, or Firm* — Slater Matsil, LLP

(57) ABSTRACT

A method includes: When a first electronic device does not initiate synchronization with a second electronic device, the first electronic device detects a first operation of a user. In response to the first operation, the first electronic device adds first photo information to a first shared album of the first electronic device. When the first electronic device initiates synchronization with the second electronic device, the first electronic device sends, to the second electronic device, a first request message for adding the first photo information. In this way, after receiving a first request response message that is sent by the second electronic
(Continued)

device and that is used for refusing to add the first photo information, the first electronic device deletes the first photo information from the first shared album.

20 Claims, 66 Drawing Sheets

(51) Int. Cl.

| | | |
|---|---|---|
| *H04L 9/32* | (2006.01) | |
| *H04L 67/06* | (2022.01) | |
| *H04L 65/403* | (2022.01) | |
| *G06F 3/0488* | (2022.01) | |
| *H04L 9/00* | (2022.01) | |
| *G06Q 10/10* | (2012.01) | |

(52) U.S. Cl.
CPC .......... *H04L 9/3236* (2013.01); *H04L 65/403* (2013.01); *H04L 67/06* (2013.01); *G06Q 10/1095* (2013.01); *H04L 9/50* (2022.05); *H04L 2209/60* (2013.01)

(56) References Cited

U.S. PATENT DOCUMENTS

| | | | |
|---|---|---|---|
| 2013/0332856 A1* | 12/2013 | Sanders | ................ G06F 3/0488 |
| | | | 715/753 |
| 2014/0165176 A1* | 6/2014 | Ow | ....................... H04L 65/403 |
| | | | 726/8 |
| 2017/0046652 A1 | 2/2017 | Haldenby et al. | |
| 2017/0244655 A1 | 8/2017 | Moon et al. | |

FOREIGN PATENT DOCUMENTS

| | | |
|---|---|---|
| CN | 103108007 A | 5/2013 |
| CN | 203104515 U | 7/2013 |
| CN | 104903900 A | 9/2015 |
| CN | 104954150 A | 9/2015 |
| CN | 105612472 A | 5/2016 |
| CN | 105975868 A | 9/2016 |
| CN | 106022681 A | 10/2016 |
| CN | 106779737 A | 5/2017 |
| CN | 206237441 U | 6/2017 |
| CN | 107077483 A | 8/2017 |
| CN | 107466089 A | 12/2017 |
| CN | 108183959 A | 6/2018 |
| KR | 20140032209 A | 3/2014 |

* cited by examiner

CONT.
FROM

CONT.
FROM

TO

PHOTO SHARING METHOD AND ELECTRONIC DEVICE

CROSS-REFERENCE TO RELATED APPLICATIONS

This application is a national stage of International Application No. PCT/CN2018/100304, filed on Aug. 13, 2018, which is hereby incorporated by reference in its entirety.

TECHNICAL FIELD

This application relates to the field of terminal technologies, and in particular, to a photo sharing method and an electronic device.

BACKGROUND

With large-scale growth of data and an increase of value of the data, it is increasingly important to explore potential value of the data through data sharing. However, how to protect sensitive data, confidential data, and the like from being illegally stolen during data sharing is an important prerequisite for data sharing.

Current data sharing methods mainly include a conventional data sharing solution and a centralized data sharing solution. The conventional data sharing solution is to use a conventional privacy protection means to implement internal sharing, and select to refuse to open sharing permission to the outside to reduce a risk of exposing privacy data. The centralized data sharing solution is that, by using a third party as a center for data openness and sharing, data owners trust the third party and open data to the third party, so that a data sharing process is implemented through scheduling by the third party.

However, the existing conventional data sharing solution has the following disadvantages: Reducing a privacy risk by refusing external openness cannot explore potential value of data or maximize benefits of the data, and may cause information construction lagging. The centralized data sharing solution resolves a problem of mutual distrust. However, because the data is centralized in the third party, a security risk exists. In other words, if the third party cannot ensure absolute data security, serious consequences may be caused once data leakage occurs.

SUMMARY

This application provides a photo sharing method and an electronic device, so as to provide a secure and effective photo sharing manner, thereby fully exploring potential value of data and improving user experience.

According to a first aspect, an embodiment of this application provides a photo sharing method. The method is applied to a first electronic device. The method includes: When the first electronic device does not initiate synchronization with a second electronic device, the first electronic device detects a first operation of a user; in response to the first operation, the first electronic device adds first photo information to a first shared album of the first electronic device; and then when the first electronic device initiates synchronization with the second electronic device, the first electronic device sends, to the second electronic device, a first request message for adding the first photo information. In this way, after receiving a first request response message that is sent by the second electronic device and that is used for refusing to add the first photo information, the first electronic device deletes the first photo information from the first shared album.

According to the method, decentralized data sharing can be implemented, and electronic devices can share photos in respective shared albums with each other.

In a possible design, after the first electronic device deletes the first photo information from the first shared album, the photo sharing method further includes: synchronizing, by the first electronic device, photo information in a fourth shared album of the second electronic device to the first electronic device, where the fourth shared album includes the photo information in the first shared album, photo information in a second shared album of the second electronic device, and photo information in a third shared album of a third electronic device, and the photo information in the first shared album does not include the first photo information.

In this embodiment of this application, the first electronic device may locally synchronize the photo information in the fourth shared album, so that photo information of another electronic device can be shared, and the second electronic device can ensure sequential growth of a blockchain corresponding to the first shared album.

In a possible design, before detecting the first operation of the user, when the first electronic device does not initiate synchronization with the second electronic device, the first electronic device detects a second operation of the user; in response to the second operation, the first electronic device adds second photo information to the first shared album; when the first electronic device initiates synchronization with the second electronic device, the first electronic device sends, to the second electronic device, a second request message for adding the second photo information; and then the first electronic device receives a second request response message that is sent by the second electronic device and that indicates that the second photo information is successfully added. In this way, the second photo information in the first shared album of the first electronic device is successfully added.

Still before detecting the first operation of the user, when the first electronic device does not initiate synchronization with the second electronic device, the first electronic device detects a third operation of the user; in response to the third operation, the first electronic device adds third photo information to the first shared album that includes the second photo information; when the first electronic device initiates synchronization with the second electronic device, the first electronic device sends, to the second electronic device, a third request message for adding the third photo information; and then the first electronic device receives a third request response message that is sent by the second electronic device and that indicates that the third photo information is successfully added. In this way, the third photo information in the first shared album of the first electronic device is successfully added. With reference to a blockchain technology provided in this embodiment of this application, the first electronic device, the second electronic device, and the third electronic device are devices in a blockchain network. The second electronic device is equivalent to a central node in the blockchain network. The first electronic device and the third electronic device are equivalent to ordinary nodes in the blockchain network.

Photo information may be added to a shared album in a form of a record. For example, a first record corresponding to the second photo information includes a first identifier, a hash value of the second photo, and content data of the second photo, and a second record corresponding to the third photo information includes a second identifier, the hash value of the second photo, content data of the third photo, and the first identifier. In other words, the second record is associated with the first record.

It can be learned that, in this embodiment of this application, the photo information in the shared album is essentially a blockchain. The blockchain is characterized by decentralization, highly transparent data, independency of trust, and information traceability. Therefore, compared with an existing data sharing manner, the shared album generated in this embodiment of this application has the following obvious advantages such as decentralization and information traceability.

In a possible design, when the first electronic device does not initiate synchronization with the second electronic device, the first electronic device detects a fourth operation of the user; in response to the fourth operation, the first electronic device deletes the third photo information from the first shared album; when the first electronic device initiates synchronization with the second electronic device, the first electronic device sends a fourth request message for deleting the third photo information to the second electronic device; and the first electronic device receives a fourth request response message that is sent by the second electronic device and that indicates that the third photo information is successfully deleted.

In this embodiment of this application, the first electronic device may request the second electronic device to delete a photo from a shared album. Therefore, the second electronic device can ensure sequential growth of a blockchain corresponding to the fourth shared album, and a case in which electronic devices conflict with each other in terms of photo addition or deletion can be effectively avoided.

According to a second aspect, an embodiment of this application provides a photo sharing method. The method is applied to a second electronic device. The method includes: The second electronic device establishes a network connection to a first electronic device; then the second electronic device receives a first request message that is sent by the first electronic device and that is used for adding first photo information; and in response to the first request message, the second electronic device sends, to the first electronic device, a first request response message for refusing to add the first photo information.

According to the method, decentralized data sharing can be implemented, electronic devices can share photos in respective shared albums with each other, and the second electronic device can ensure sequential growth of a blockchain corresponding to a shared album. A specific execution step of the second electronic device corresponds to that of the first electronic device. Therefore, for specific content, refer to the foregoing descriptions. Details are not described again in this embodiment.

According to a third aspect, an embodiment of this application provides a first electronic device, including a processor and a memory. The memory is configured to store one or more computer programs. When the one or more computer programs stored in the memory are executed by the processor, the first electronic device is enabled to implement the method in any possible design of the first aspect.

According to a fourth aspect, an embodiment of this application further provides an apparatus. The apparatus includes modules/units for performing the method according to the first aspect or any possible design of the first aspect. These modules/units may be implemented by hardware, or may be implemented by hardware executing corresponding software.

According to a fifth aspect, an embodiment of this application further provides a computer-readable storage medium. The computer-readable storage medium includes a computer program, and when the computer program is run on an electronic device, the electronic device is enabled to perform the method according to the first aspect or any possible design of the first aspect.

According to a sixth aspect, an embodiment of this application further provides a computer program product. When the computer program product is run on a terminal, the electronic device is enabled to perform the method according to the first aspect or any possible design of the first aspect.

These aspects or other aspects in this application may be clearer and more intelligible in descriptions in the following embodiments.

DESCRIPTION OF EMBODIMENTS

For ease of understanding, some concepts related to the embodiments of this application are provided as examples for reference. Details are as follows:

Blockchain: The blockchain is a chain data structure that combines blocks in chronological order, and is a decentralized database that cannot be tampered with or forged by using cryptography.

Block: The block is a set of a large amount of data. The block is marked with a timestamp and a unique mark of a previous block. A valid block is added to the blockchain after being recognized by an entire network or a central node.

Blockchain network: The blockchain network is a peer-to-peer (Peer-to-Peer, P2P) network. In other words, a node is directly connected to another node. A topology of the blockchain network is flat, and nodes can be equal.

Node: The node is a computer in the blockchain network, and includes a mobile phone, a mining rig, a desktop computer, a server, and the like. The blockchain node has the following features: 1. The blockchain node has specific storage space. 2. The blockchain node can be connected to a network. Specifically, when the node is connected to the network, the node having the foregoing features may run a corresponding blockchain program in the storage space, and perform an operation such as a transaction by using a visual operation terminal.

Wireless fidelity (wireless fidelity, wifi) direct: The wireless fidelity direct is also referred to as wifi P2P, and is a point-to-point connection technology. Electronic devices within a specific range are directly connected through wifi, to share and exchange content with each other.

The following describes the technical solutions in the embodiments of this application with reference to the accompanying drawings in the embodiments of this application. In the following descriptions of the embodiments of this application, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise stated, "a plurality of" means two or more than two.

Figure 1:
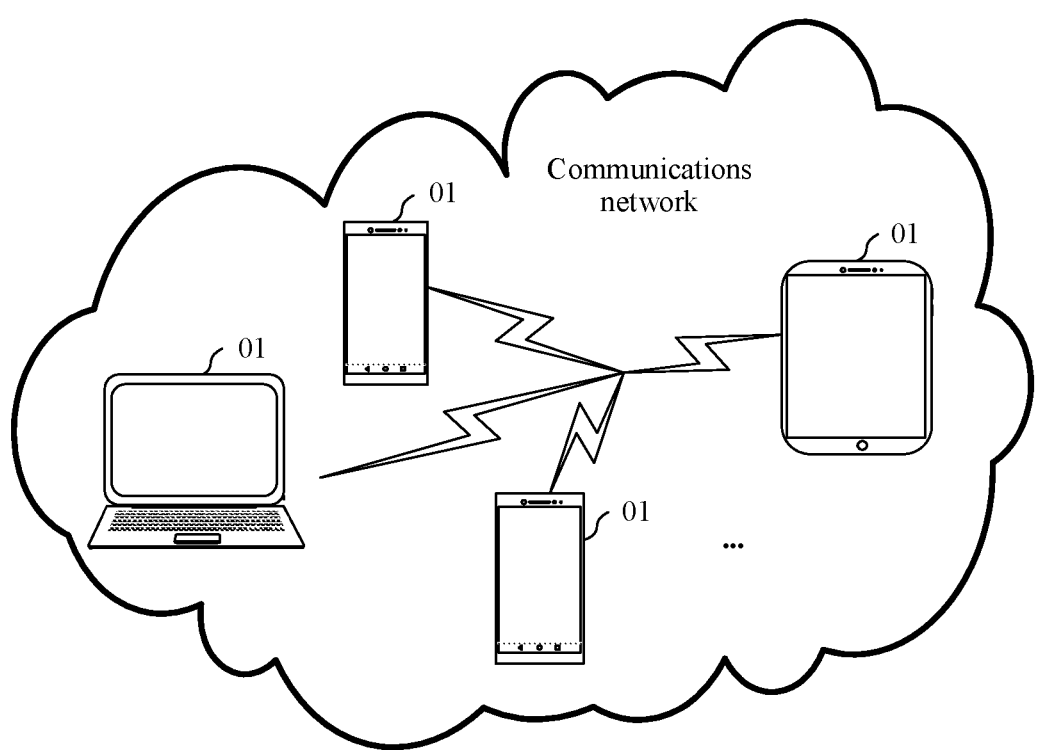
FIG. 1 is a schematic diagram of an interconnection scenario according to an embodiment of this application.

A data sharing method provided in the embodiments of this application may be applied to a scenario in which a plurality of electronic devices 01 are connected to each other based on a communications network shown in FIG. 1. The communications network may be a local area network, or may be a wide area network transited by using a relay (relay) device. When the communications network is a local area network, for example, the communications network may be a short-distance communications network such as a wifi hotspot network, a wifi P2P network, a Bluetooth network, a zigbee network, or a near field communications (near field communication, NFC) network. When the communications network is a wide area network, for example, the communications network may be a third generation mobile communications technology (3rd-generation wireless telephone technology, 3G) network, a fourth-generation mobile communications technology (the 4th generation mobile communication technology, 4G) network, a fifth-generation mobile communications technology (5th-generation mobile communication technology, 5G) network, a future evolved public land mobile network (public land mobile network, PLMN), or the Internet. In the scenario shown in FIG. 1, different electronic devices may exchange data through the communications network, for example, exchange a photo, a text, or a video, or exchange a result obtained after the electronic devices process an object such as a photo, a text, or a video.

In some embodiments of this application, the electronic device 01 shown in FIG. 1 may be a portable electronic device having another function such as a personal digital assistant function and/or a music player function, for example, a mobile phone, a tablet computer, or a wearable device having a wireless communication function (such as a smartwatch). An example embodiment of the portable electronic device includes but is not limited to a portable electronic device using iOS®, Android®, Microsoft®, or another operating system. The portable electronic device may alternatively be another portable electronic device, for example, a laptop (laptop) having a touch-sensitive surface (for example, a touch panel). It should be further understood that, in some other embodiments of this application, the electronic device 01 may alternatively not be a portable electronic device, but a desktop computer having a touch-sensitive surface (for example, a touch panel).

Figure 2:
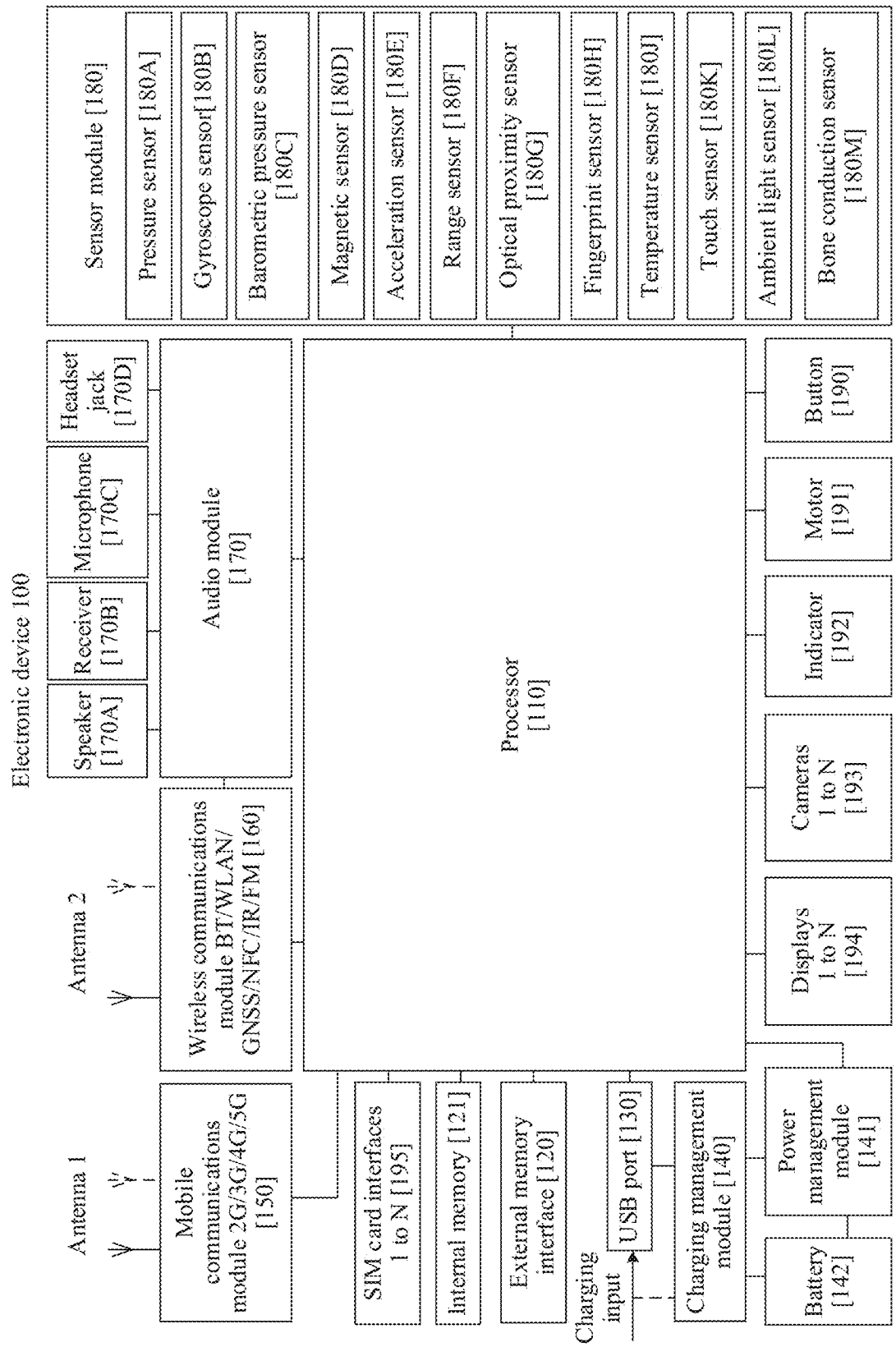
FIG. 2 is a schematic structural diagram of an electronic device according to an embodiment of this application.

For example, as shown in FIG. 2, the electronic device 01 in this embodiment of this application may be an electronic device 100. The electronic device 100 is used as an example below to describe the embodiments in detail.

The electronic device 100 may include a processor 110, an external memory interface 120, an internal memory 121, a USB port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display screen 194, a SIM card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that a structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural processing unit (Neural-network Processing Unit, NPU). Different processing units may be independent devices, or may be integrated into one or more processors.

The controller may be a nerve centre and a command center of the electronic device 100. The controller may generate an operation control signal based on an instruction operation code and a time sequence signal, to complete control of instruction fetching and instruction execution.

A memory may be further disposed in the processor no, and is configured to store an instruction and data. In some embodiments, the memory in the processor 110 is a cache memory. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor no, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call through a Bluetooth headset.

The PCM interface may also be configured to perform audio communication; and sample, quantize, and encode an analog signal. In some embodiments, the audio module 170 may be coupled to the wireless communications module 160 through the PCM bus interface. In some embodiments, the audio module 170 may alternatively transfer an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect to the processor 110 and the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music through a Bluetooth headset.

The MIPI interface may be configured to connect to the processor 110 and a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal, or may be configured as a data signal. In some embodiments, the GPIO interface may be configured to connect to the processor 110, the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is an interface that conforms to a USB standard specification, and may be specifically a mini USB port, a micro USB port, a USB Type C port, or the like. The USB port may be configured to connect to the charger to charge the electronic device 100, or may be configured to transmit data between the electronic device 100 and a peripheral device, or may be configured to connect to a headset to play audio through the headset, or may be configured to connect to another electronic device such as an AR device.

It can be understood that an interface connection relationship between the modules shown in this embodiment of the present invention is merely an example for description, and does not constitute a limitation on the structure of the electronic device 100. In some other embodiments of this application, the electronic device 100 may alternatively use an interface connection manner that is different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB port. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna module 1, the antenna module 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication bands. Different antennas may be further multiplexed, to increase antenna utilization. For example, a cellular network antenna may be multiplexed as a wireless local area network diversity antenna. In some other embodiments, the antenna may be used in combination with a tuning switch.

The mobile communications module 150 can provide a solution, applied to the electronic device 100, to wireless communication including 2G/3G/4G/5G, and the like. The mobile communications module 150 may include at least one filter, a switch, a power amplifier, a low noise amplifier (Low Noise Amplifier, LNA), and the like. The mobile communications module 150 may receive an electromagnetic wave by using the antenna 1, perform processing such as filtering or amplification on the received electromagnetic wave, and transfer the electromagnetic wave to the modem processor for demodulation. The mobile communications module 150 may further amplify a signal modulated by the modem processor, and convert an amplified signal into an electromagnetic wave by using the antenna 1 for radiation. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (wireless local area networks, WLAN), Bluetooth (bluetooth, BT), a global navigational satellite system (global navigation satellite system, GNSS), frequency modulation (frequency modulation, FM), near field communications (near field communication, NFC) technology, an infrared (infrared, IR) technology, and the like. The wireless communications module 160 may be one or more devices integrating at least one communication processing module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave by using the antenna 2 for radiation.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-code division multiple access (time-division code division multiple access, TD-SCDMA), long term evolution (long term evolution, LTE), BT, the GNSS, the WLAN, the NFC, the FM, the IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite-based augmentation system (satellite based augmentation systems, SBAS).

The electronic device 100 implements the display function through the GPU, the display 194, the application processor, and the like. The GPU is a microprocessor for image processing, and is connected to the display 194 and the application processor. The GPU is configured to perform mathematical and geometric calculation, and perform graphics rendering. The processor 110 may include one or more GPUs, which execute a program instruction to generate or change display information.

The display 194 is configured to display an image, a video, and the like. The display 194 includes a display panel. The display panel may be an LCD (liquid crystal display, liquid crystal display), an OLED (organic light-emitting diode, organic light-emitting diode), an active-matrix organic light emitting diode (active-matrix organic light emitting diode, AMOLED), a flexible light-emitting diode (flex light-emitting diode, FLED), Miniled, MicroLed, Micro-oLed, a quantum dot light emitting diode (quantum dot light emitting diodes, QLED), or the like. In some embodiments, the electronic device wo may include one or N displays, where N is a positive integer greater than 1.

The electronic device wo may implement the photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens. The photosensitive element of the camera converts an optical signal into an electrical signal, and the photosensitive element of the camera transmits the electrical signal to the ISP for processing. The ISP converts the electrical signal into an image that is visible to the eye. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP. The ISP converts the electrical signal into a digital image signal, and outputs the digital image signal to the DSP for processing. The DSP converts the digital image signal into a standard image signal in a format such as RGB or YUV. In some embodiments, the electronic device 100 may include one or N cameras, where N is a positive integer greater than 1.

The digital signal processor is configured to process a digital signal. In addition to the digital image signal, the digital signal processor may further process another digital signal. For example, when the electronic device 100 selects a frequency, the digital signal processor is configured to perform Fourier transform on frequency energy, and the like.

The video codec is configured to compress or decompress a digital video. The electronic device 100 may support one or more codecs. Therefore, the electronic device 100 may play or record videos in a plurality of encoding formats, for example, MPEG 1, MPEG 2, MPEG 3, and MPEG 4.

The NPU is a neural-network (neural-network, NN) computing processor. The NPU quickly processes input information by referring to a biological neural network structure, for example, by referring to a mode of transfer between human brain neurons, and may further continuously perform self-learning. Intelligent cognition of the electronic device 100 such as image recognition, facial recognition, speech recognition, and text understanding can be implemented by using the NPU.

The external memory interface 120 may be configured to connect to an external memory card such as a micro SD card, to extend a storage capability of the electronic device 100. The external memory card communicates with the processor 110 through the external memory interface 120, to implement a data storage function, for example, to store files such as music and a video in the external memory card.

The internal memory 121 may be configured to store computer-executable program code. The executable program code includes an instruction. The processor 110 runs the instruction stored in the internal memory 121, to implement various function applications and data processing of the electronic device 100. The memory 121 may include a program storage area and a data storage area. The program storage area may store an operating system, an application required by at least one function (for example, a sound play function and an image play function), and the like. The data storage area may store data (such as audio data and a phone book) created when the electronic device 100 is used, and the like. In addition, the memory 121 may include a high-speed random access memory, or may include a nonvolatile memory, for example, at least one magnetic disk storage device, a flash memory device, or a universal flash storage (universal flash storage, UFS).

The electronic device 100 may implement audio functions such as music playback and recording functions by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to perform audio signal encoding and decoding. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When the electronic device wo answers a call or receives a voice message, the receiver 170B may be put close to a human ear to listen to the voice message.

The microphone 170C, also referred to as a "mike" or a "microphone", is configured to convert a sound signal into an electrical signal. When making a call or sending a voice message, a user may make a sound near the microphone through the mouth of the user, to enter a sound signal to the microphone 170C. At least one microphone 170C may be disposed in the electronic device 100. In some other embodiments, two microphones may be disposed in the electronic device 100, to collect a sound signal and further implement a noise reduction function. In some other embodiments, alternatively, three, four, or more microphones may alternatively be disposed in the electronic device boo, to collect a sound signal, reduce noise, identify a sound source, implement a directional recording function, and the like.

The headset jack 170D is configured to connect to a wired headset. The headset jack may be a USB port, or may be a 3.5 mm open mobile electronic device platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed in the display 194. There are many types of pressure sensors 180A, for example, a resistive pressure sensor, an inductive pressure sensor, and a capacitive pressure sensor. The capacitive pressure sensor may include at least two parallel plates made of conductive materials. A capacitance between electrodes changes when force is applied to the pressure sensor 180A. The electronic device 100 determines a pressure strength based on a capacitance change. When a touch operation is performed on the display 194, the electronic device 100 detects a strength of the touch operation based on the pressure sensor 180A. The electronic device 100 may also calculate a touch position based on a detection signal of the pressure sensor 180A. In some embodiments, touch operations that are performed on a same touch position but have different touch operation strengths may correspond to different operation instructions. For example, when a touch operation whose touch operation strength is less than a first pressure threshold is performed on an icon of Messages, an instruction for viewing an SMS message is executed; or when a touch operation whose touch operation strength is greater than or equal to a first pressure threshold is performed on an icon of Messages, an instruction for creating a new SMS message is executed.

The gyroscope sensor 180B may be configured to determine a motion posture of the electronic device 100. In some embodiments, an angular velocity of the electronic device 100 around three axes (that is, axes x, y, and z) may be determined by using the gyroscope sensor 180B. The gyroscope sensor 180B may be used for image stabilization during photographing. For example, when the shutter is pressed, the gyroscope sensor 180B detects an angle at which the electronic device 100 jitters, calculates, based on the angle, a distance for which a lens module needs to compensate, and allows the lens to eliminate the jitter of the electronic device 100 through a reverse motion, to implement image stabilization. The gyroscope sensor 180B may be further used in a navigation scenario and a somatic game scenario.

The barometric pressure sensor 180C is configured to measure barometric pressure. In some embodiments, the electronic device 100 calculates an altitude by using an atmospheric pressure value obtained by the barometric pressure sensor 180C through measurement, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D, to set a feature such as automatic unlocking through flipping based on a detected opening or closing state of the flip cover or a detected opening or closing state of the flip cover.

The acceleration sensor 180E may detect acceleration values in various directions (usually on three axes) of the electronic device 100, and may detect a gravity value and a gravity direction when the electronic device 100 is still. The acceleration sensor 180E may be further configured to identify a posture of the electronic device, and is applied to applications such as a pedometer and switching between a landscape mode and a portrait mode.

The range sensor 180F is configured to measure a distance. The electronic device 100 may measure a distance in an infrared or a laser manner. In some embodiments, in a photographing scenario, the electronic device 100 may measure a distance by using the range sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to the ear for a call, to automatically perform screen-off for power saving. The optical proximity sensor 180G may also be used in a smart cover mode or a pocket mode to automatically perform screen unlocking or locking.

The ambient light sensor 180L is configured to sense ambient light luminance. The electronic device 100 may adaptively adjust luminance of the display 194 based on the sensed ambient light luminance. The ambient light sensor 180L may be further configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may implement fingerprint-based unlocking, application lock access, fingerprint-based photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 degrades performance of the processor nearby the temperature sensor 180J, to reduce power consumption for thermal protection. In some other embodiments, when the temperature is less than another threshold, the electronic device 100 heats the battery 142, to prevent the electronic device 100 from being abnormally powered off because of a low temperature. In some other embodiments, when the temperature is less than still another threshold, the electronic device 100 boosts an output voltage of the battery 142, to prevent abnormal power-off caused by a low temperature.

The touch sensor 180K, also referred to as a "touch panel", may be disposed in the display 194, and is configured to detect a touch operation performed on or near the display 194. The touch sensor 180K may transfer the detected touch operation to the application processor, to determine a type of a touch event, and to provide a corresponding visual output by using the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may alternatively be disposed in a headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button may be a mechanical button, or may be a touch button. The electronic device 100 may receive a button input, and generate a button signal input related to a user setting and function control of the electronic device 100.

The motor 191 may generate a vibration prompt. The motor 191 may be used for an incoming call vibration prompt, or may be used for a touch vibration feedback. For example, touch operations performed on different applications (for example, photographing and audio playback) may also correspond to different vibration feedback effects. Touch operations performed on different areas on the display 194 may correspond to different vibration feedback effects. Different application scenarios (for example, a time reminder scenario, an information receiving scenario, an alarm clock scenario, and a game scenario) may also correspond to different vibration feedback effects. A touch vibration feedback effect may alternatively be customized.

The indicator 192 may be an indicator light, which may be configured to indicate a charging status and a power change, or may be configured to indicate a message, a missed call, a notification, and the like.

The SIM card interface 195 is configured to connect to a subscriber identity module (subscriber identity module, SIM). A SIM card may be inserted into the SIM card interface or removed from the SIM card interface, to implement contact with or separation from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be simultaneously inserted into one SIM card interface. The plurality of cards may be of a same type or different types. The SIM card interface 195 may also be compatible with different types of SIM cards. The SIM card interface 195 may also be compatible with an external memory card. The electronic device 100 interacts with a network by using the SIM card, to implement functions such as calling and data communication. In some embodiments, the electronic device 100 uses an eSIM, that is, an embedded SIM card. The eSIM card may be embedded in the electronic device 100, and cannot be separated from the electronic device 100. A software system of the electronic device 100 may use a layered architecture, an event-driven architecture, a microkernel architecture, a micro service architecture, or a cloud architecture. In this embodiment of the present invention, an Android system of a layered architecture is used as an example to illustrate a software structure of the electronic device 100.

Figure 3:
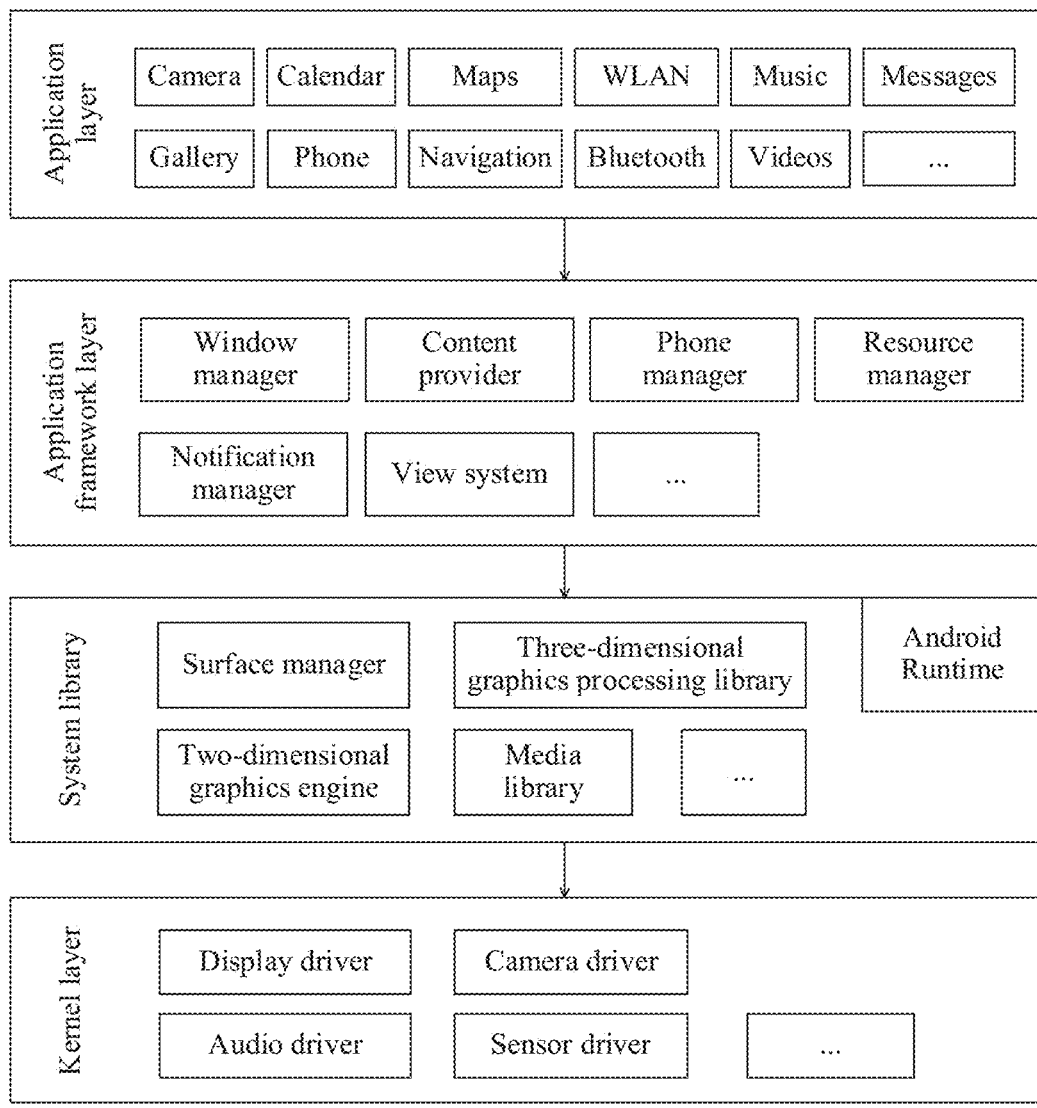
FIG. 3 is a block diagram of a software structure of an electronic device according to an embodiment of this application.

FIG. 3 is a block diagram of the software structure of the electronic device 100 in this embodiment of the present invention.

Software is divided into several layers by using the layered architecture, and each layer has clear roles and responsibilities. The layers communicate with each other by using a software interface. In some embodiments, the Android system is divided into four layers, namely, an application layer, an application framework layer, an Android runtime (Android runtime) and a system library, and a kernel layer from top to bottom.

The application layer may include a series of application packages.

As shown in FIG. 3, the application packages may include applications such as Camera, Gallery, Calendar, Phone, Maps, Navigation, WLAN, Bluetooth, Music, Video, and Messages.

The application framework layer provides an application programming interface (application programming interface, API) and a programming framework for an application at the application layer. The application framework layer includes some predefined functions.

As shown in FIG. 3, the application framework layer may include a window manager, a content provider, a view system, a telephone manager, a resource manager, a notification manager, and the like.

The window manager is configured to manage a window program. The window manager may obtain a size of a display, determine whether there is a status bar, perform screen locking, take a screenshot of the display, and the like.

The content provider is configured to: store and obtain data, and make the data accessible to an application. The data may include a video, an image, audio, calls that are made and received, a browsing history and a bookmark, an address book, and the like.

The view system includes visual controls such as a text display control and a photo display control. The view system can be used to construct an application. A display interface may include one or more views. For example, a display interface including an SMS message notification icon may include a text display view and a photo display view.

The phone manager is configured to provide a communication function of the electronic device 100, for example, a function of managing call statuses (including a connected state, a disconnected state, and the like).

The resource manager provides various resources for an application, such as localized strings, icons, photos, layout files, and video files.

The notification manager enables an application to display notification information in a status bar, and may be configured to convey a notification-type message. The notification-type message may automatically disappear after the message is displayed for a short period of time, without a need of user interaction. For example, the notification manager is configured to notify that download is completed, remind a message, and the like. The notification manager may alternatively be a notification that appears on the top of a status bar of a system in a text form of a graph or a scroll bar, for example, a notification of an application running in the background, or may be a notification that appears on a screen in a form of a dialog window. For example, text information is prompted in the status bar, an alert sound is produced, the electronic device vibrates, or the indicator light blinks.

The Android runtime includes a kernel library and a virtual machine, and the Android runtime is responsible for scheduling and managing the Android system.

The kernel library includes two parts: a function that needs to be invoked by a Java language and a kernel library of Android.

The application layer and the application framework layer run on the virtual machine. The virtual machine executes a Java file at the application layer and the application framework layer as a binary file. The virtual machine is configured to perform functions such as object lifecycle management, stack management, thread management, security and exception management, and garbage collection.

The system library may include a plurality of function modules, for example, a surface manager (surface manager), a media library Media Libraries), a three-dimensional graphics processing library (for example, OpenGL ES), and a 2D graphics engine (for example, SGL).

The surface manager is configured to: manage a display subsystem, and provide fusion of 2D and 3D layers for a plurality of applications.

The media library supports playback and recording of a plurality of commonly used audio and video formats, static image files, and the like. The media library may support a plurality of audio and video encoding formats such as MPEG 4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes a working procedure of software and hardware of the electronic device 100 by using an example with reference to a photographing capture scenario.

When the touch sensor 180K receives a touch operation, a corresponding hardware interruption is sent to the kernel layer. The kernel layer processes the touch operation into a raw input event (including information such as touch coordinates or a time stamp of the touch operation). The raw input event is stored at the kernel layer. The application framework layer obtains the raw input event from the kernel layer, and identifies a control corresponding to the input event. For example, the touch operation is a touch tap operation, and a control corresponding to the tap operation is a control of an icon of a camera application. The camera application invokes an interface at the application framework layer to enable the camera application, then enables the camera driver by invoking the kernel layer, and captures a static image or a video by using the camera.

All the following embodiments may be implemented in the electronic device 01 (for example, the electronic device 100 or a tablet computer) having the foregoing hardware structure. In the following embodiments, an example in which the electronic device 100 is a mobile terminal is used to describe the data sharing method provided in the embodiments of this application.

Figure 4A:
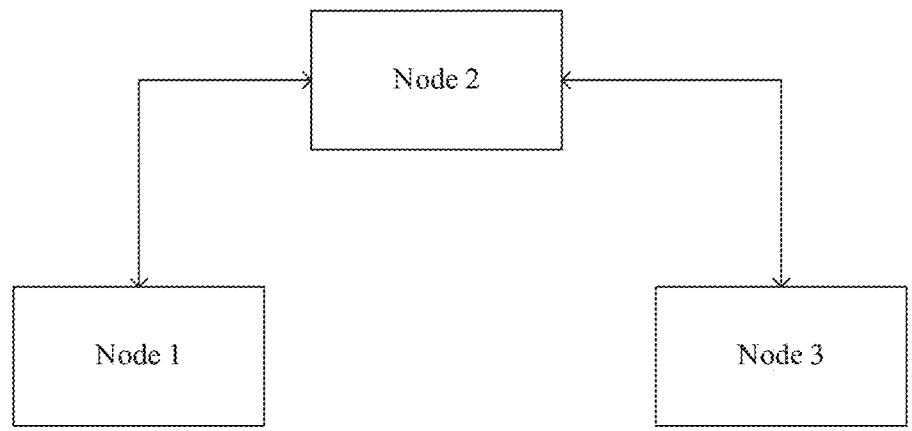
FIG. 4a to FIG. 4f are a schematic diagram of a blockchain technology according to an embodiment of this application.
Figure 4B:
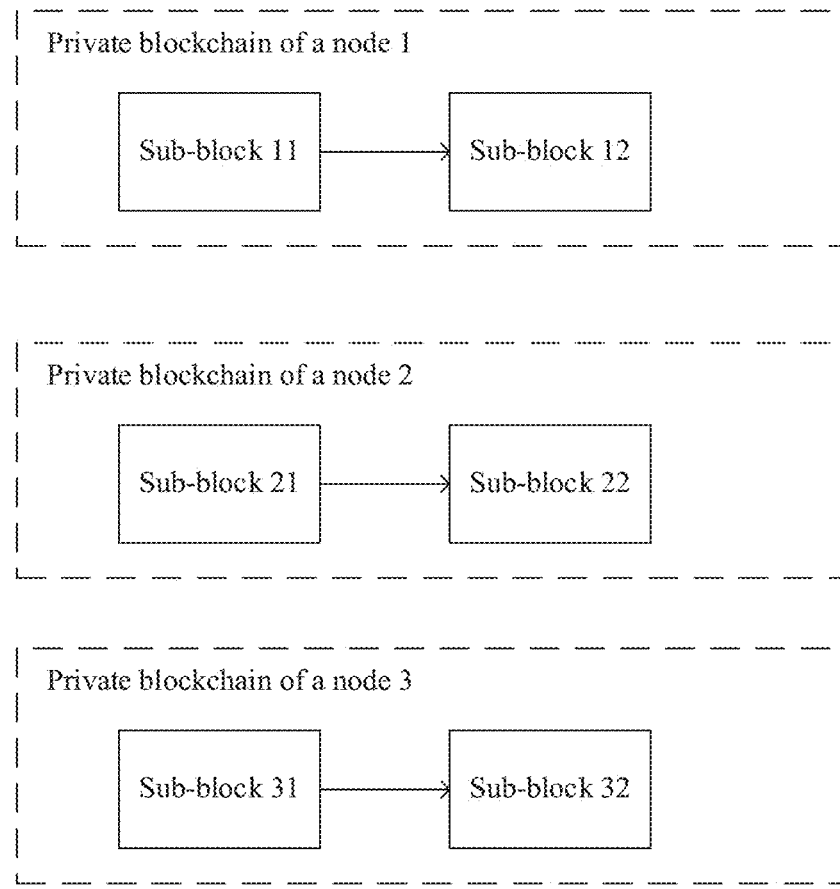
Figure 4C:
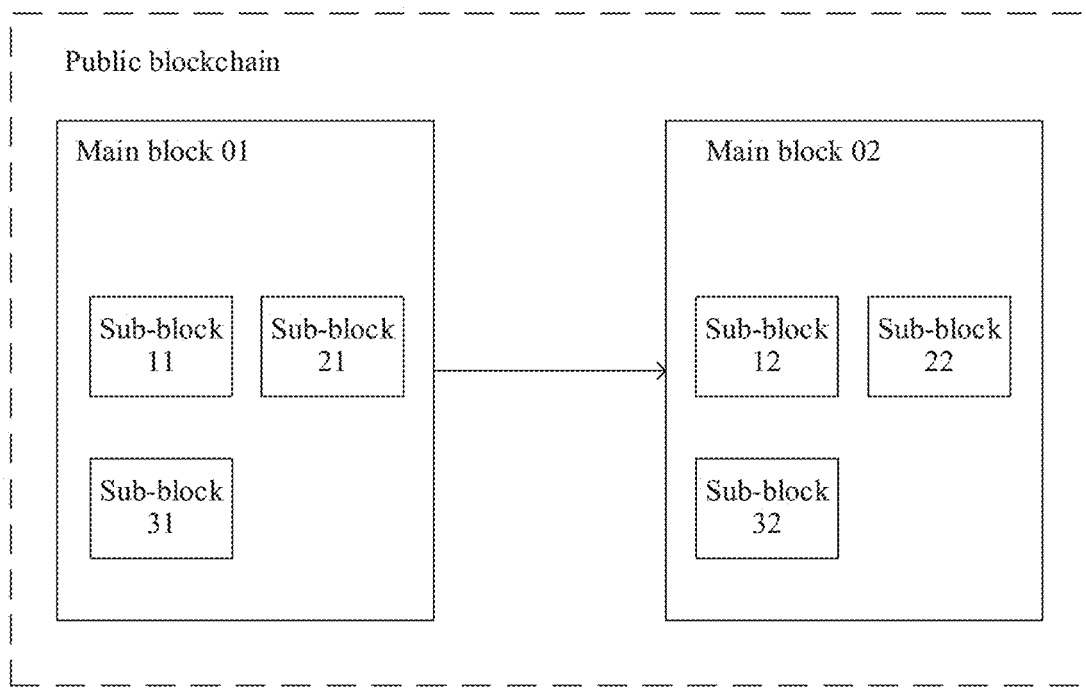

First, an embodiment of this application provides a new blockchain technology. The blockchain technology proposes concepts of a public blockchain and a private blockchain. The public blockchain is a blockchain corresponding to all nodes in a blockchain network. The private blockchain is a blockchain corresponding to each node. For example, a blockchain network including nodes in the new blockchain technology is shown in FIG. 4a. A node 2 is a central node, and the central node is configured to ensure that blocks can be added to the public blockchain in order, so as to avoid a conflict. A node 1 and a node 3 are ordinary nodes. The node 1, the node 2, and the node 3 each are provided with a private blockchain. As shown in FIG. 4b, the private blockchain of the node 1 includes a sub-block 11 and a sub-block 12, the private blockchain of the node 2 includes a sub-block 21 and a sub-block 22, and the private blockchain of the node 3 includes a sub-block 31 and a sub-block 32. When the node 2 determines each sub-block on each private blockchain as a valid sub-block, a public blockchain corresponding to the current blockchain network including the node 1, the node 2, and the node 3 is shown in FIG. 4c. The public blockchain includes a main block 01 and a main block 02. The main block 01 includes the sub-block 11, the sub-block 21, and the sub-block 31. The main block 02 includes the sub-block 12, the sub-block 22, and the sub-block 32.

It should be noted that an existing blockchain technology also has a central node, and behavior of generating a block by an ordinary node also needs to be recognized by the central node. After determining that the behavior of generating a block is valid, the central node sequentially adds the valid block to the public blockchain. However, an existing blockchain network has only a public blockchain, and the central node needs to be always online, so that real-time authentication can be performed on the behavior of generating a block by an ordinary node. If the central node is offline, sequential growth of the public blockchain cannot be implemented. Consequently, when the existing blockchain technology is applied to a mobile terminal, a disadvantage occurs. Because a battery level of the mobile terminal is limited, it cannot be ensured that the mobile terminal is always online, in other words, the mobile terminal cannot always establish a network connection to another node.

Figure 4D:
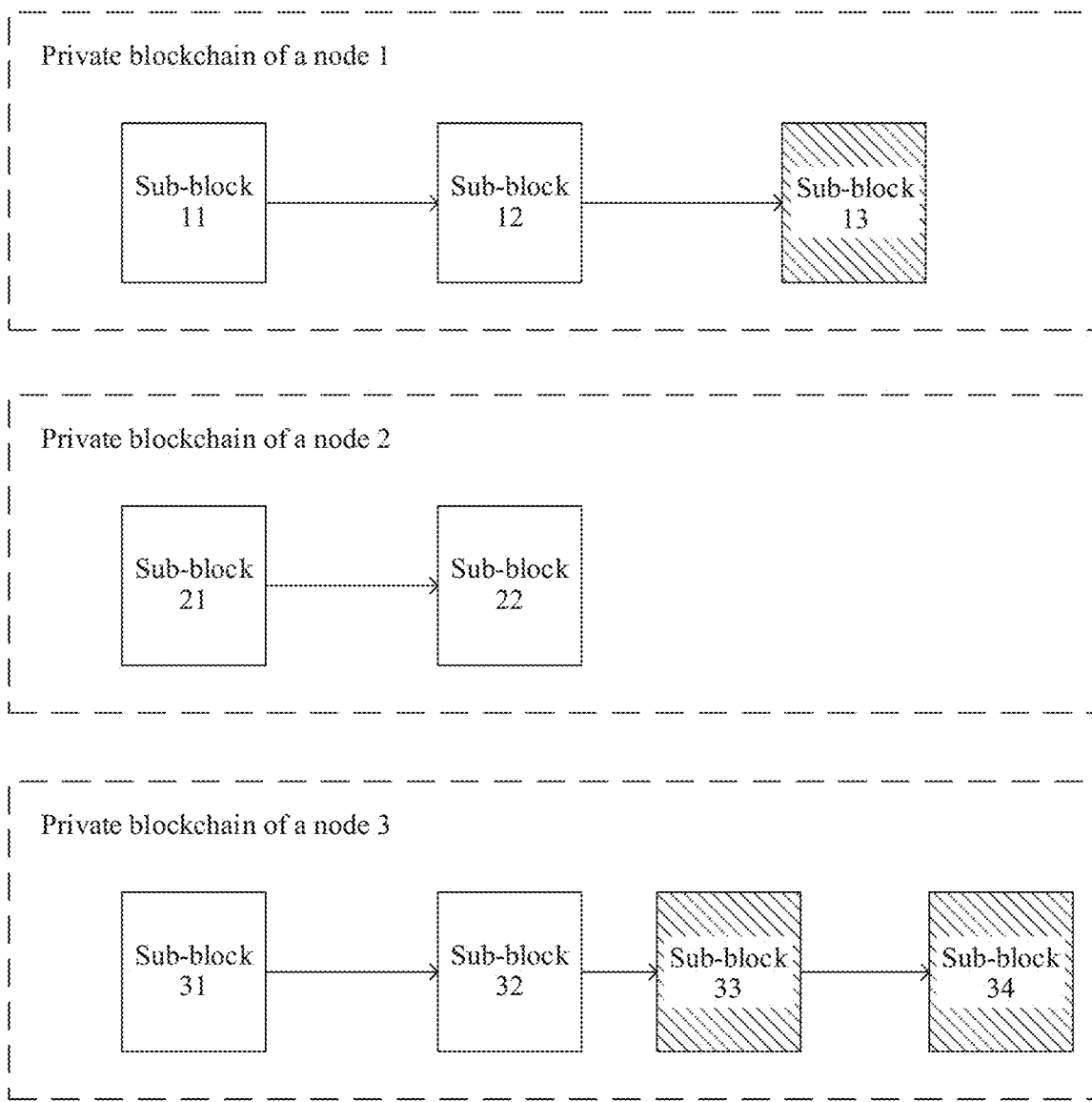
Figure 4E:
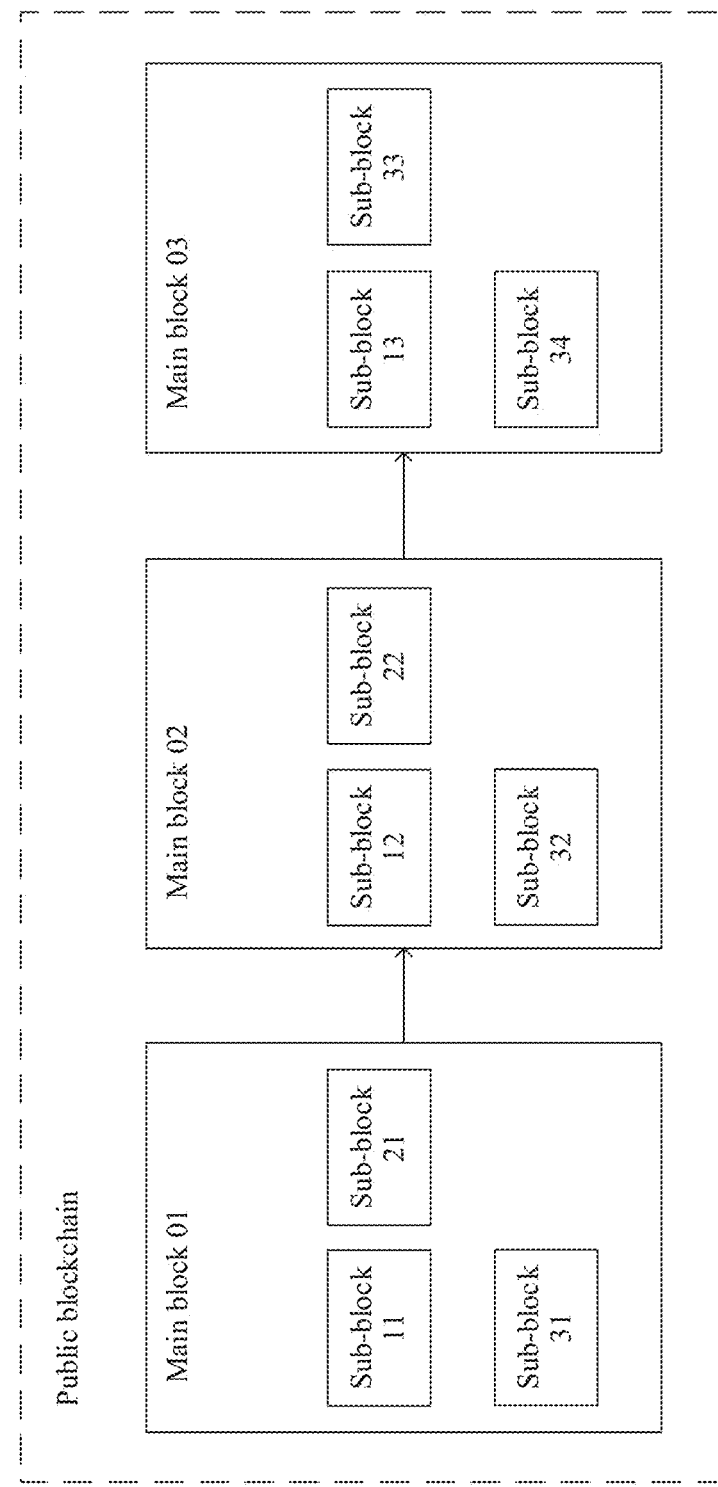

Compared with the existing blockchain technology, in the blockchain technology provided in this embodiment of this application, a problem that a mobile terminal cannot be always online can be effectively resolved by adding a private blockchain. For example, regardless of whether the node 1, the node 2, and the node 3 access a network, the node 1, the node 2, and the node 3 each may add a sub-block to the private blockchain of each of the node 1, the node 2, and the node 3 at any time. As shown in FIG. 4d, it is assumed that a sub-block 13 is added to the private blockchain of the node 1 when the node 1 is offline, and a sub-block 33 and a sub-block 34 are added to the private blockchain of the node 3 when the node 3 is offline. When the node 1 and the node 3 access the network again, the node 1 and the node 3 each submit a request to the node 2 to request the node 2 to add a block 03 to the public blockchain. The block 03 includes the sub-block 13, the sub-block 33, and the sub-block 34. If the node 2 recognizes that the sub-block 13, the sub-block 33, and the sub-block 34 are valid, the node 2 adds the block 03 to the public blockchain, and the block 03 includes the sub-block 13, the sub-block 33, and the sub-block 34. Then, the node 1 and the node 3 obtain a public blockchain from the node 2 after addition. The public blockchain is shown in FIG. 4e.

Figure 4F:
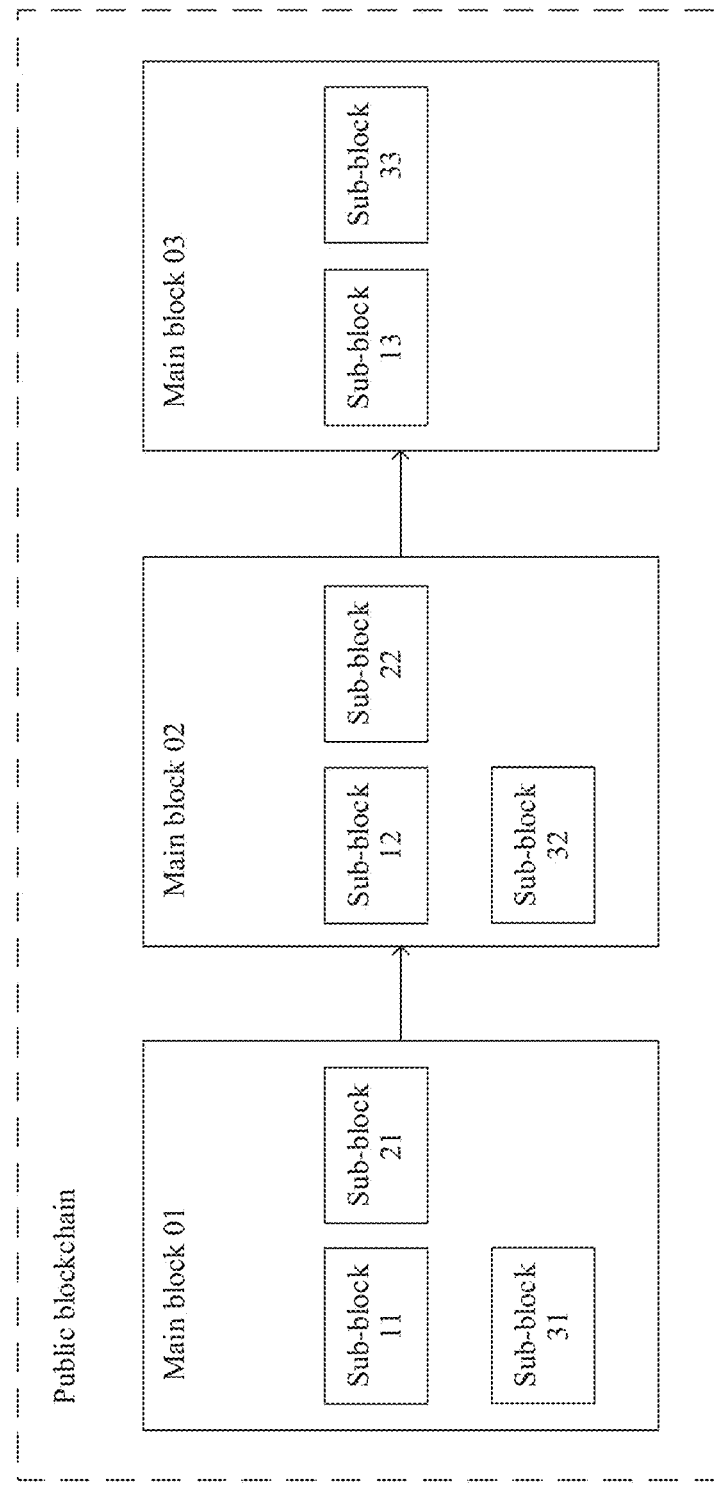

In addition, when the node 1 and the node 3 each submit the request to the node 2 to request to add the block 03 to the public blockchain, and the block 03 includes the sub-block 13, the sub-block 33, and the sub-block 34, if the node 2 recognizes that the sub-block 13 and the sub-block 33 are valid, but the sub-block 34 is invalid, the node 2 sends a notification to the node 3, and the notification indicates that the sub-block 34 is invalid and cannot be added to the public blockchain. After receiving the notification, the node 3 selects to sequentially add a next sub-block 35 after the sub-block 33, in other words, the sub-block 34 is discarded. The node 2 adds the block 03 to the public blockchain, and the block 03 includes the sub-block 13 and the sub-block 33. Then, the node 1 and the node 3 obtain a public blockchain from the node 2 after addition. The public blockchain is shown in FIG. 4f.

It can be learned from the foregoing content that, in the blockchain technology provided in this embodiment of this application, when accessing the network, the central node may perform authentication on block addition behavior submitted by an ordinary node, and the central node adds a new block to the public blockchain only after the authentication performed by the central node succeeds. Therefore, the central node can ensure sequential growth of the public blockchain, thereby effectively avoiding a block addition conflict. In addition, each node is provided with a private blockchain. Each node may submit, in real time, behavior of adding a sub-block to the private blockchain of the node when the node is in an online or offline state. Once accessing the network, the node sends the behavior of adding a sub-block to the central node for authentication. Therefore, a problem that a block cannot be added because a mobile terminal is offline can be effectively resolved. In addition, each node stores the public blockchain, which is equivalent to a distributed database. Even if a single node is faulty, the public blockchain can still be restored from another node. Therefore, data security can be effectively ensured.

Based on the foregoing blockchain technology, an embodiment of this application provides a data sharing solution. In this solution, data can be shared between a plurality of electronic devices. Specifically, a group including a plurality of electronic devices may be established by using the foregoing blockchain technology, and the electronic devices in the group may share data with each other. The shared data may be information such as a photo, a video, transaction data, or health data in an electronic device. Compared with an existing centralized data sharing solution, in the data sharing solution provided in this embodiment of this application, not only data sharing in a group can be ensured, but also data security in the group can be ensured.

The following describes in detail the data sharing solution provided in the embodiments of this application with reference to the accompanying drawings and application scenarios.

An example in which shared data is a photo in an electronic device is used below to describe the data sharing method provided in the embodiments of this application. The photo may be a photo photographed by the electronic device, or may be a photo stored in the electronic device, or may be a photo received by the electronic device from another device.

Figure 5A:
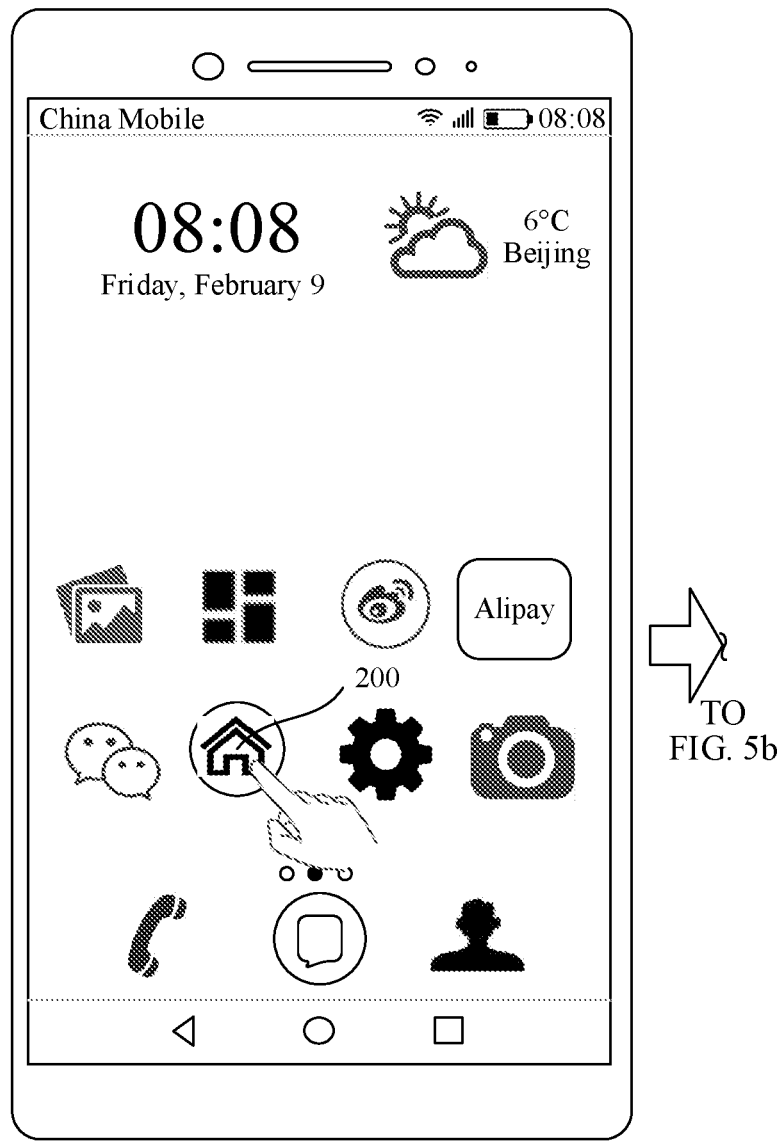
FIG. 5a to FIG. 5d are a schematic diagram of a group of interfaces according to an embodiment of this application.
Figure 5B:
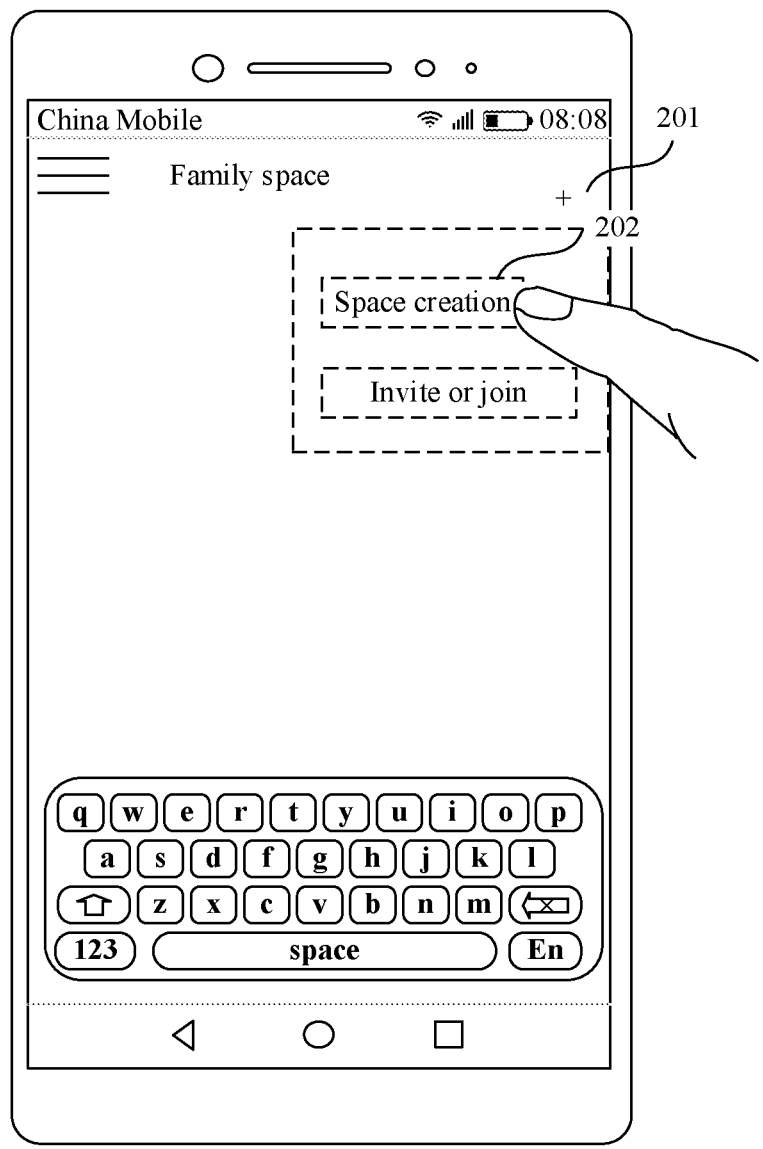
Figure 5C:
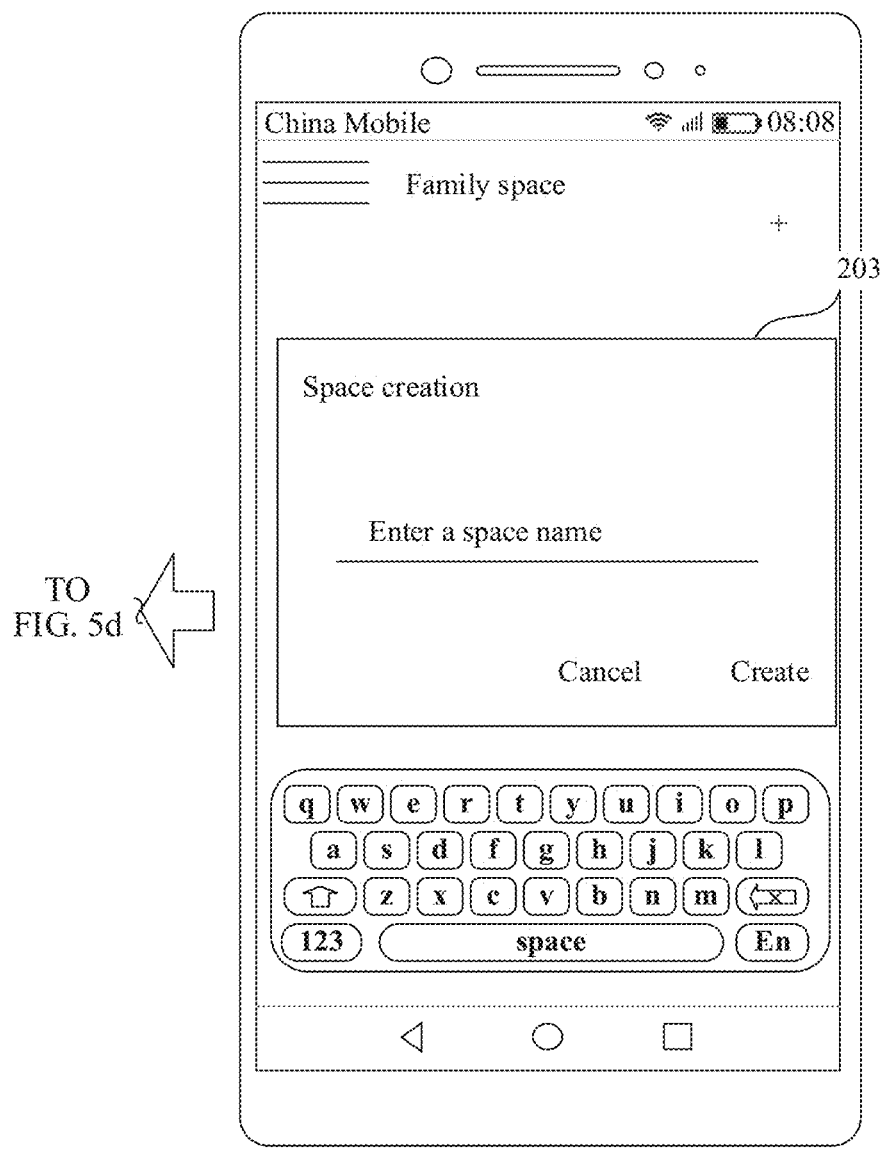
Figure 5D:
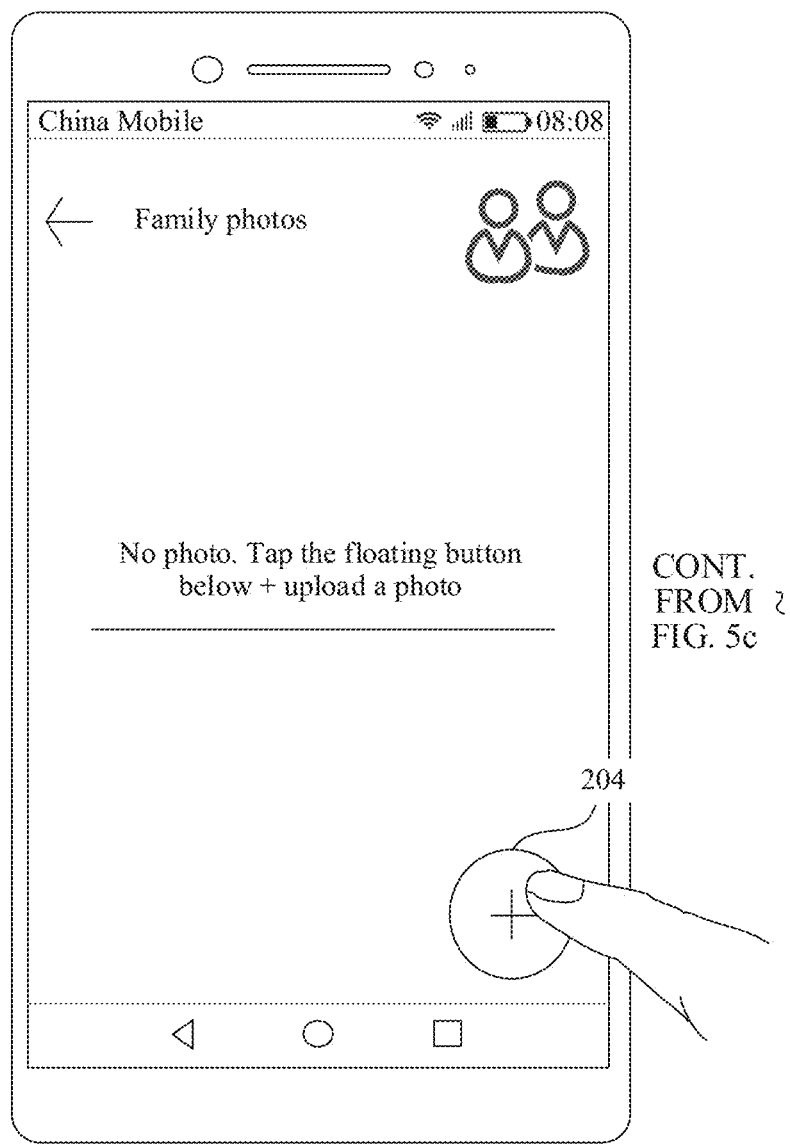

For example, as shown in FIG. 5a to FIG. 5d, in response to a tap operation performed by a user 1 on a family space icon 200 shown in FIG. 5a, an electronic device 1 runs a family space application. Referring to FIG. 5b, when the electronic device 1 detects an operation (for example, a tap operation) performed by the user 1 on a button 201 newly added to a family space interface in FIG. 5b, in response to the operation, the electronic device 1 displays two options in FIG. 5b, and the two options include a "space creation" option and an "invite or join" option. Referring to FIG. 5c, when the user 1 selects the "space creation" option 202, the electronic device 1 displays an input box 203 for space creation. When the user 1 enters a space name "family photos", a group shown in FIG. 5d is generated. Referring to FIG. 5d, the currently created group "family photos" has no photo, and the user 1 may upload a photo by using a suspend button "+" 204.

It should be noted that, when the electronic device runs the family space application for the first time, the electronic device usually notifies the user to perform account registration, and the operations shown in FIG. 5a to FIG. 5d can be performed only after the user account registration is completed. For example, the user 1 may complete family space registration by using a Huawei account or an account (for example, a WeChat account or a Weibo account) of another application.

Figure 6A:
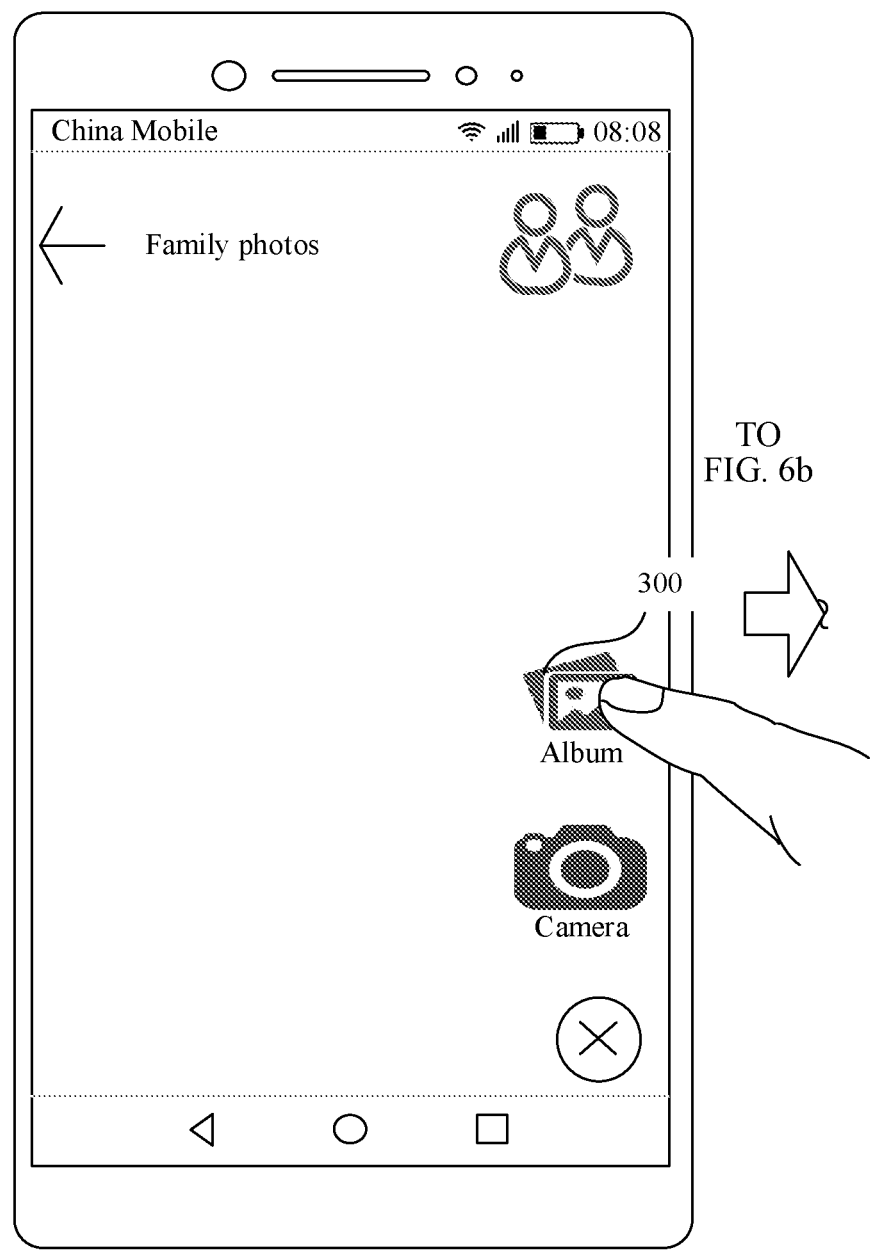
FIG. 6a to FIG. 6c are a schematic diagram of another group of interfaces according to an embodiment of this application.
Figure 6B:
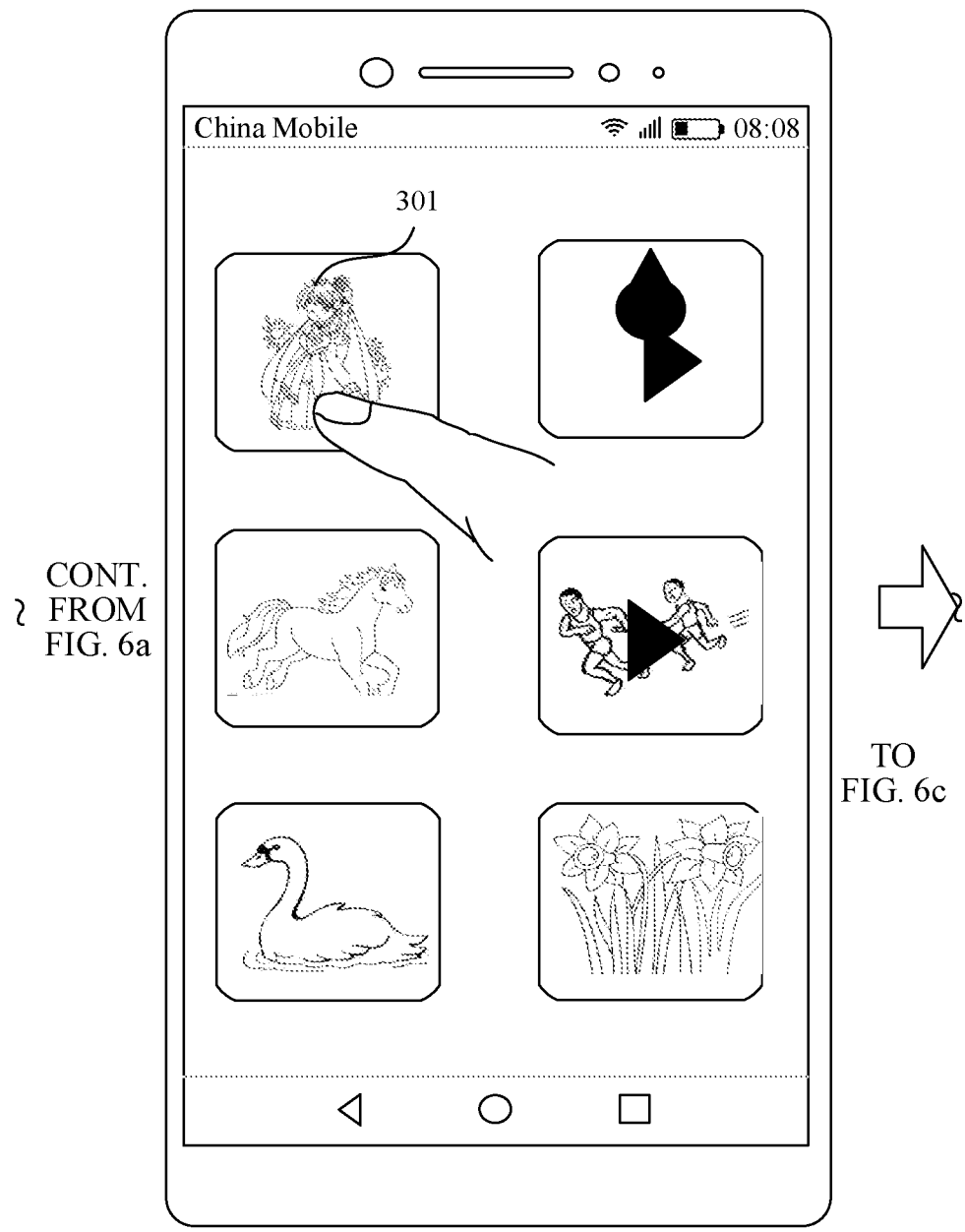
Figure 6C:
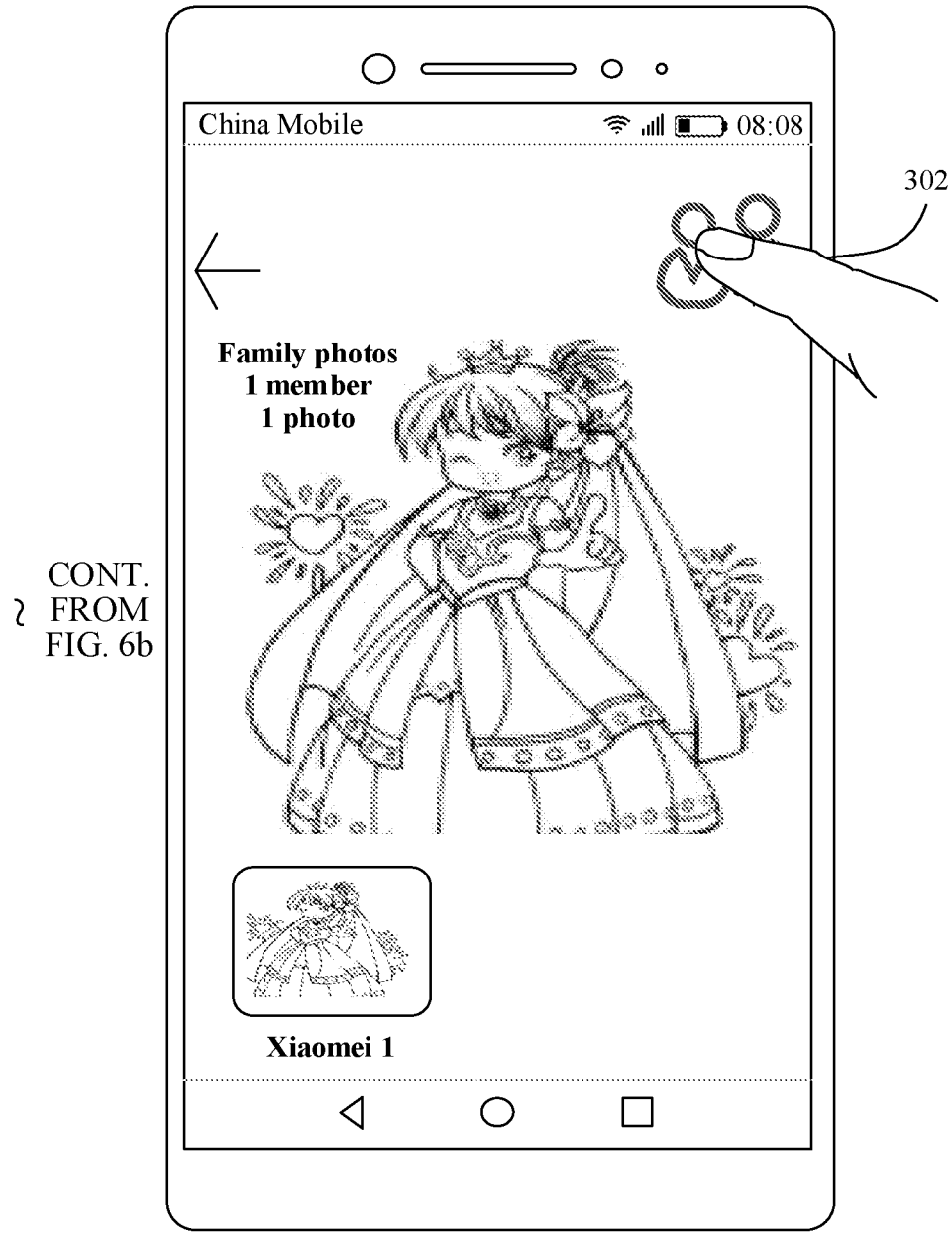

For example, referring to FIG. 6a to FIG. 6c, when the electronic device 1 detects an operation (for example, a tap operation) performed by the user 1 on the suspend button "+" 204 in FIG. 5d, in response to the operation, the electronic device 1 displays two controls shown in FIG. 6a: an album and a camera. Referring to FIG. 6b, when the user selects the album 300, the electronic device 1 displays a photo list in the album. When the user 1 selects a first photo 301 from the album list, the electronic device 1 generates a group "family photos" shown in FIG. 6c. A background photo in FIG. 6c is a thumbnail of the first photo 301 selected by the user, and mark information indicates that the family photo currently includes only one member and one photo, in other words, only the user 1 (a nickname of the user 1 is Xiaomei) and the thumbnail of the first photo 301.

Figure 7A:
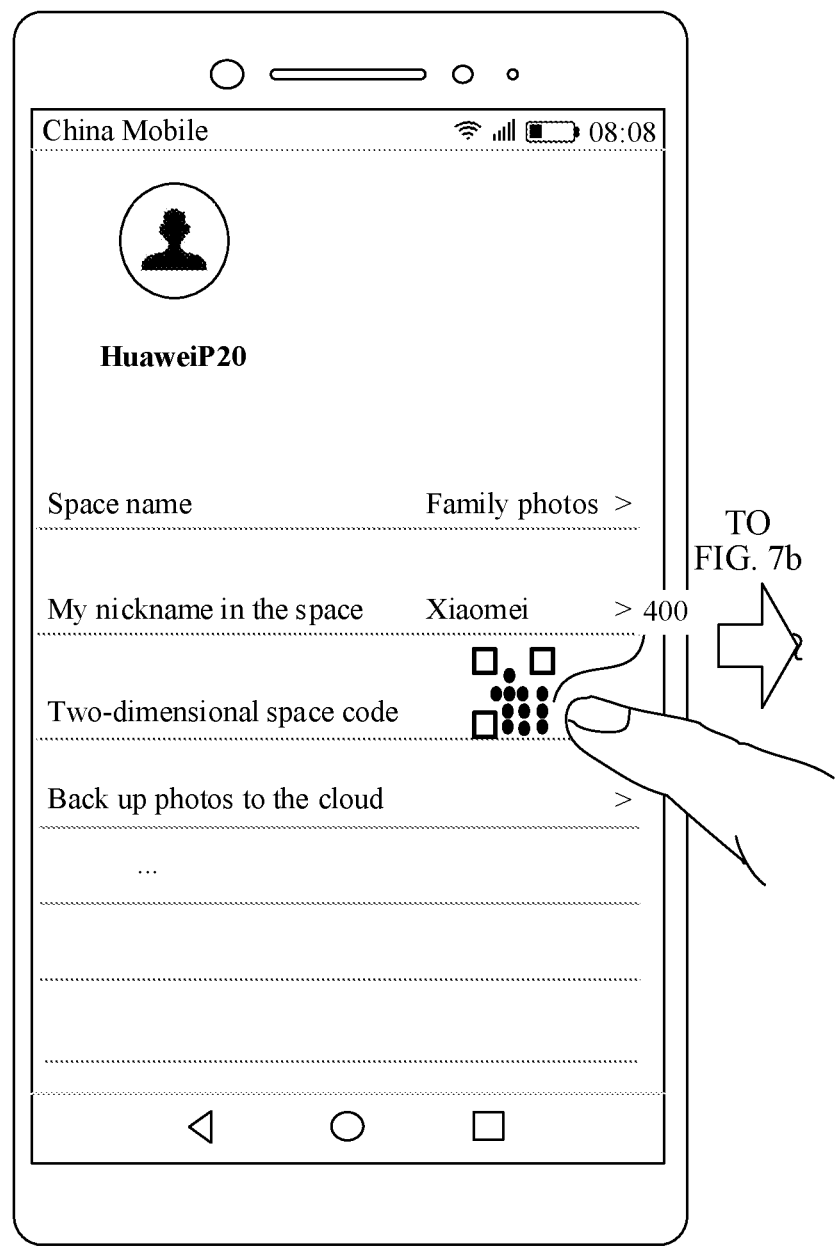
FIG. 7a and FIG. 7b are a schematic diagram of another group of interfaces according to an embodiment of this application.
Figure 7B:

In a first scenario, when the user 1 creates the group "family photos", two-dimensional code information of the group may be automatically generated in group information. Referring to FIG. 7a and FIG. 7b, when the electronic device 1 detects an operation (for example, a tap operation) performed by the user 1 on a group button 303 in FIG. 6c, in response to the operation, the electronic device 1 displays list information in the group information shown in FIG. 7a. FIG. 7a includes one group member (that is, the electronic device of the user 1 named huaweiP20), a space name "family photos", the nickname Xiaomei of the user 1 in the space, a two-dimensional space code, a "photo backup to cloud" option, and the like. When the user 1 selects the two-dimensional space code option 400, the electronic device 1 displays a two-dimensional space code information interface shown in FIG. 7b. When the user 1 presents a two-dimensional code shown in FIG. 7b to another user 2, an electronic device 2 used by the user 2 may download the family space application, and then scan the two-dimensional code by using the "invite or join" option, to select to join the group "family photos".

Figure 8A:
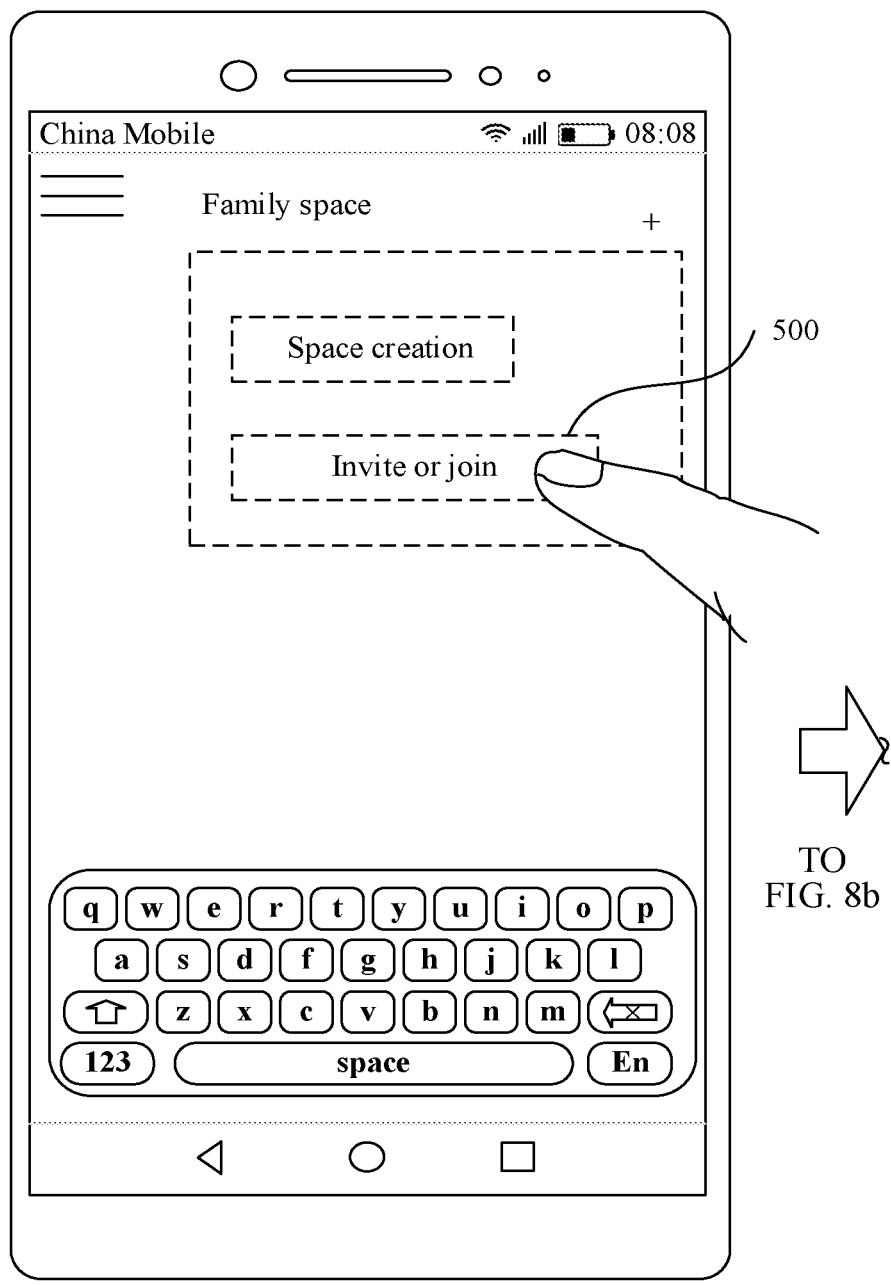
FIG. 8a to FIG. 8c are a schematic diagram of another group of interfaces according to an embodiment of this application.
Figure 8B:
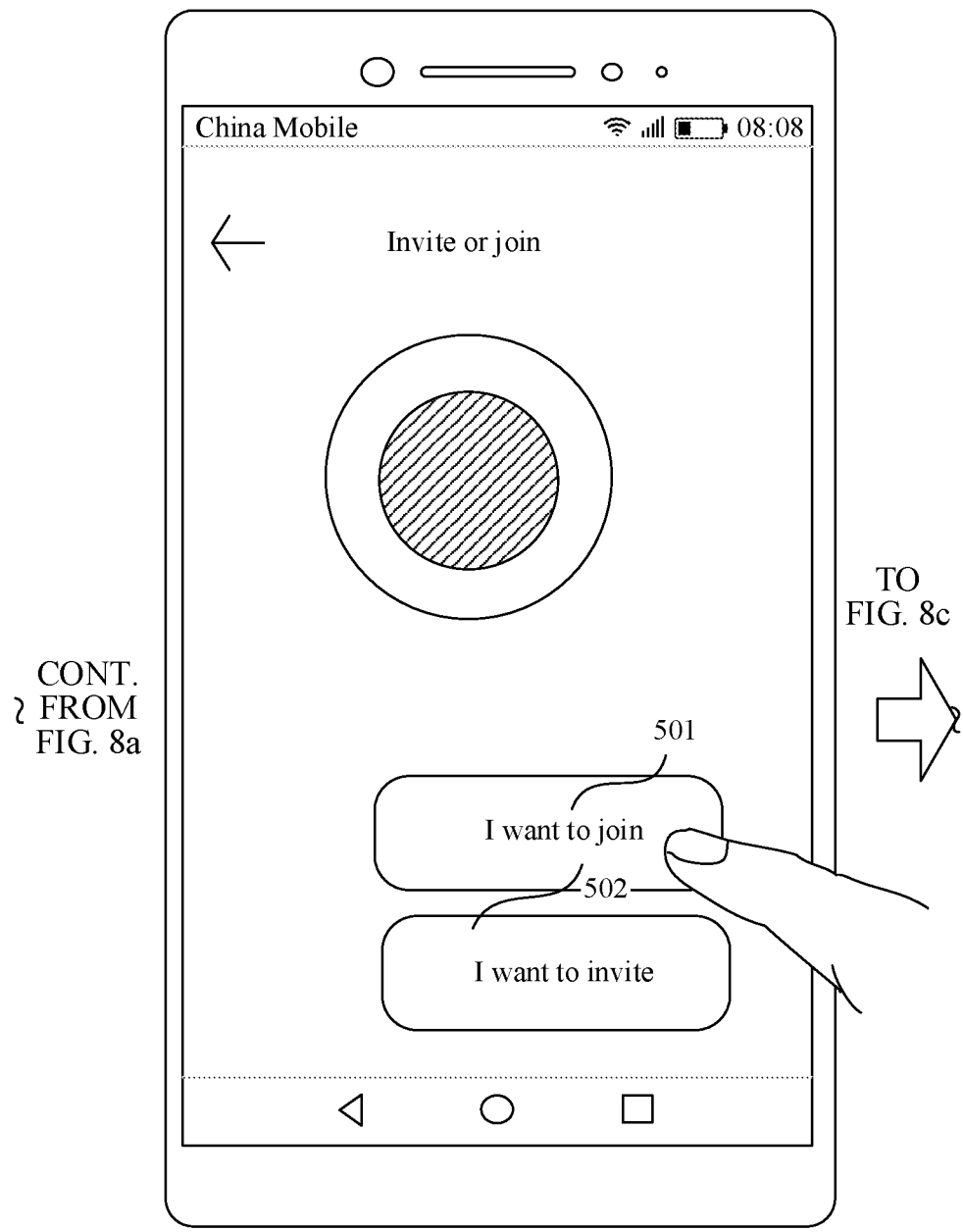
Figure 8C:
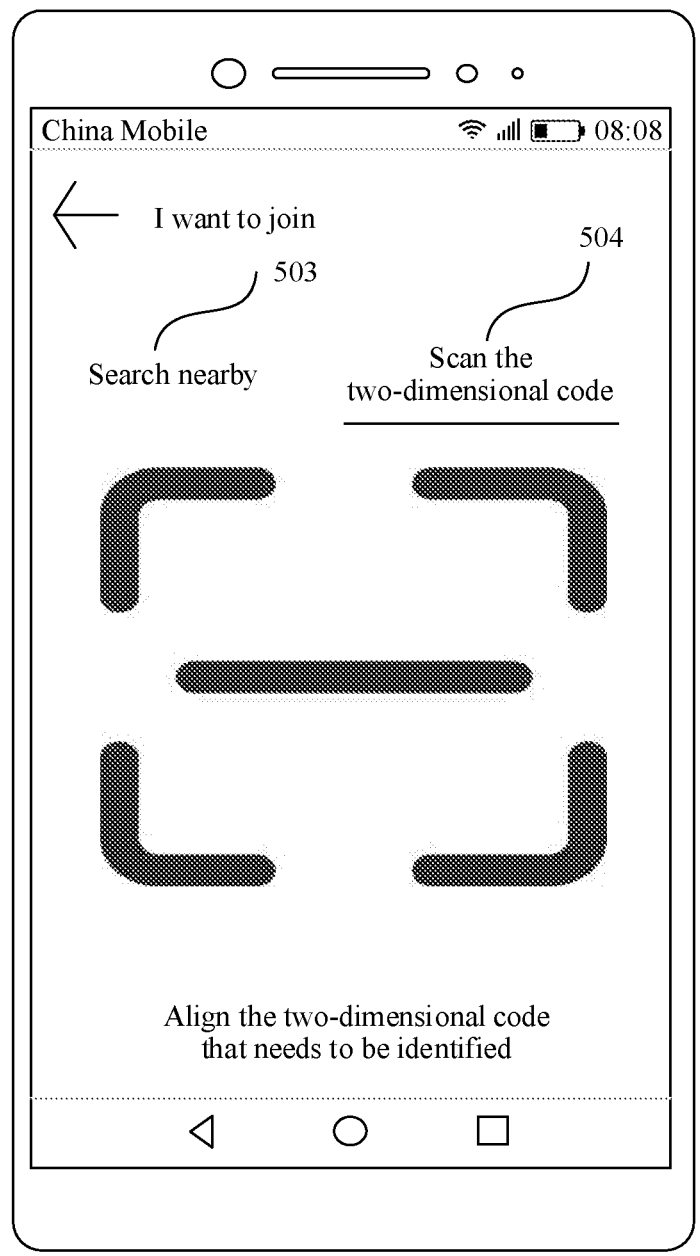

For example, in Manner 1, referring to FIG. 8a to FIG. 8c, after the electronic device 2 of the user 2 downloads and installs the family space application, when the electronic device 2 detects an operation (for example, a tap operation) performed by the user 2 on an "invite or join" option 501 in FIG. 8a, in response to the operation, the electronic device 2 displays an interface shown in FIG. 8b, and the interface includes two options: an "I want to join" option 501 and an "I want to invite" option 502. Referring to FIG. 8c, when the electronic device 2 detects an operation (for example, a tap operation) performed by the user 2 on the "I want to join" option 501 in FIG. 8b, in response to the operation, the electronic device 2 displays an interface shown in FIG. 8c. FIG. 8c displays two options: a "search nearby" option 503 and a "scan the two-dimensional code" option 504. When the electronic device 2 detects an operation (for example, a tap operation) performed by the user 2 on the "scan the two-dimensional code" option 504 in FIG. 8c, in response to the operation, two-dimensional code scanning is started in FIG. 8c. When the user 2 aligns and scans the two-dimensional code in FIG. 7b, the user 2 may join in the group "family photos".

Figure 9A:
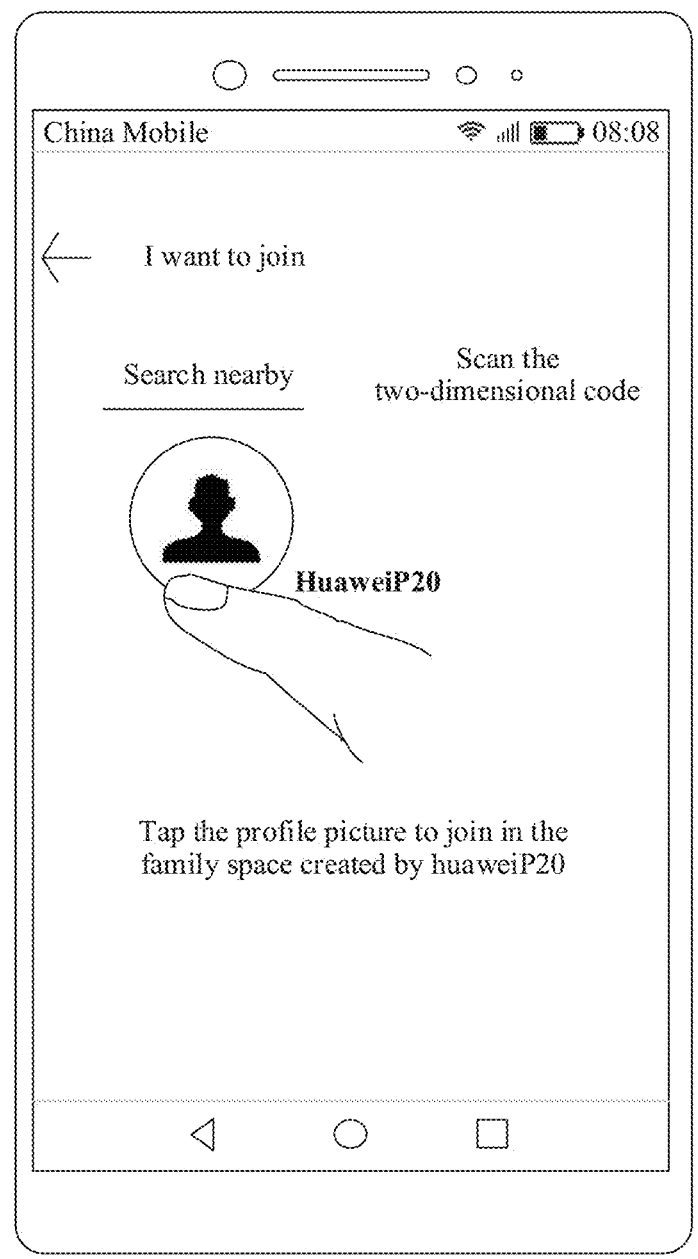
FIG. 9a and FIG. 9b are a schematic diagram of another group of interfaces according to an embodiment of this application.
Figure 9B:
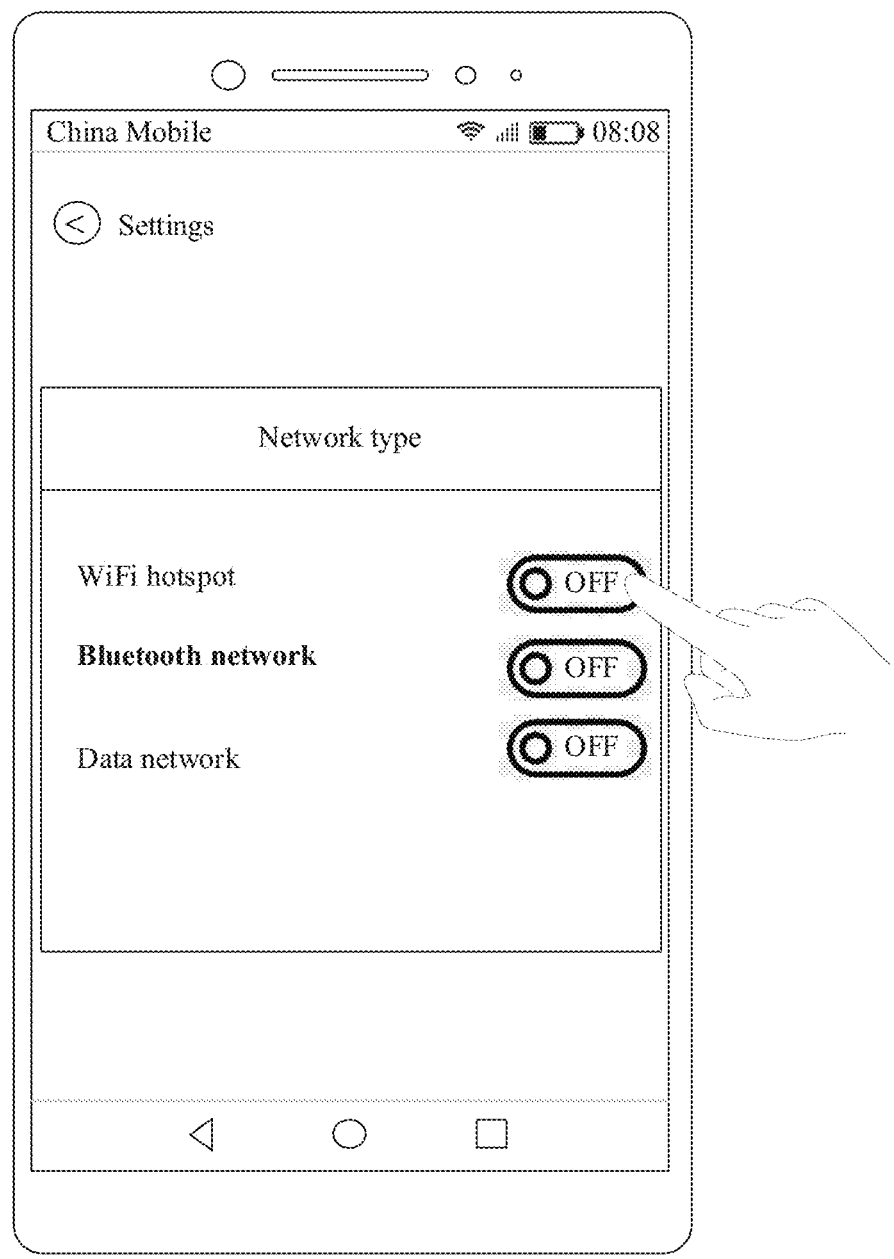

For example, in Manner 2, referring to FIG. 9a and FIG. 9b, when the electronic device 2 detects an operation (for example, a tap operation) performed by the user 2 on the "search nearby" option 503 in FIG. 8c, in response to the operation, the electronic device 2 finds a nearby electronic device. For example, as shown in FIG. 9a, the electronic device 1 named huaweiP20 is found. After tapping a profile photo, the user may join in the family space "family photos" created by the electronic device 1 named huaweiP20. It should be noted that a manner in which the electronic device 2 finds a nearby electronic device may be but is not limited to a short-distance network connection manner such as Bluetooth, a wifi hotspot, wifi direct, or NFC. For example, as shown in FIG. 9b, the user 2 may enter a settings menu to enable a network type of the wifi hotspot, and find a nearby electronic device by using the wifi hotspot. In addition, the user 2 may also select to enable the network type of the wifi hotspot by using a shortcut function control in a notification bar.

Figure 10A:
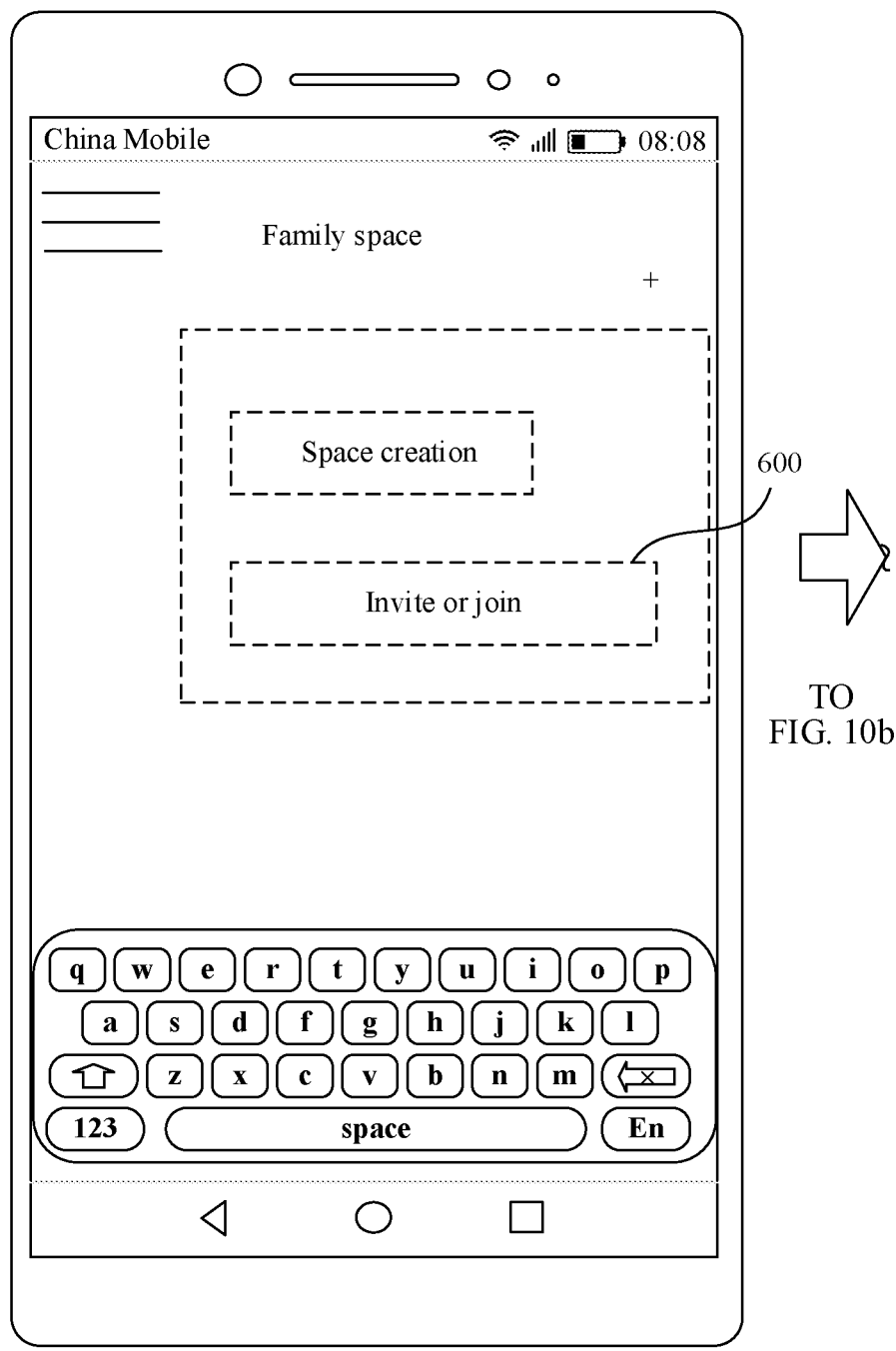
FIG. 10a to FIG. 10e are a schematic diagram of another group of interfaces according to an embodiment of this application.
Figure 10B:
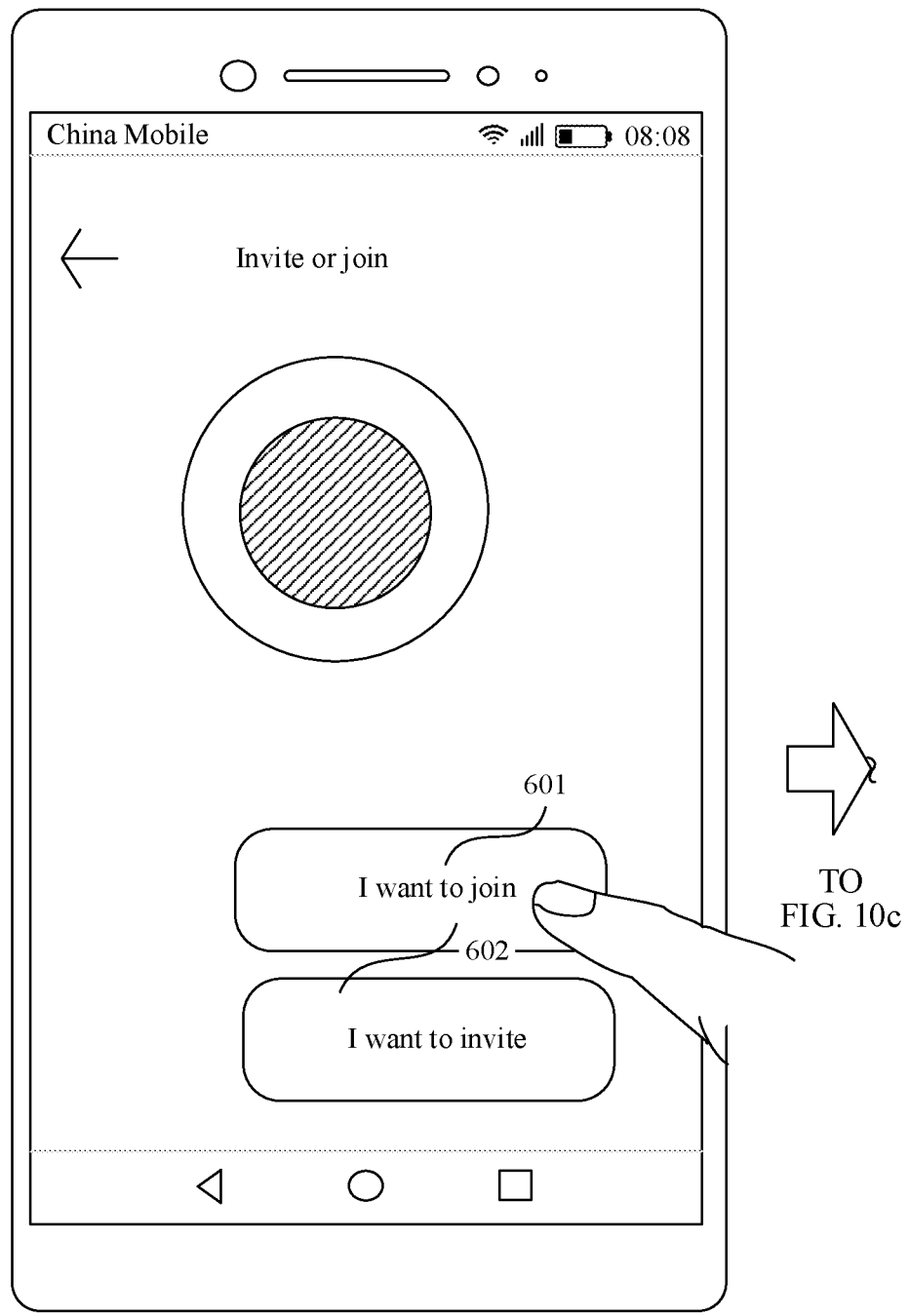
Figure 10C:
Figure 10D:
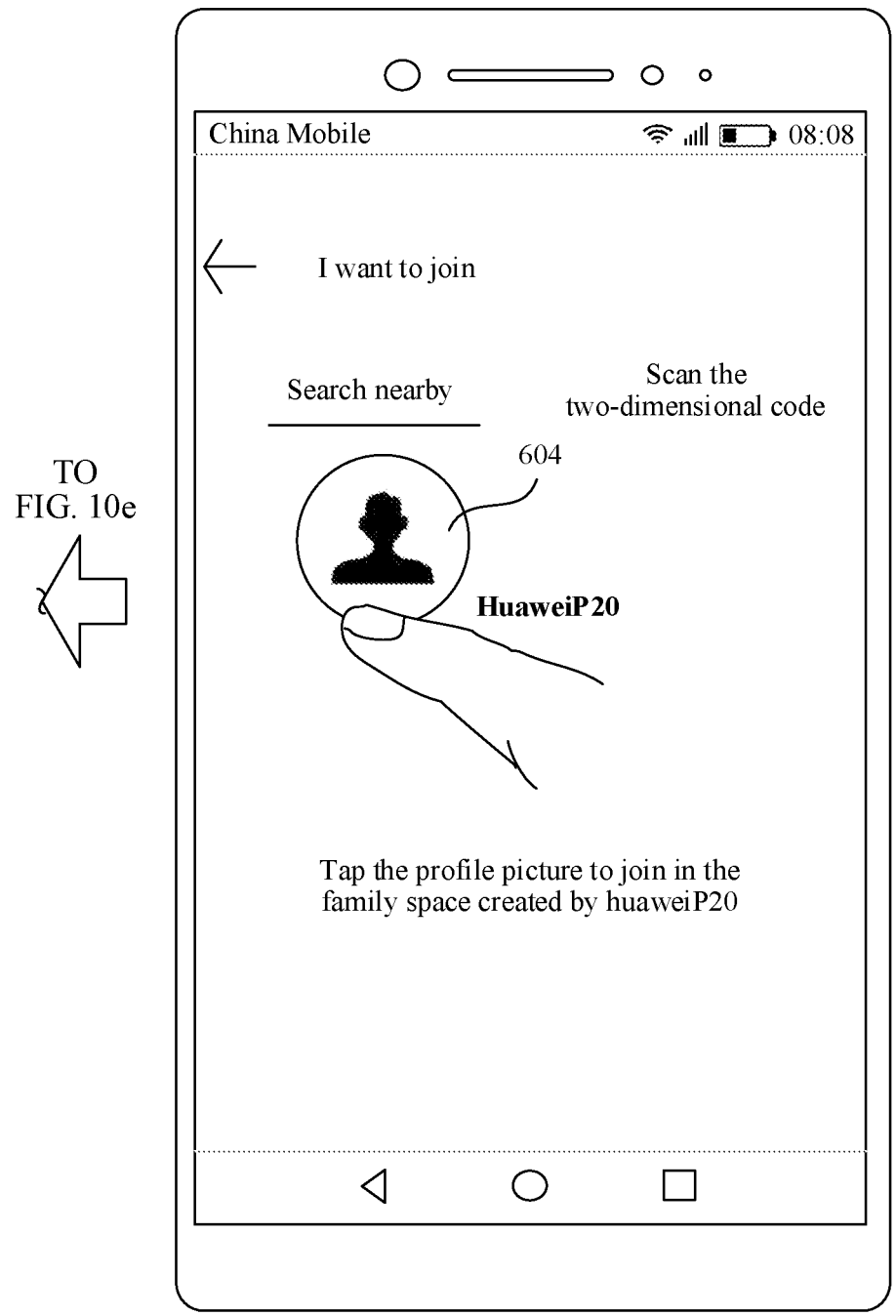
Figure 10E:
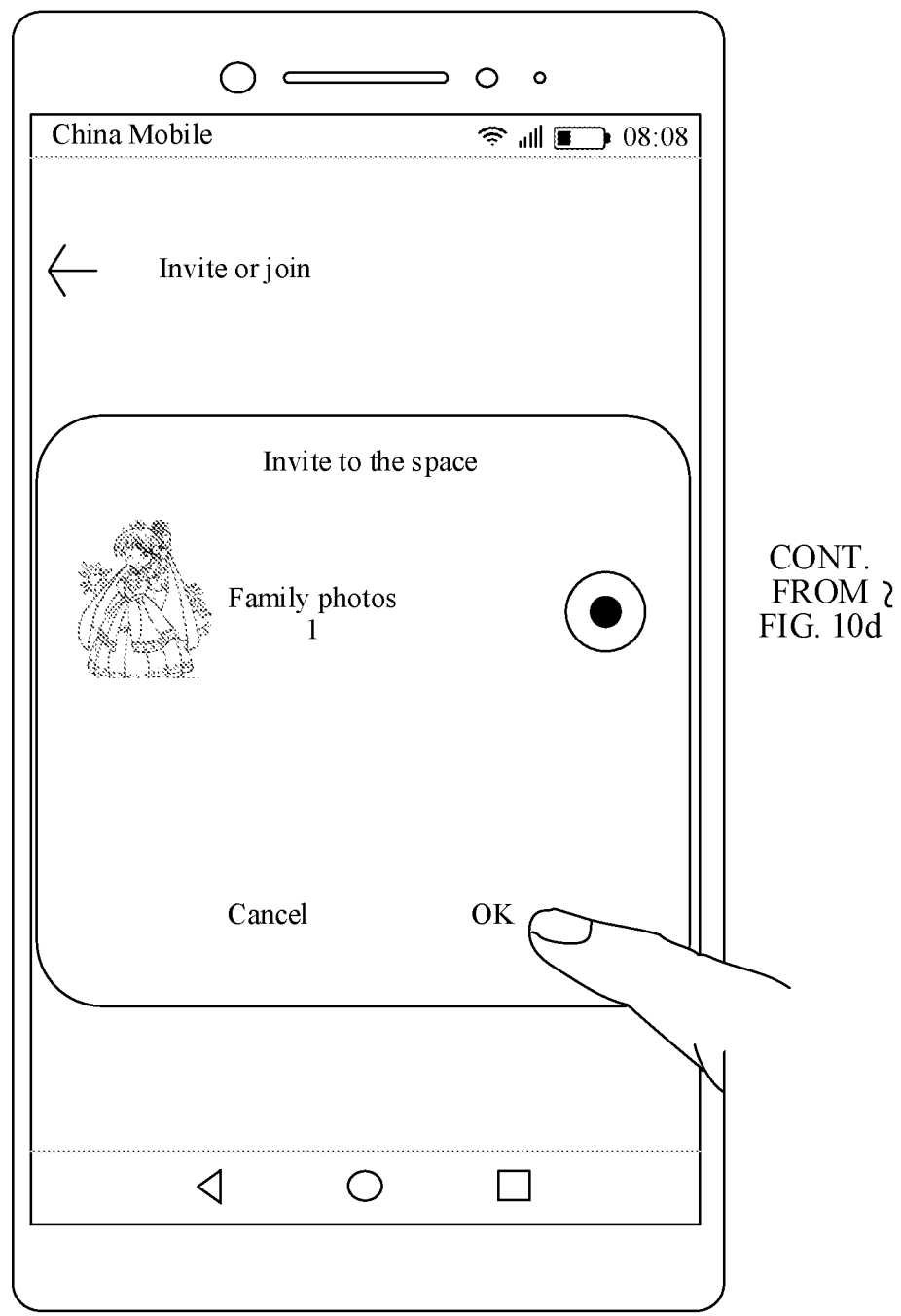

In a second scenario, as shown in FIG. 10a to FIG. 10e, after the user 1 creates the group "family photos", when the electronic device 1 detects an operation (for example, a tap operation) performed by the user 1 on an "invite or join" option 600 in FIG. 10a, in response to the operation, the electronic device 1 displays an interface shown in FIG. 10b, and the interface includes two options: an "I want to join" option 601 and an "I want to invite" option 602. Referring to FIG. 10c, when the electronic device 1 detects an operation (for example, a tap operation) performed by the user 1 on the "I want to invite" option 602 in FIG. 10b, in response to the operation, the electronic device 1 displays an interface shown in FIG. 6c, and the interface displays two options: a "search nearby" option 603 and a "two-dimensional space code" option 604. In Manner 1, when the electronic device 1 detects an operation (for example, a tap operation) performed by the user 1 on the "two-dimensional space code" option 604 in FIG. 10c, in response to the operation, a two-dimensional code of the space "family photos" is displayed. In Manner 2, when the electronic device 1 detects an operation (for example, a tap operation) performed by the user 1 on the "search nearby" option 603 in FIG. 10c, in response to the operation, the electronic device 1 finds the electronic device 2 named huaweiP10. As shown in FIG. 10d, when the electronic device 1 detects an operation (for example, a tap operation) performed by the user 1 on a profile photo in FIG. 10d, in response to the operation, the electronic device 1 displays an interface shown in FIG. 10e. FIG. 10e displays space "family photos" created by the electronic device 1. After the electronic device 1 detects a confirmation operation of the user 1, the electronic device 2 named huaweiP10 is invited to the space "family photos".

Figure 11A:
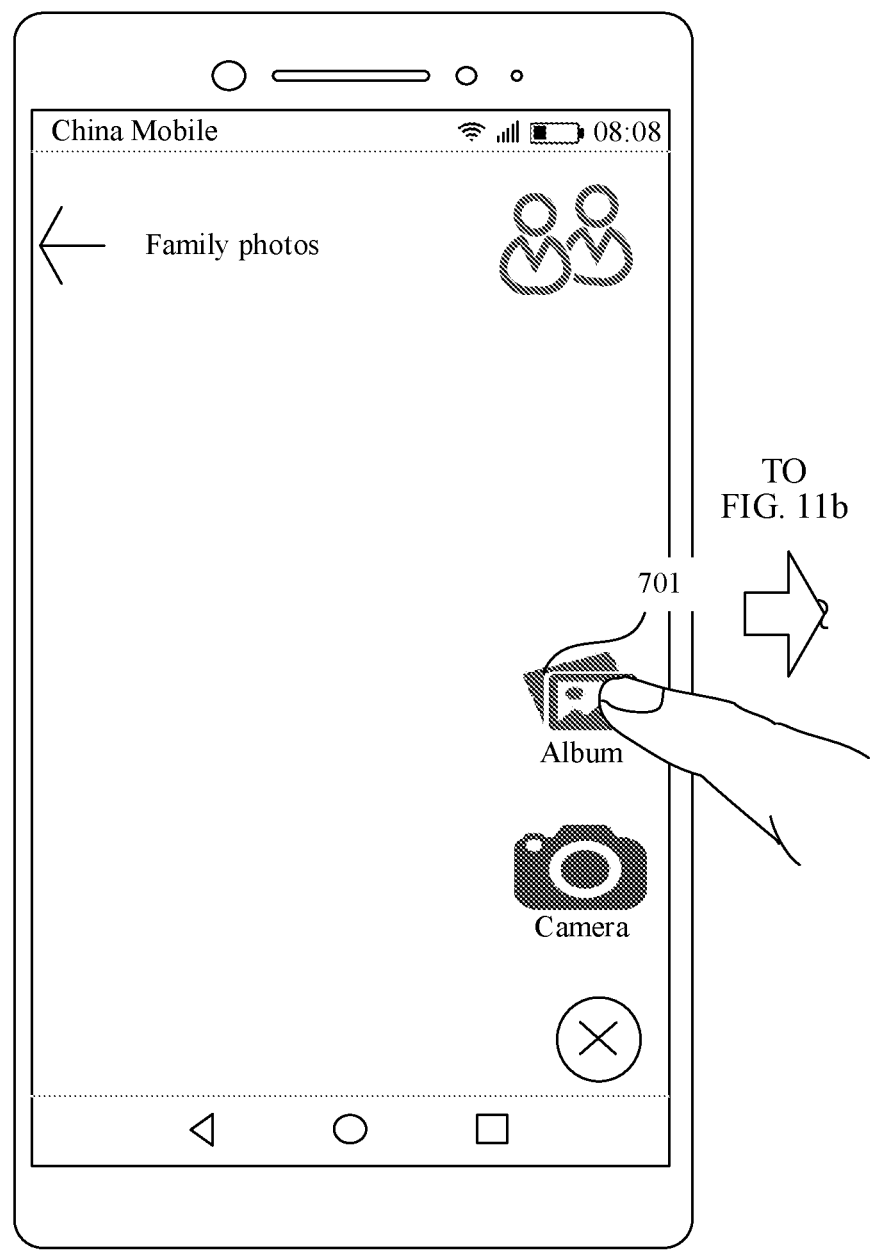
FIG. 11a to FIG. 11f are a schematic diagram of another group of interfaces according to an embodiment of this application.
Figure 11B:
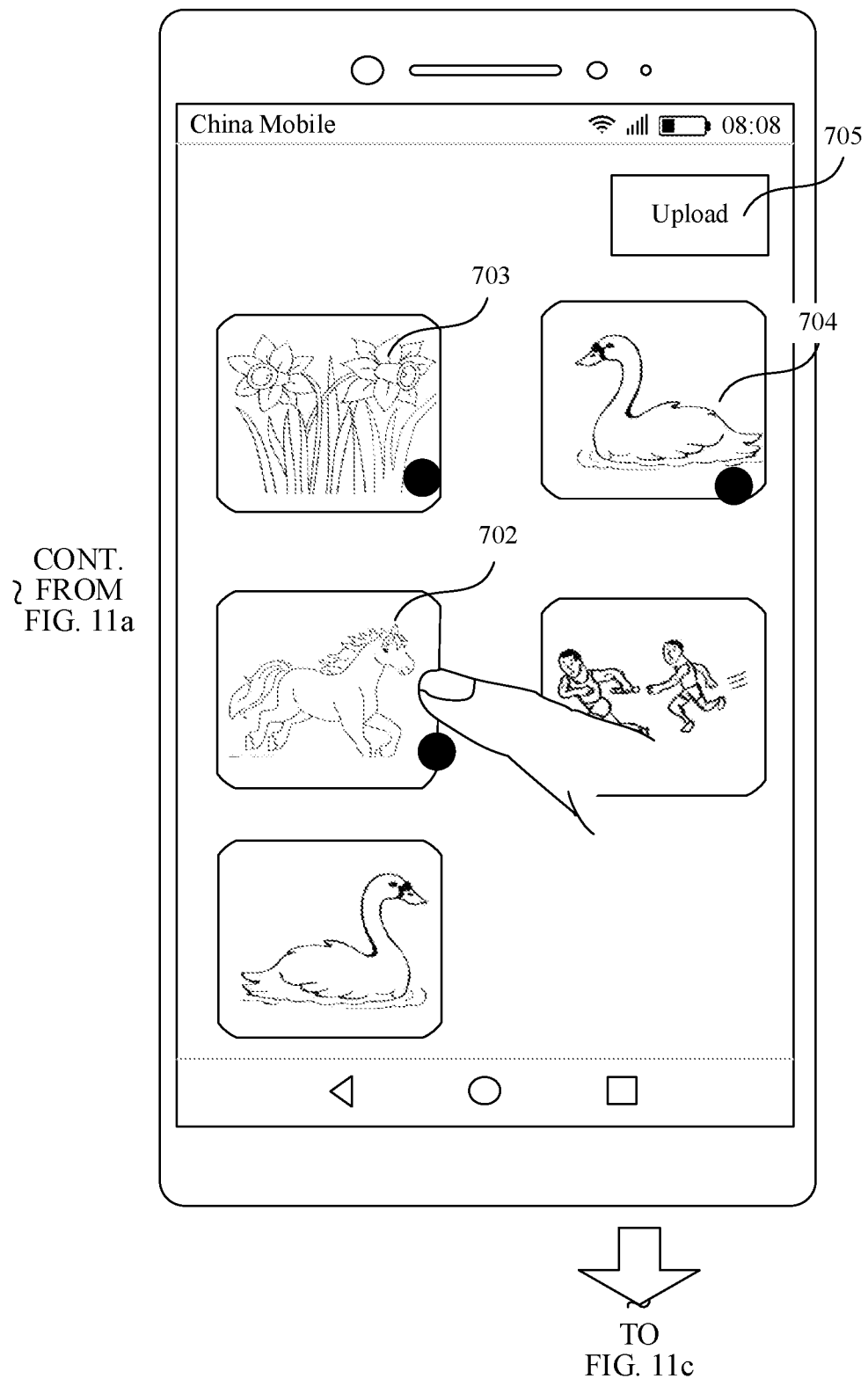
Figure 11C:
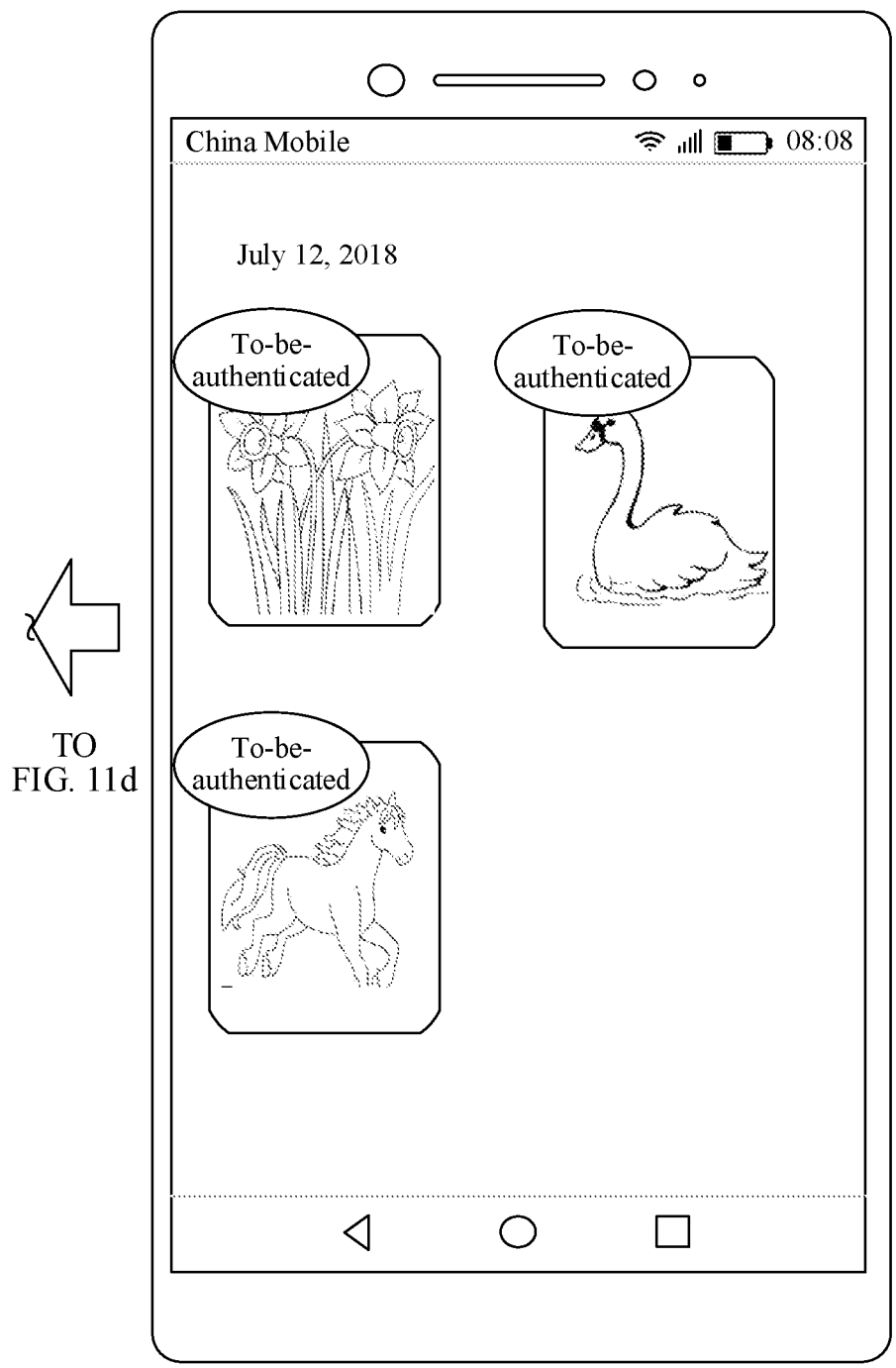

In a third scenario, after the user 2 joins in the group "family photos", for example, referring to FIG. 11a to FIG. 11f, when the electronic device 2 detects an operation (for example, a tap operation) performed by the user 2 on an album option in FIG. 11a, in response to the operation, the electronic device 2 displays a photo in the album application. As shown in FIG. 11b. After the user selects a second photo 702, a third photo 703, and a fourth photo 704 in FIG. 11b, in response to an operation (for example, a tap operation) performed by the user 2 on an upload option in FIG. 11b, the electronic device 2 generates hash (hash) values and thumbnails of the second photo 702, the third photo 703, and the fourth photo 704, and then uploads the hash values and thumbnails to the space "family photos". Referring to FIG. 11c, the electronic device 2 displays the thumbnails of the second photo 702, the third photo 703, and the fourth photo 704 that are uploaded by the user. A creator (that is, the electronic device 1) of the space "family photos" needs to perform authentication on the information uploaded by the electronic device 2. In other words, the electronic device 1 is equivalent to a central node. The information uploaded by the electronic device 2 can be actually uploaded to the space "family photos" only after the electronic device 1 is online and the authentication performed on the information uploaded by the electronic device 2 succeeds.

Figure 11D:
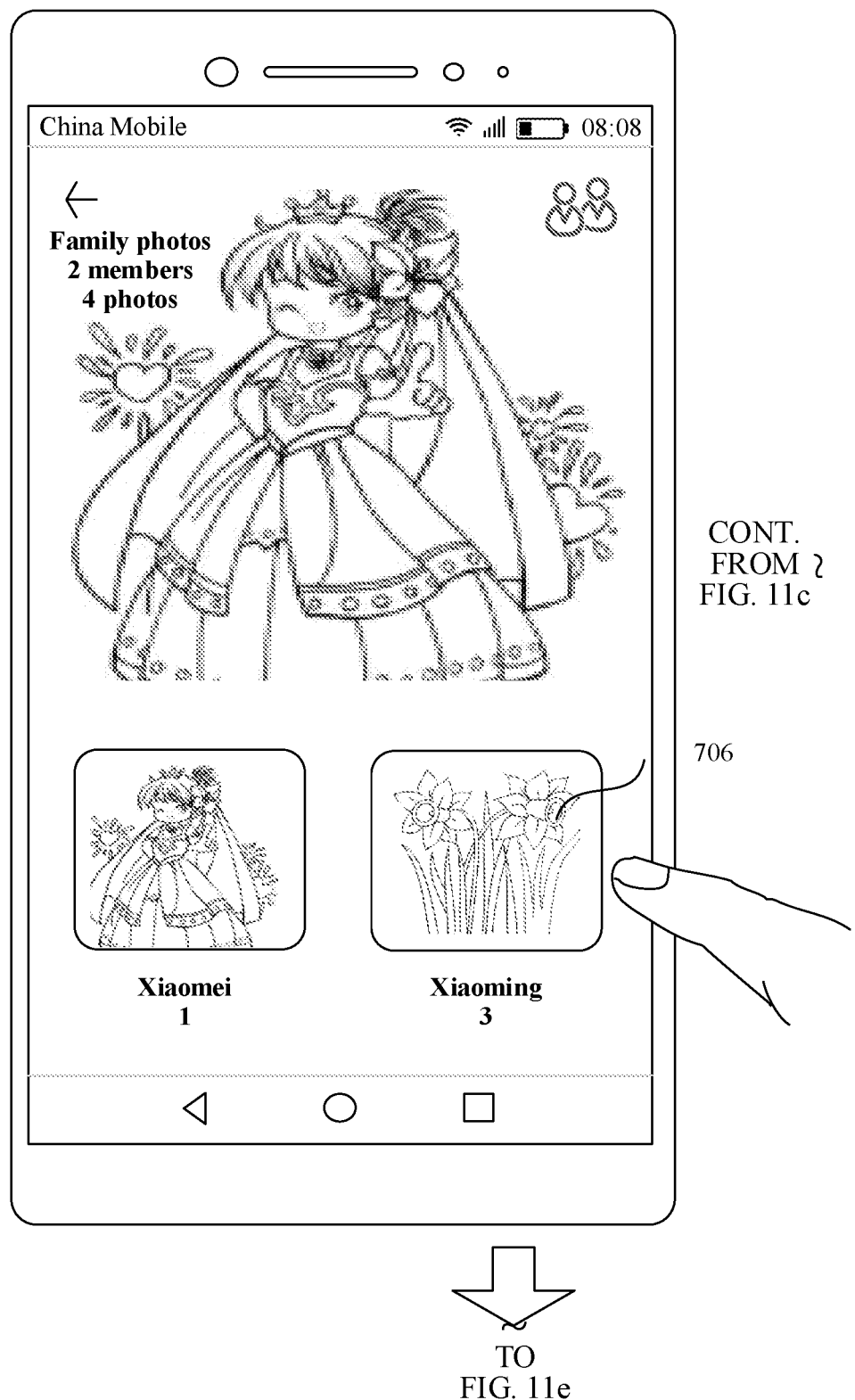
Figure 11E:
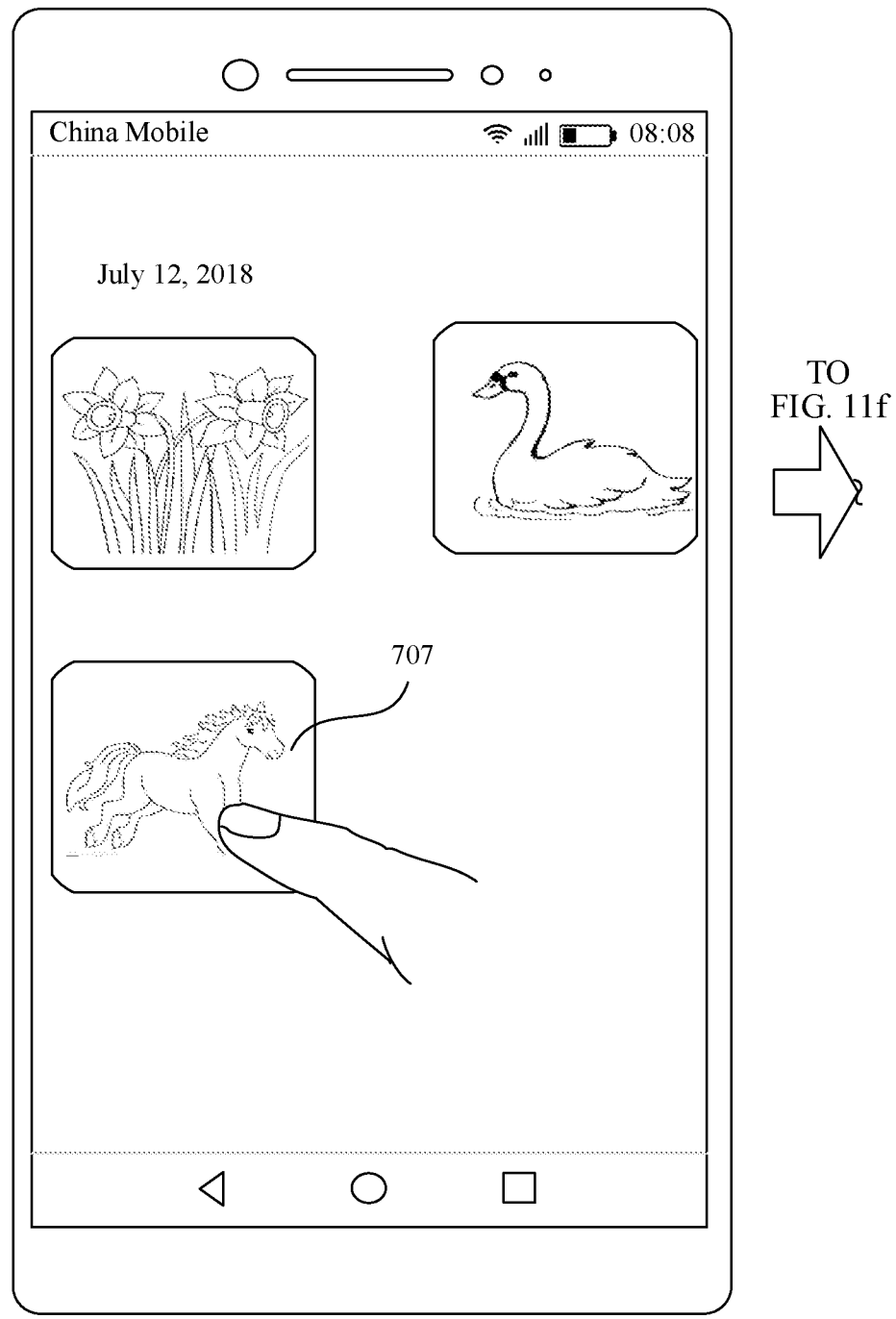
Figures 11E, 11F:
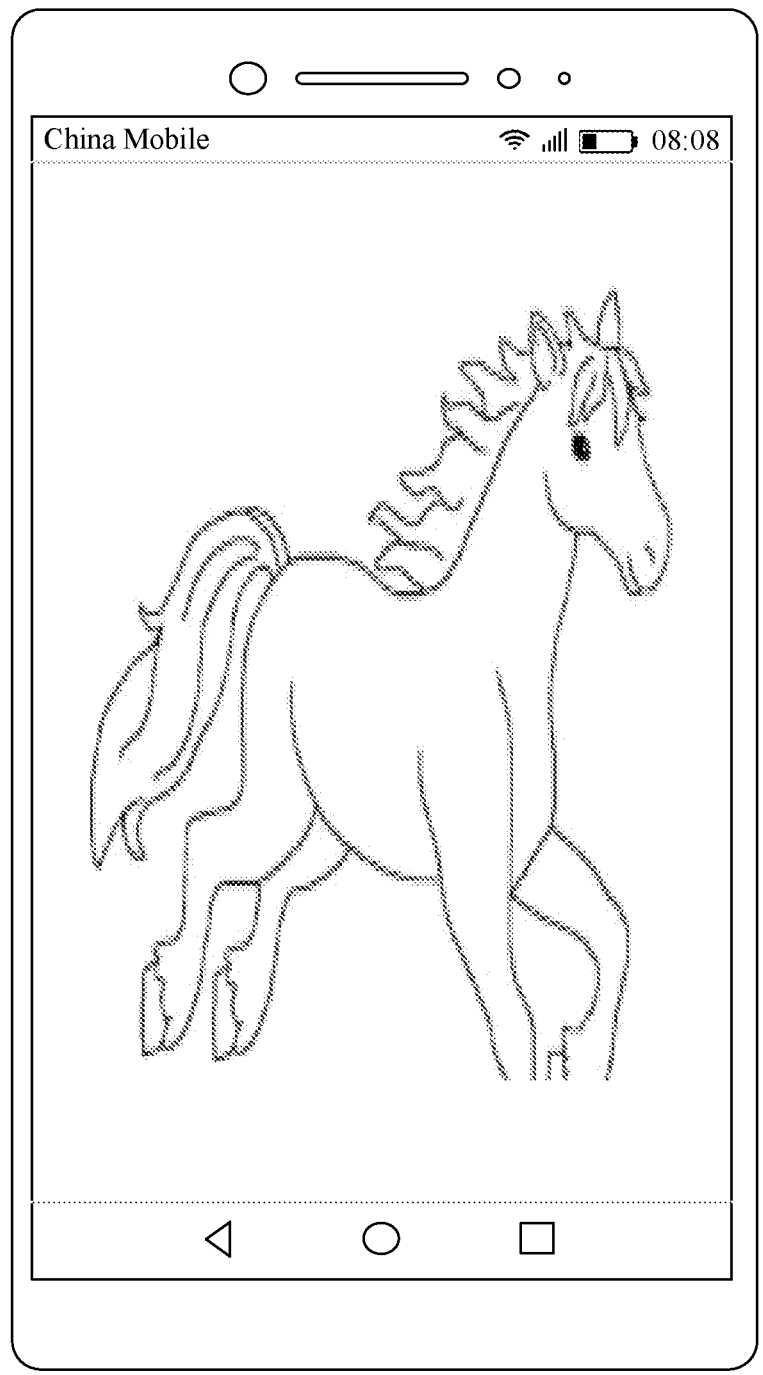

In a possible design, as shown in FIG. 11c, after the electronic device 2 uploads the second photo 702, the third photo 703, and the fourth photo 704, a first identifier is added to each of the thumbnails of the second photo 702, the third photo 703, and the fourth photo 704 in the electronic device 2, and the first identifier indicates that the photo is currently in a to-be-authenticated state. In other words, the second photo 702, the third photo 703, and the fourth photo 704 have not been authenticated by the electronic device 1. After the electronic device 1 accesses a network, if the electronic device 1 receives a request from the electronic device 2 for uploading the information about the hash values and the thumbnails of the second photo 702, the third photo 703, and the fourth photo 704, the electronic device 2 performs authentication on the request information. If the authentication succeeds, the information is uploaded to the space. As shown in FIG. 11d, the electronic device 2 and the electronic device 1 each display two members (Xiaomei and Xiaoming) in the current space "family photos", where Xiaomei is the nickname of the user 1 of the electronic device 1, and Xiaoming is a nickname of the user 2 of the electronic device 2. There is one piece of photo information for the member Xiaomei, and there are three pieces of photo information for the member Xiaoming. When the electronic device 1 detects an operation (for example, a tap operation) performed by the user on a "Xiaoming" option 706 in FIG. 11d, in response to the operation, the electronic device 1 displays an interface shown in FIG. 11e, and the interface displays the thumbnails of the three photos uploaded by the user 2 (Xiaoming) of the electronic device 2 to the space on Jul. 12, 2018. When the electronic device 1 detects an operation (for example, a tap operation) performed by the user on the thumbnail 707 of the second photo in FIG. 11e, in response to the operation, the electronic device 1 obtains original photo data of the second photo from the electronic device 2 based on the hash value of the second photo, and then displays the data on the interface shown in FIG. 11f. The electronic device 1 can obtain the original photo data of the second photo from the electronic device 2 because a short-distance network connection is established between the electronic device 1 and the electronic device 2, or because the electronic device 1 and the electronic device 2 turn on a data traffic switch and a data network connection is established between the electronic device 1 and the electronic device 2.

Figure 12A:
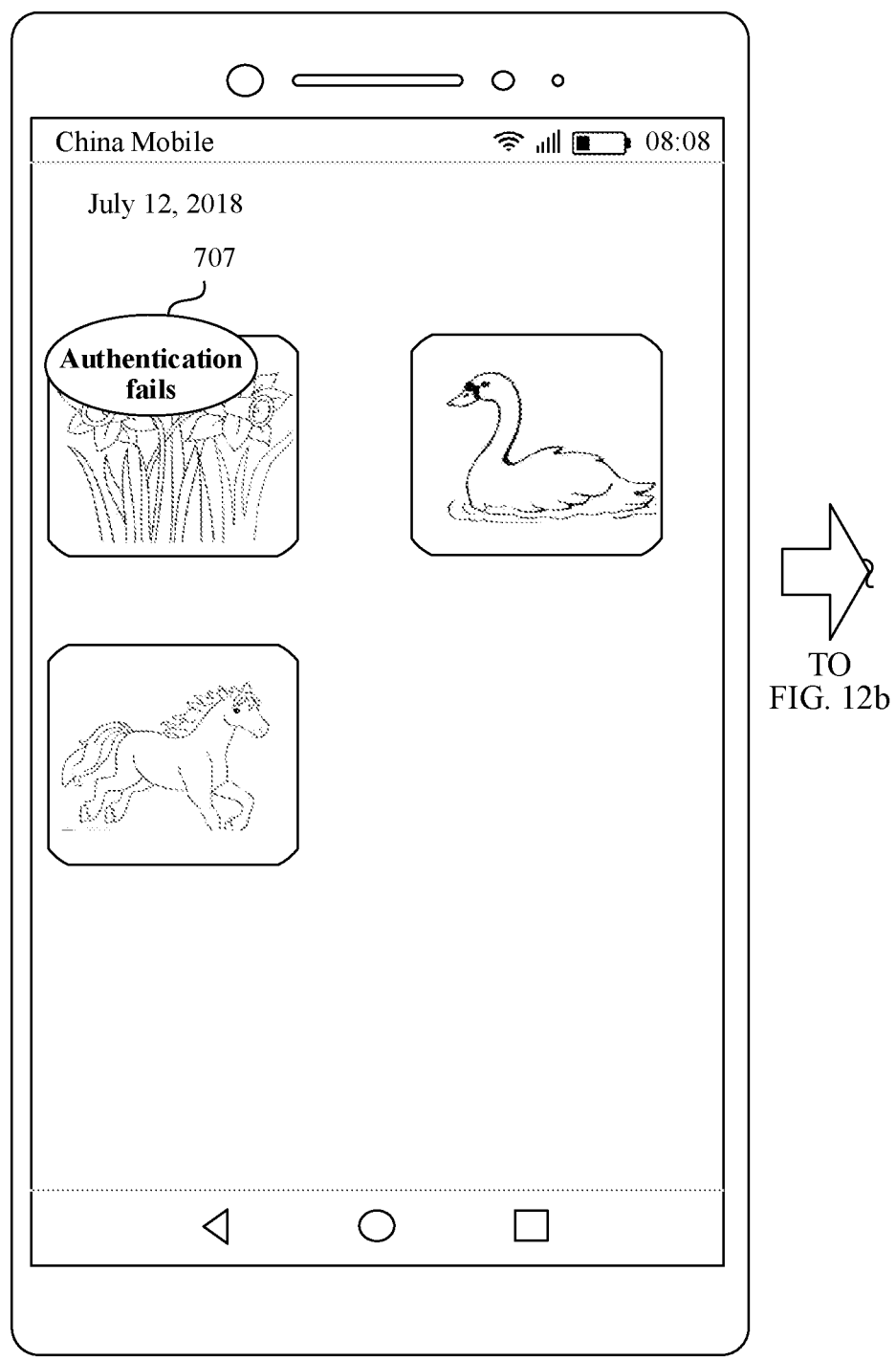
FIG. 12a and FIG. 12b are a schematic diagram of another group of interfaces according to an embodiment of this application.
Figure 12B:

In a possible design, as shown in FIG. 12a and FIG. 12b, if the electronic device 1 performs authentication on the information uploaded by the electronic device 2, because the third photo has a large amount of data, a finally generated authentication result may include that the authentication performed on the third photo fails and the authentication performed on the second photo and the fourth photo succeeds. As shown in FIG. 12a, member information of the electronic device 2 indicates that a second identifier of the third photo fails to be authenticated. Referring to FIG. 12b, after synchronous updating, the electronic device 2 and the electronic device 1 each show that there are two members (Xiaomei and Xiaoming) in the current space "family photos". There is one piece of photo information for the member Xiaomei, and there are two pieces of photo information for the member Xiaoming. The photo information for the member Xiaoming does not include the third photo that fails to be authenticated, but includes only the second photo and the fourth photo.

It should be noted that the authentication performed by the electronic device 1 on the third photo may fail because the network is unstable and the electronic device 1 does not receive an authentication request sent by the electronic device 2, or because the electronic device 1 considers that the third photo does not meet a sharing condition (for example, an indecent photo), or because the electronic device 1 may set a very small album capacity for each member. If the electronic device 1 determines that addition of the third photo exceeds a largest capacity of the electronic device 2, authentication performed on the electronic device 2 fails.

Figure 13A:
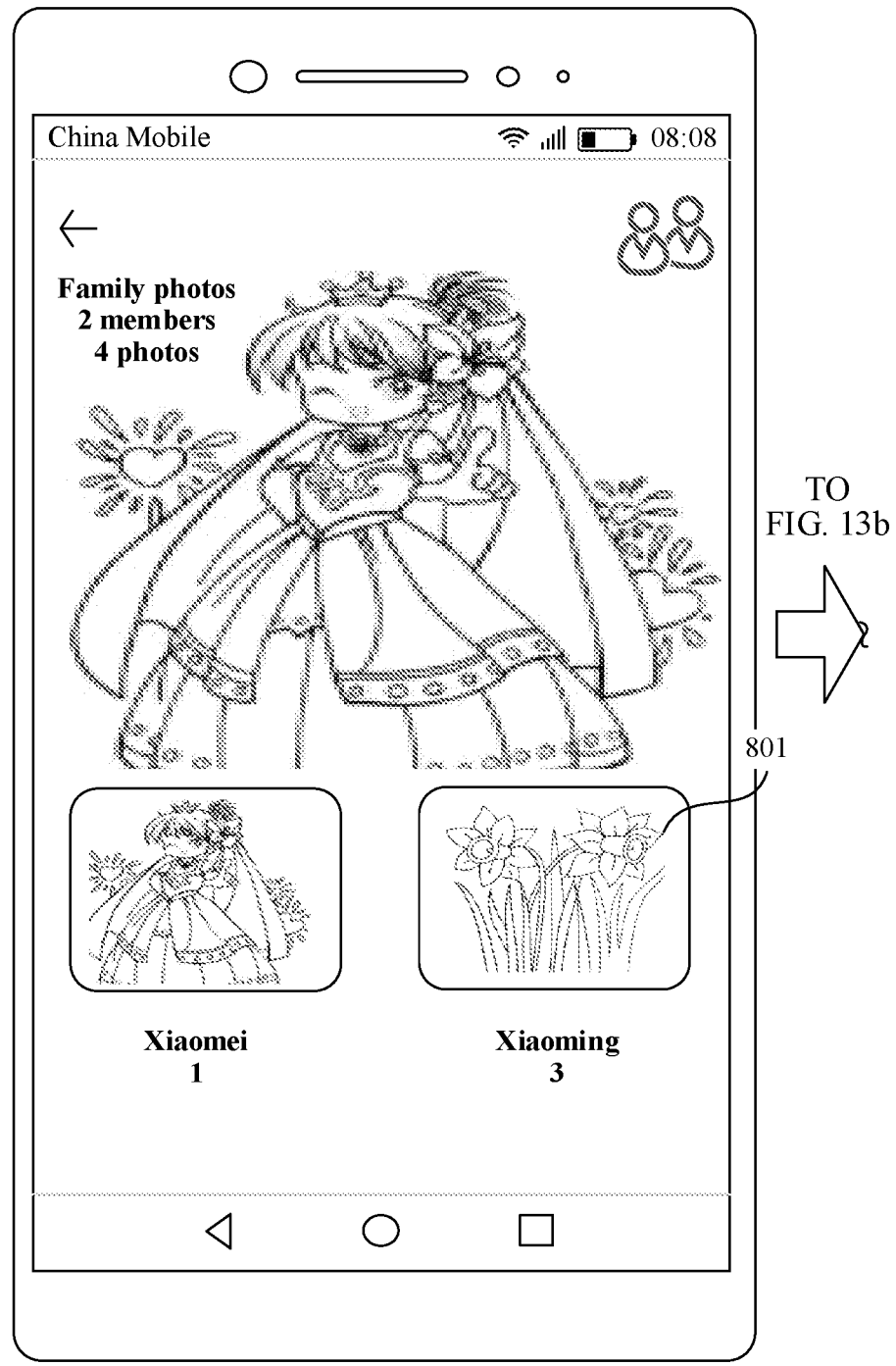
FIG. 13a to FIG. 13d are a schematic diagram of another group of interfaces according to an embodiment of this application.
Figure 13B:
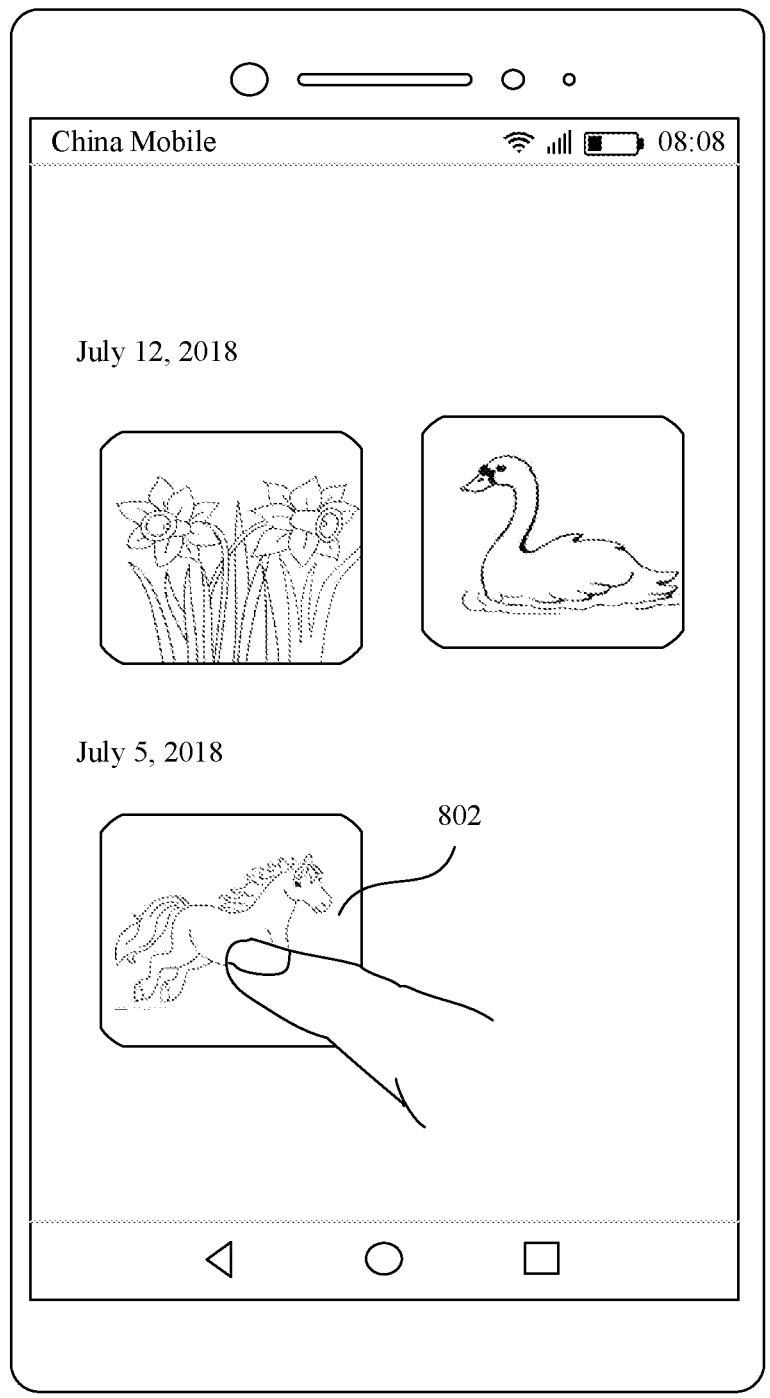
Figure 13C:
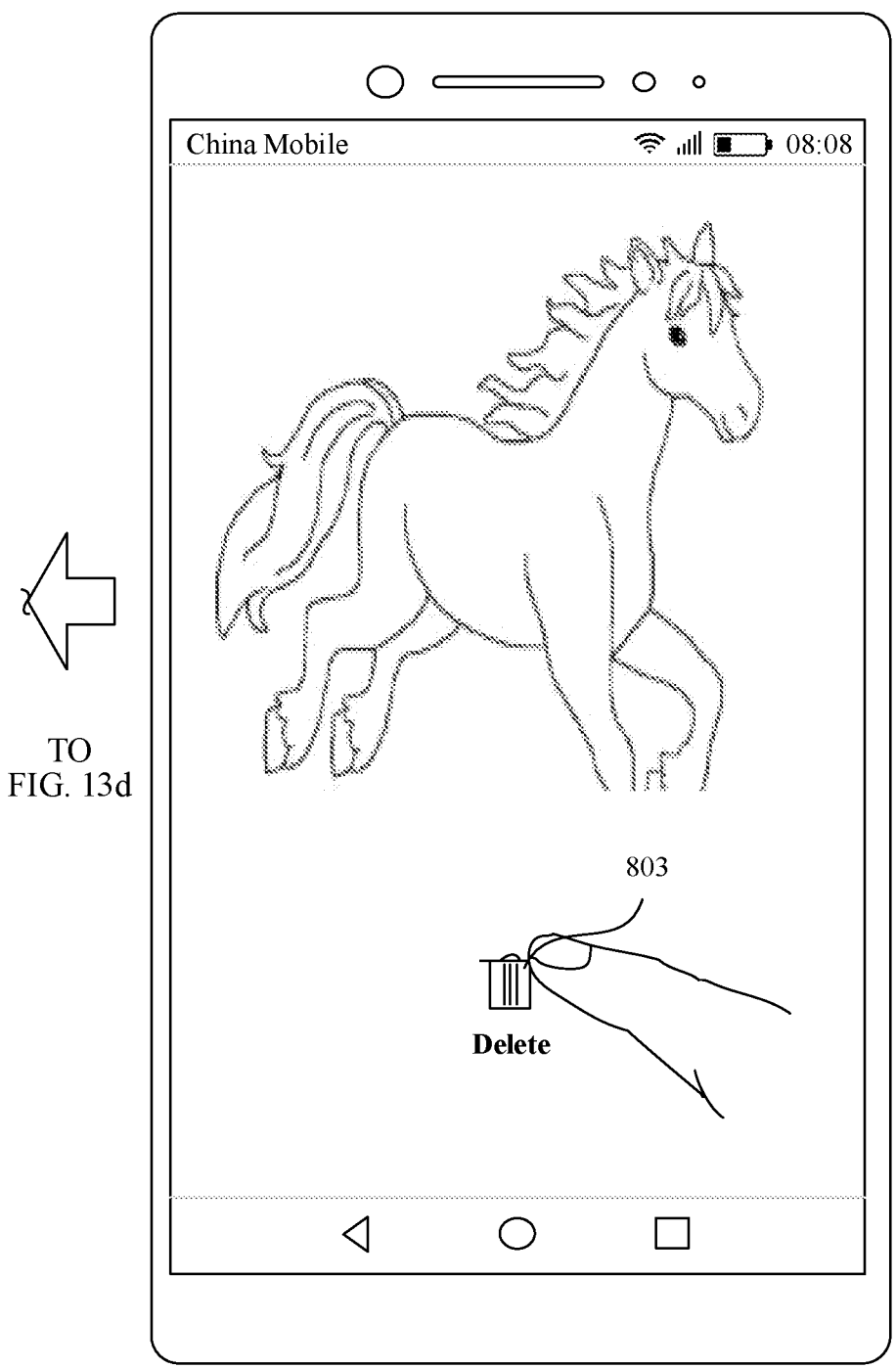

In a possible design, as shown in FIG. 13*a* to FIG. 13*d*, if the electronic device 2 detects an operation (for example, a tap operation) performed by the user 2 on an option 801 in FIG. 13*a*, in response to the operation, the electronic device 2 displays an interface shown in FIG. 13*b*. FIG. 13*b* shows that the user 2 uploads the second photo on Jul. 5, 2018, and uploads the third photo and the fourth photo on Jul. 12, 2017. When the electronic device 2 detects an operation (for example, a tap operation) performed by the user 2 on an option of a thumbnail 802 of the second photo in FIG. 13*b*, in response to the operation, the electronic device 2 obtains the original photo data information of the second photo from a database of the electronic device 2, and displays an interface shown in FIG. 13*c*. If the electronic device 2 detects an operation (for example, a tap operation) performed by the user 2 on a deletion control 803 in FIG. 13*c*, in response to the operation, the thumbnail 802 of the second photo of the electronic device 2 is removed from the space "family photos". Finally, the electronic device 1 and the electronic device 2 display an interface shown in FIG. 13*d*. To be specific, there are two members in the space "family photos", and a quantity of photos uploaded by Xiaoming is changed to 2.

Figure 13D:
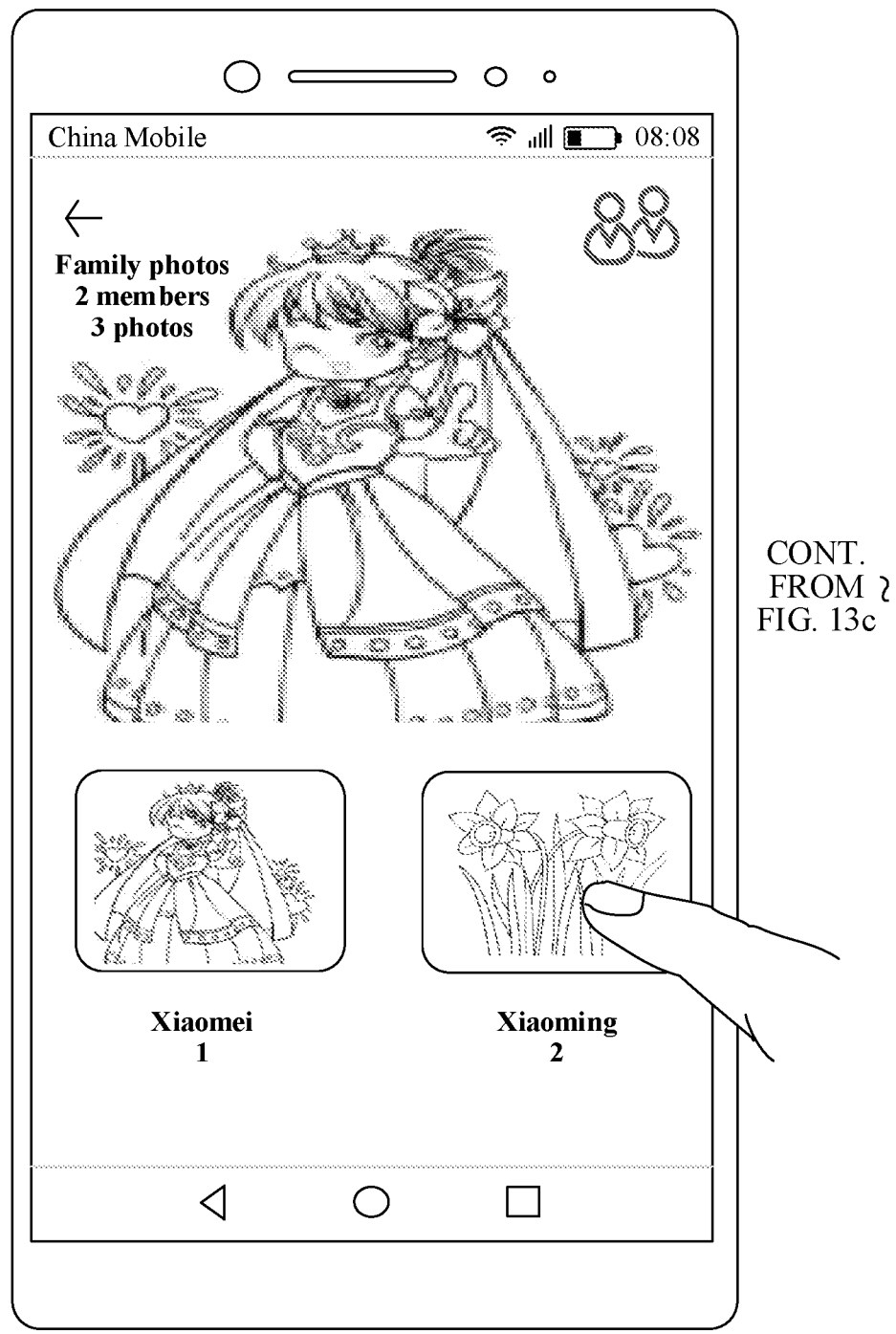

It should be noted that the "family photos" shown in FIG. 13*d* are classified based on member information. In addition, the "family photos" may further support classified displaying of the photos in the space based on a photo photographing place and a photo photographing time, or based on a person type and a scenery type. Figure examples are not listed one by one in the embodiments of this application for description.

Figure 14A:
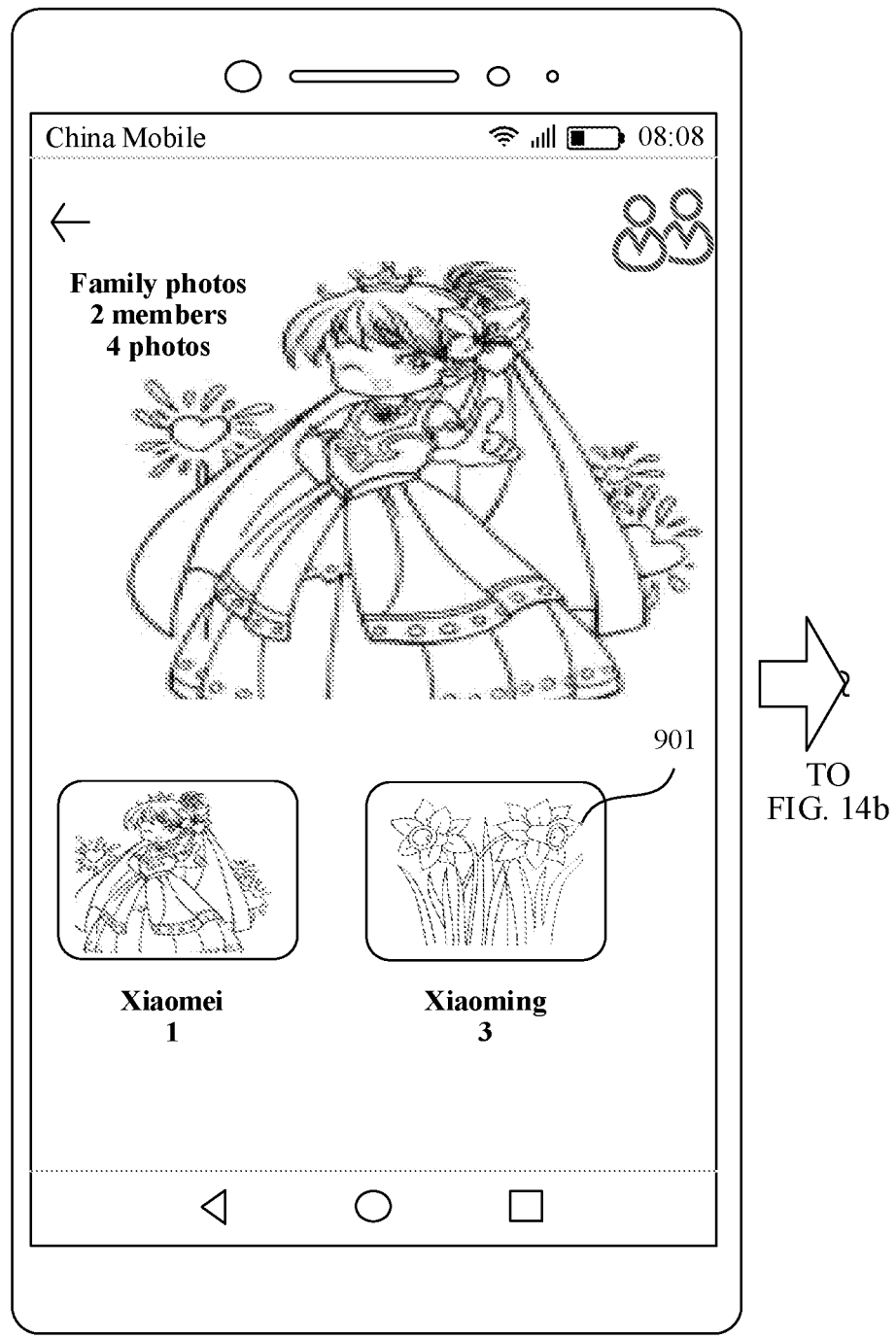
FIG. 14a to FIG. 14e are a schematic diagram of another group of interfaces according to an embodiment of this application.
Figure 14B:
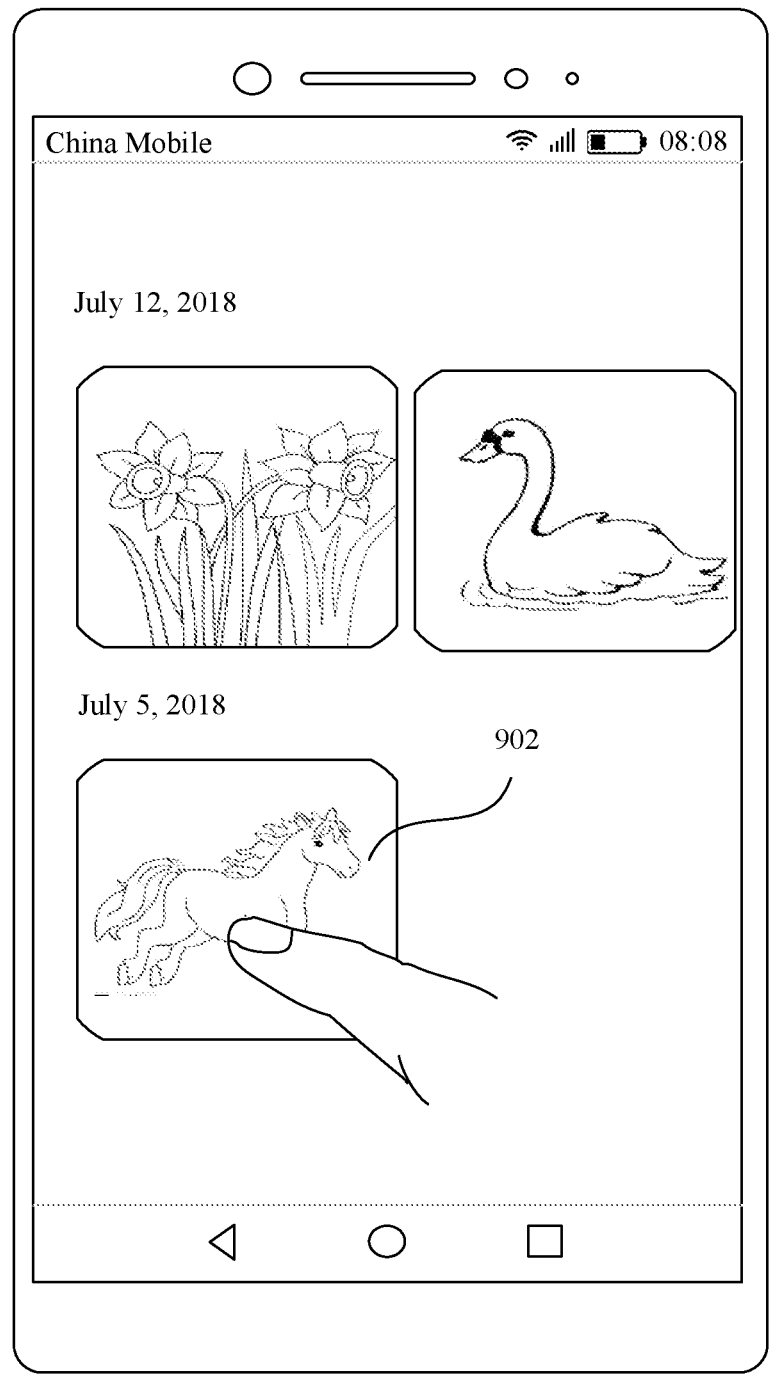

In a possible design, as shown in FIG. 14*a* to FIG. 14*e*, if the electronic device 1 detects an operation (for example, a tap operation) performed by the user 1 on an option 901 in FIG. 14*a*, in response to the operation, the electronic device 1 displays an interface shown in FIG. 14*b*. FIG. 14*b* shows that the user 2 uploads the second photo on Jul. 5, 2018, and uploads the third photo and the fourth photo on Jul. 12, 2017. When the electronic device 1 detects an operation (for example, a tap operation) performed by the user 1 on an option of a thumbnail 902 of the second photo in FIG. 14*b*, in response to the operation, the electronic device 1 obtains the original photo data information of the second photo from the electronic device 2 based on a hash value corresponding to the thumbnail 902, and displays an interface shown in FIG. 14*c*. If the electronic device 1 detects an operation (for example, a tap operation) performed by the user 1 on a deletion control 903 in FIG. 14*c*, in response to the operation, the thumbnail 902 of the second photo of the electronic device 1 is removed from the space "family photos", and the electronic device 2 displays an interface shown in FIG. 14*d*. To be specific, there are only two thumbnails for the member Xiaoming. However, the electronic device 1 displays an interface shown in FIG. 14*a*. After the electronic device 1 subsequently synchronizes data of all members in the space "family photos", the electronic device 1 displays the interface shown in FIG. 14*a*. In other words, the electronic device 1 can only temporarily delete another successful thumbnail in the group. Once data is synchronized subsequently, the deleted thumbnail may be restored.

In addition, the electronic device 2 may also back up, to the cloud, an original photo of a photo uploaded in the space. When the electronic device 1 detects an operation performed by the user 1 on the thumbnail 902, the electronic device 1 obtains, from the cloud, original photo data corresponding to the thumbnail 902, so as to display the original image on the interface shown in FIG. 14*a*.

Figures 14B, 14C, 14D:
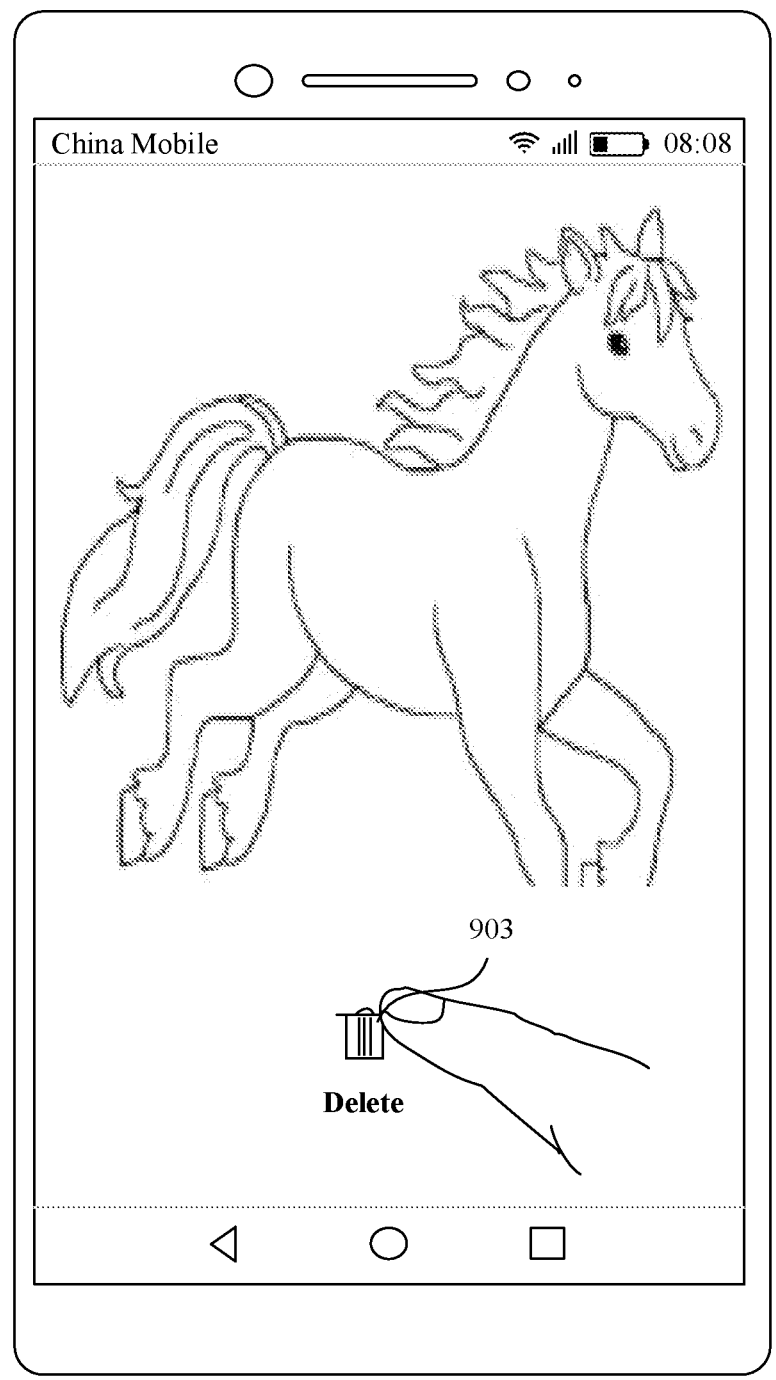
Figure 14D:
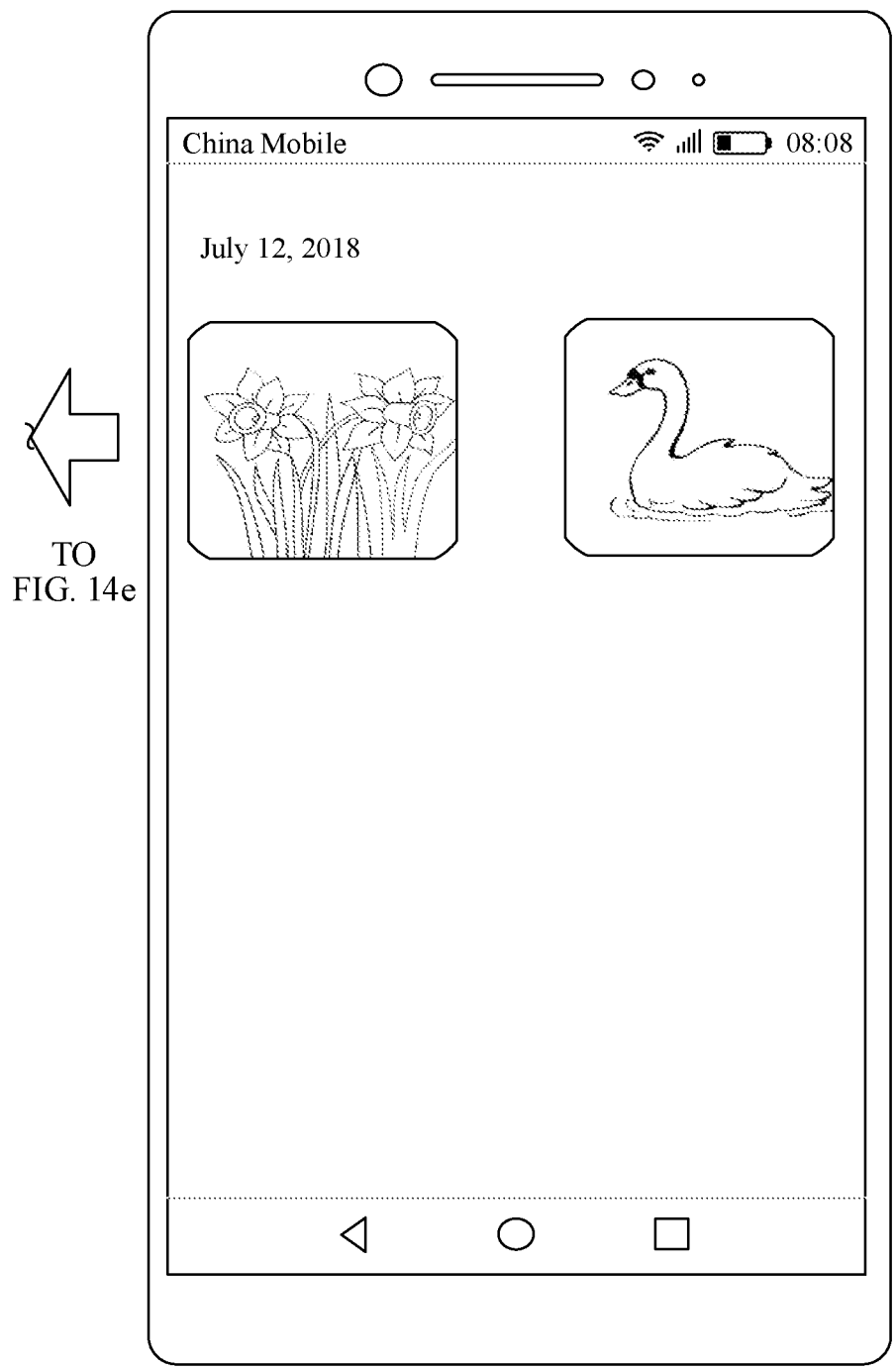
Figure 14E:
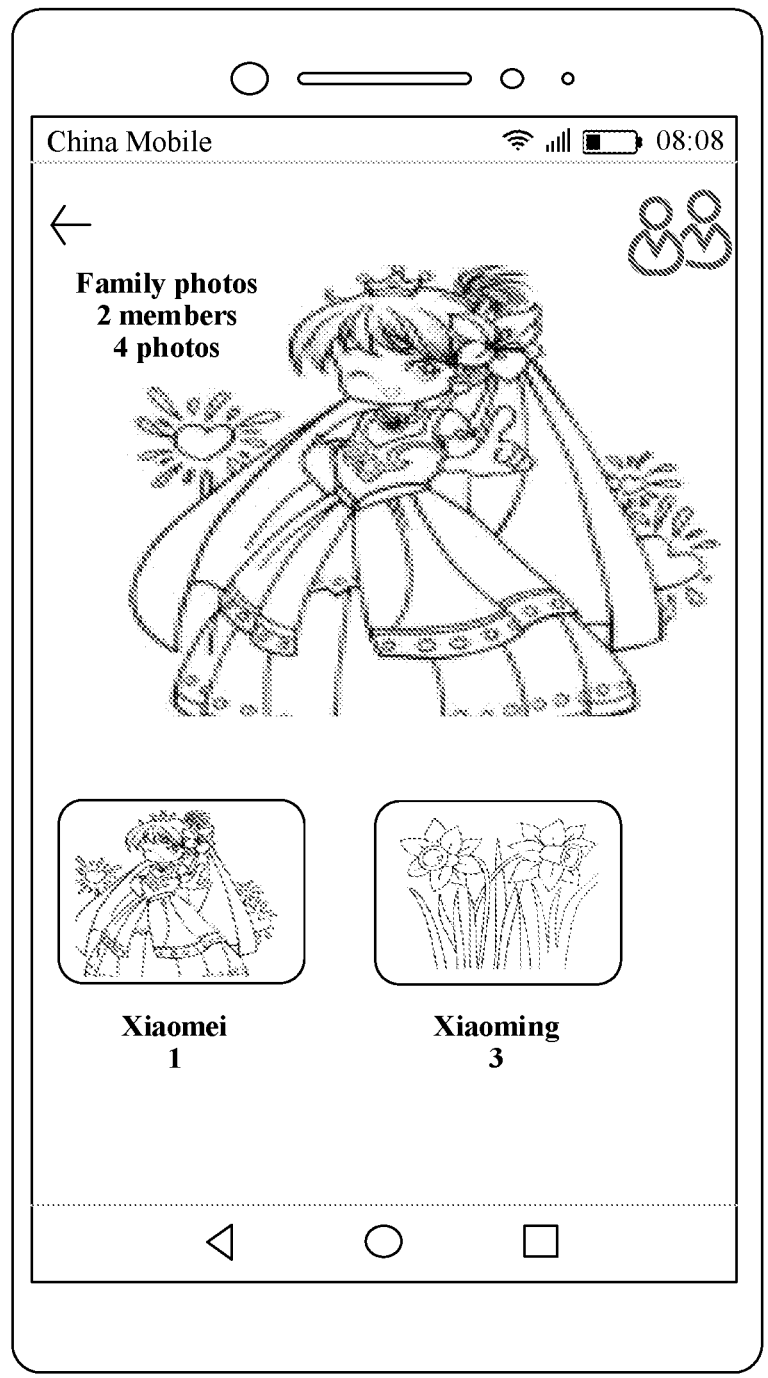

It should be noted that, in a possible implementation, when the electronic device 1 detects an operation (for example, a tap operation) performed by the user 1 on the option of the thumbnail 902 of the second photo in FIG. 14*b*, in response to the operation, the electronic device 1 obtains the original photo data information of the second photo from a cloud server based on the hash value corresponding to the thumbnail 902, and displays the interface shown in FIG. 14*c*.

Figure 15A:
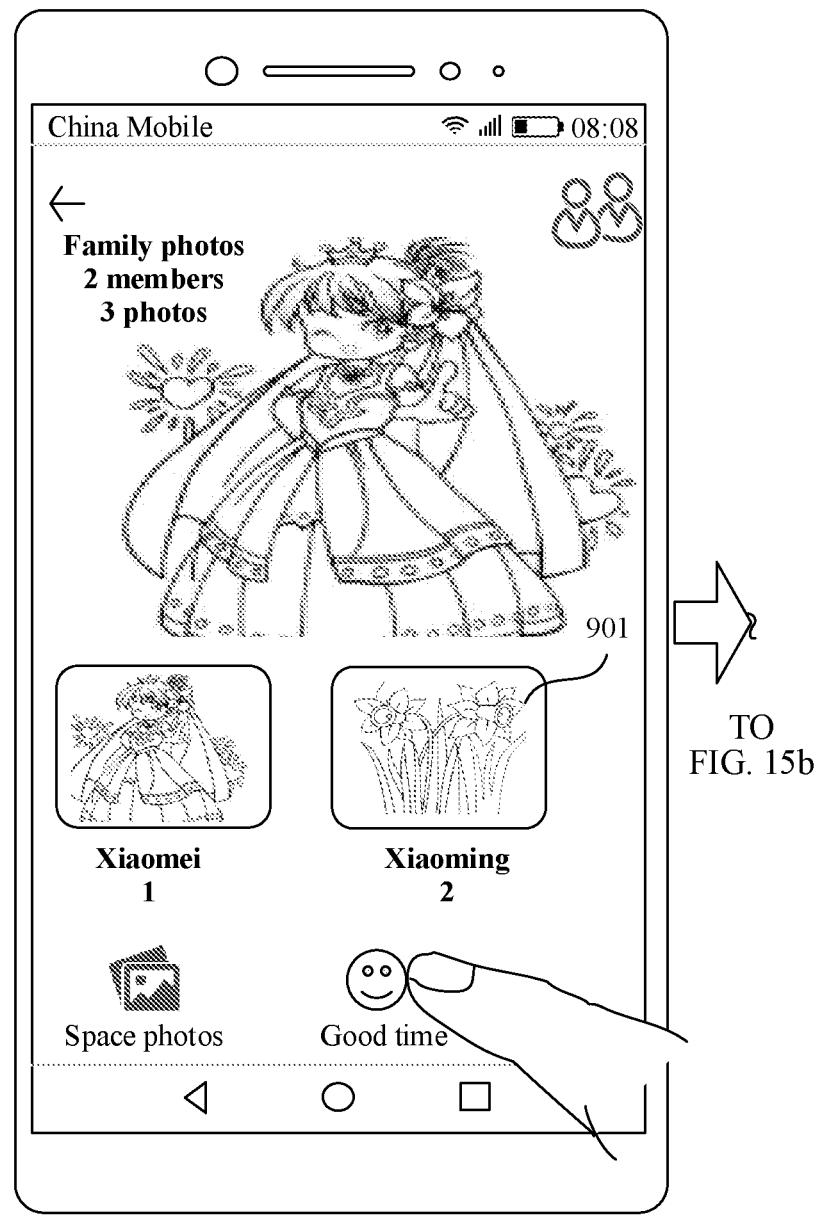
FIG. 15a and FIG. 15b are a schematic diagram of another group of interfaces according to an embodiment of this application.
Figure 15B:
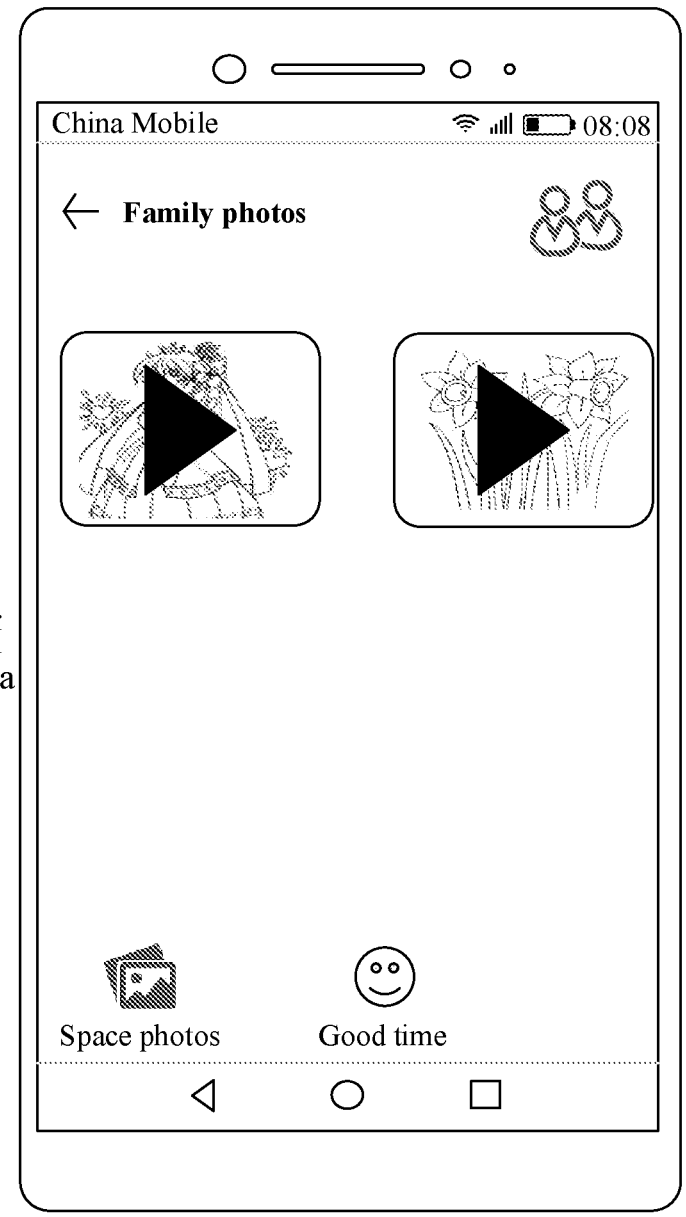

In this embodiment of this application, the family space further provides a "good time" function, and the function can be used to edit a photo in each member. As shown in FIG. 15*a* and FIG. 15*b*, for example, when the electronic device 1 detects an operation performed by the user 1 on a "good time" control in FIG. 15*a*, the electronic device 1 displays an interface shown in FIG. 15*b*. In FIG. 15*b*, the photo of the member Xiaomei may be edited into a video, and the photo of the member Xiaoming may also be edited into a video. In addition, a function such as a "comment" function or a "like" function may be further set in the space "family photos". For example, when the user 1 of the electronic device 1 views a photo of another member in the "family photos", the user 1 may comment on or give a like to the photo. In a possible design, a sharing function may be further set in the space "family photos". For example, when the user 1 of the electronic device 1 views a first photo of another member in the "family photos", the user 1 may select to share the first photo with a member that is not in the group "family photos". For example, when the electronic device 1 detects an operation performed by the user 1 on a sharing control, the electronic device 1 generates a link about the first photo, and the electronic device 1 sends the link to another member to complete sharing.

The example in which shared data is a photo is used above for description. The shared data may also be Taobao order information, text information, a video or a folder, health data, motion data, or the like in an electronic device. Similar to the data sharing method in which the shared data is a photo, when the shared data is Taobao order information, text information, a video or a folder, health data, motion data, or the like, the foregoing family photo sharing manner may be used for data sharing.

Figure 16A:
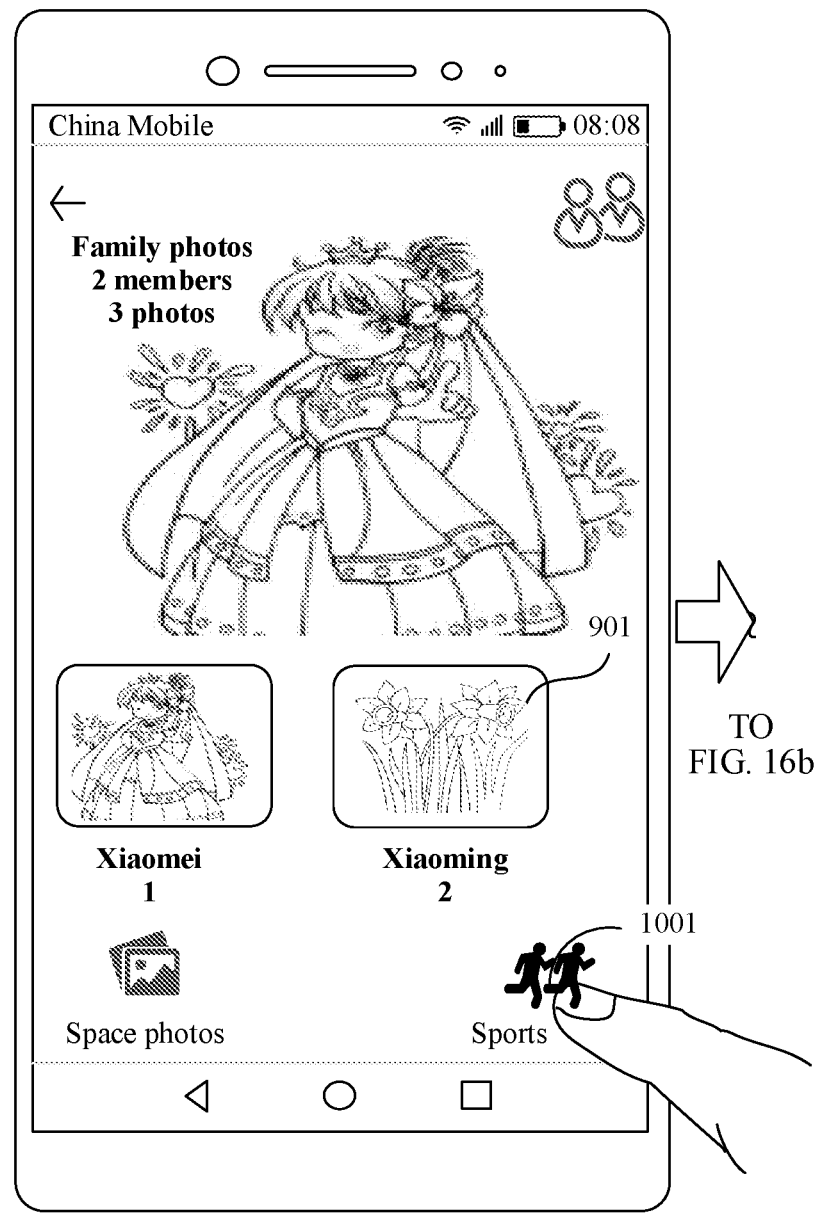
FIG. 16a to FIG. 16c are a schematic diagram of another group of interfaces according to an embodiment of this application.
Figure 16B:
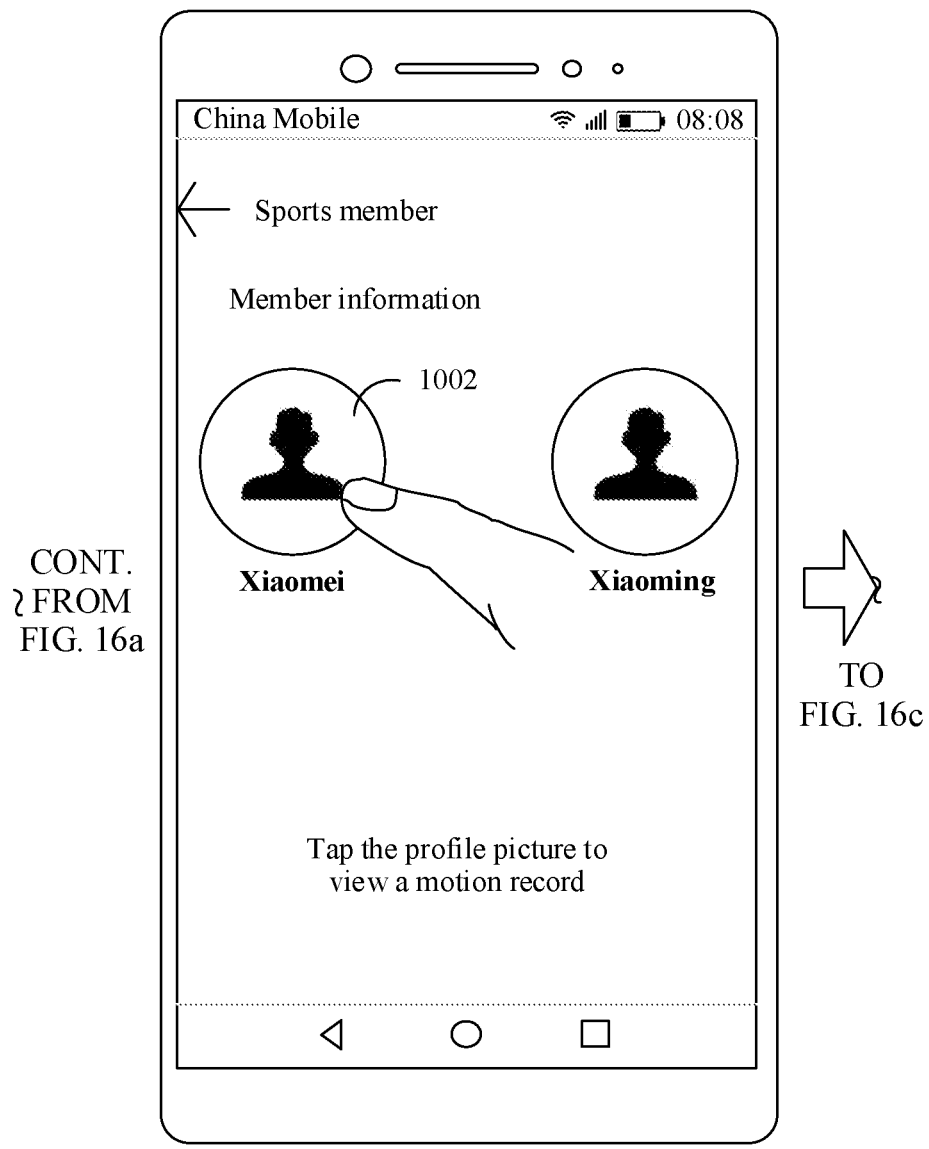
Figure 16C:
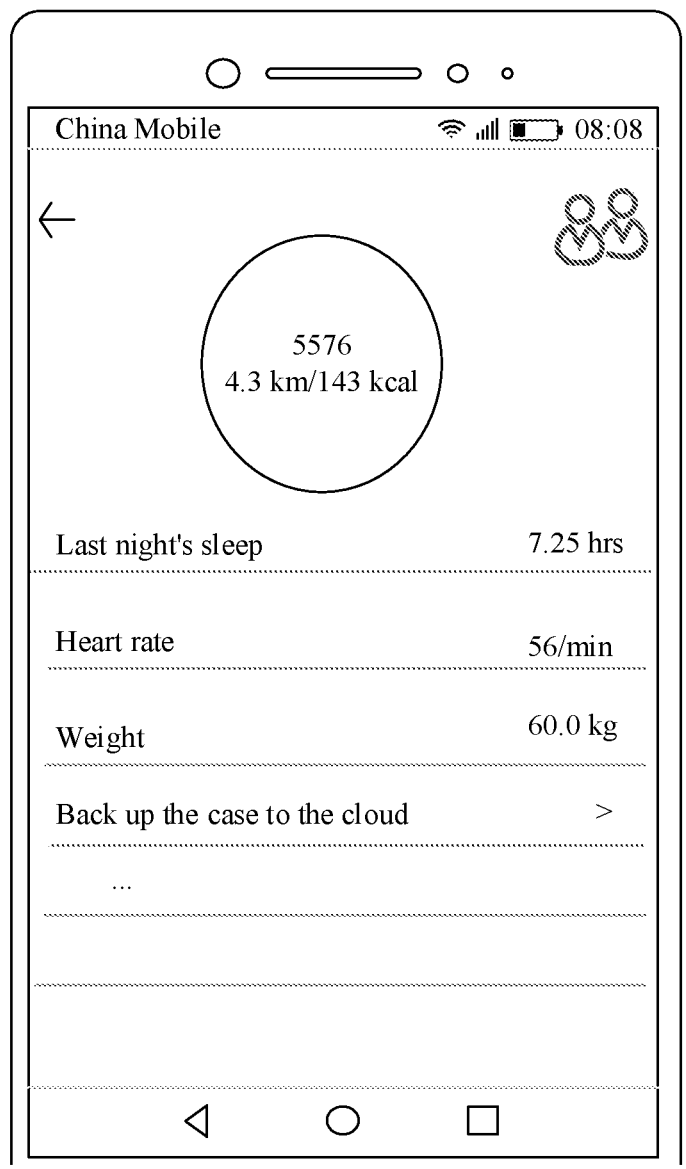

For example, in another embodiment of this application, when the shared data is motion data, the family space may further include a group that shares motion data, and motion data of each member in the group may be shared by another member. For a process of establishing a group for sharing motion data and a process in which a group member joins in or a group member is invited to join in, refer to the foregoing process of establishing the space "family photos". For example, in response to operations performed by the user 1 and the user 2 on a sports band APP, the electronic device 1 and the electronic device 2 grant data viewing permission of the sports band APP to the family space. To be specific, a binding relationship between the sports band APP and a family space account is established. As shown in FIG. 16a to FIG. 16c, when the electronic device 1 detects an operation (for example, a tap operation) performed by the user 1 on a motion icon 1001 in the family space shown in FIG. 16a, in response to the operation, the electronic device 1 displays an interface shown in FIG. 16b, and the interface displays current sports members Xiaomei and Xiaoming. When the electronic device 1 detects an operation (for example, a tap operation) performed by the user 1 on a profile photo of Xiaomei shown in FIG. 16b, the electronic device 1 displays motion data of the user 1 that is obtained from the motion band APP, including data such as a quantity of walking steps, a sleep time, a heart rate, and a weight. The interface of the electronic device 1 shown in FIG. 16b further provides an option of backing up the motion data to the cloud. When the user 1 taps the option to upload the motion data to the cloud, the user 1 views the motion data next time, and the electronic device 1 may obtain the motion data from the cloud. Certainly, the electronic device 1 may also store the motion data locally. In this way, the electronic device 1 may obtain the motion data from storage space at any time in an offline state, but the motion data occupies local storage space.

Figure 17A:
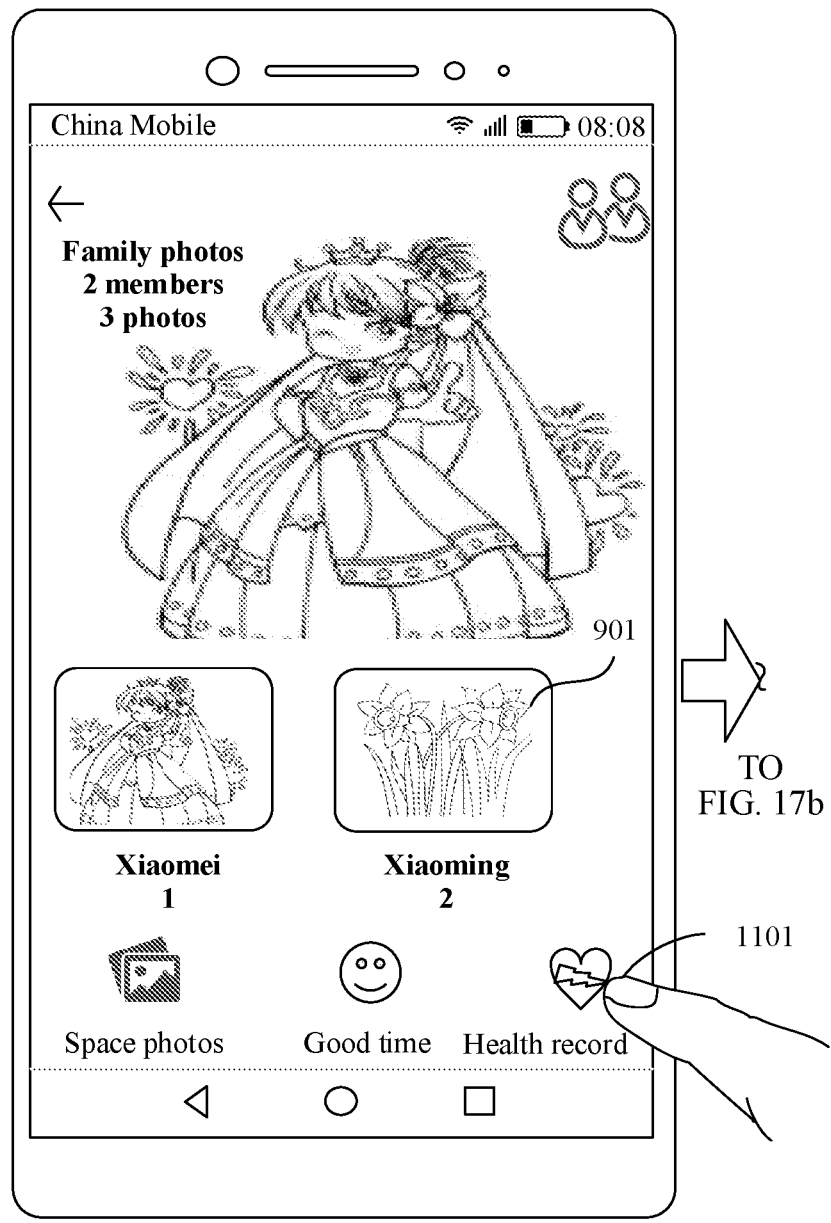
FIG. 17a to FIG. 17c are a schematic diagram of another group of interfaces according to an embodiment of this application.
Figure 17B:
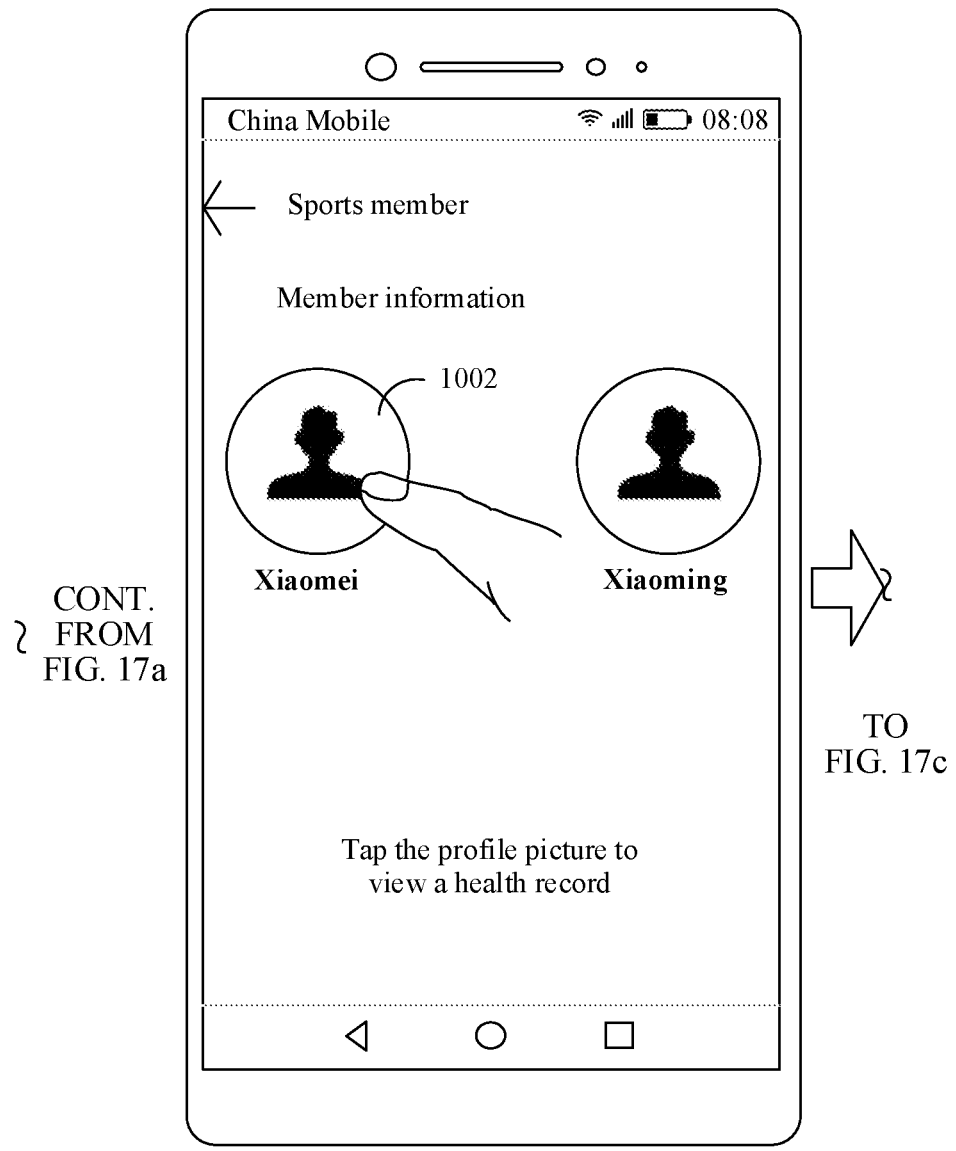
Figure 17C:
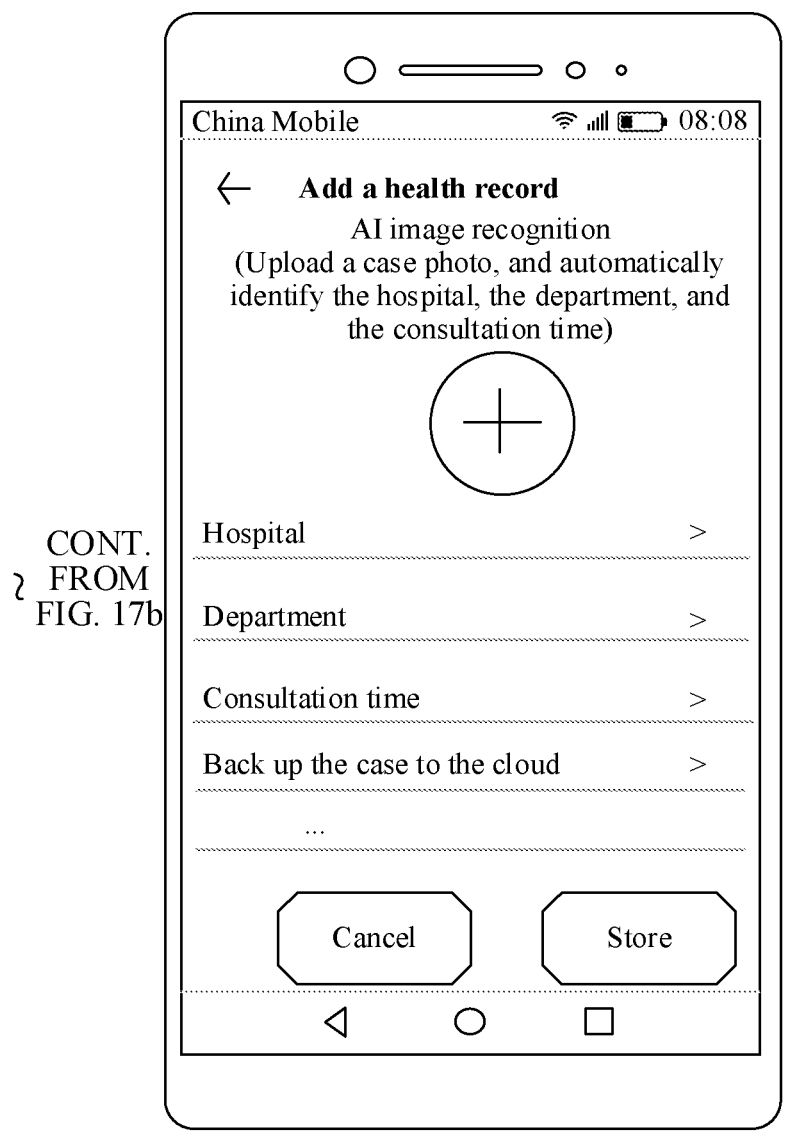

In another embodiment of this application, when the shared data is health data, the family space may further include a group of health data, and health data of each member in the group may be shared by another member. For a process of establishing a group for sharing health data and a process in which a group member joins in or a group member is invited to join in, refer to the foregoing process of establishing the space "family photos". As shown in FIG. 17a to FIG. 17c, for example, when the electronic device 1 detects an operation (for example, a tap operation) performed by the user 1 on a health record 1101 of the family space shown in FIG. 17a, in response to the operation, the electronic device 1 displays an interface shown in FIG. 17b, and the interface displays current family members Xiaomei and Xiaoming. When the electronic device 1 detects an operation (for example, a tap operation) performed by the user 1 on a profile photo of Xiaomei shown in FIG. 17b, the electronic device 1 displays an interface shown in FIG. 17c. After the electronic device 1 detects a case photo uploaded by the user 1, the electronic device 1 may automatically obtain information such as a hospital, a department, and a consultation time from the case photo information. The interface of the electronic device 1 shown in FIG. 17c further provides an option of backing up a case to the cloud. When the user 1 taps the option to upload the case to the cloud, the user 1 views the case next time, and the electronic device 1 may obtain the case from the cloud. Certainly, the electronic device 1 may also store the case locally. In this way, the electronic device 1 may obtain case data from storage space at any time in an offline state, but the case data occupies local storage space.

Figure 18A:
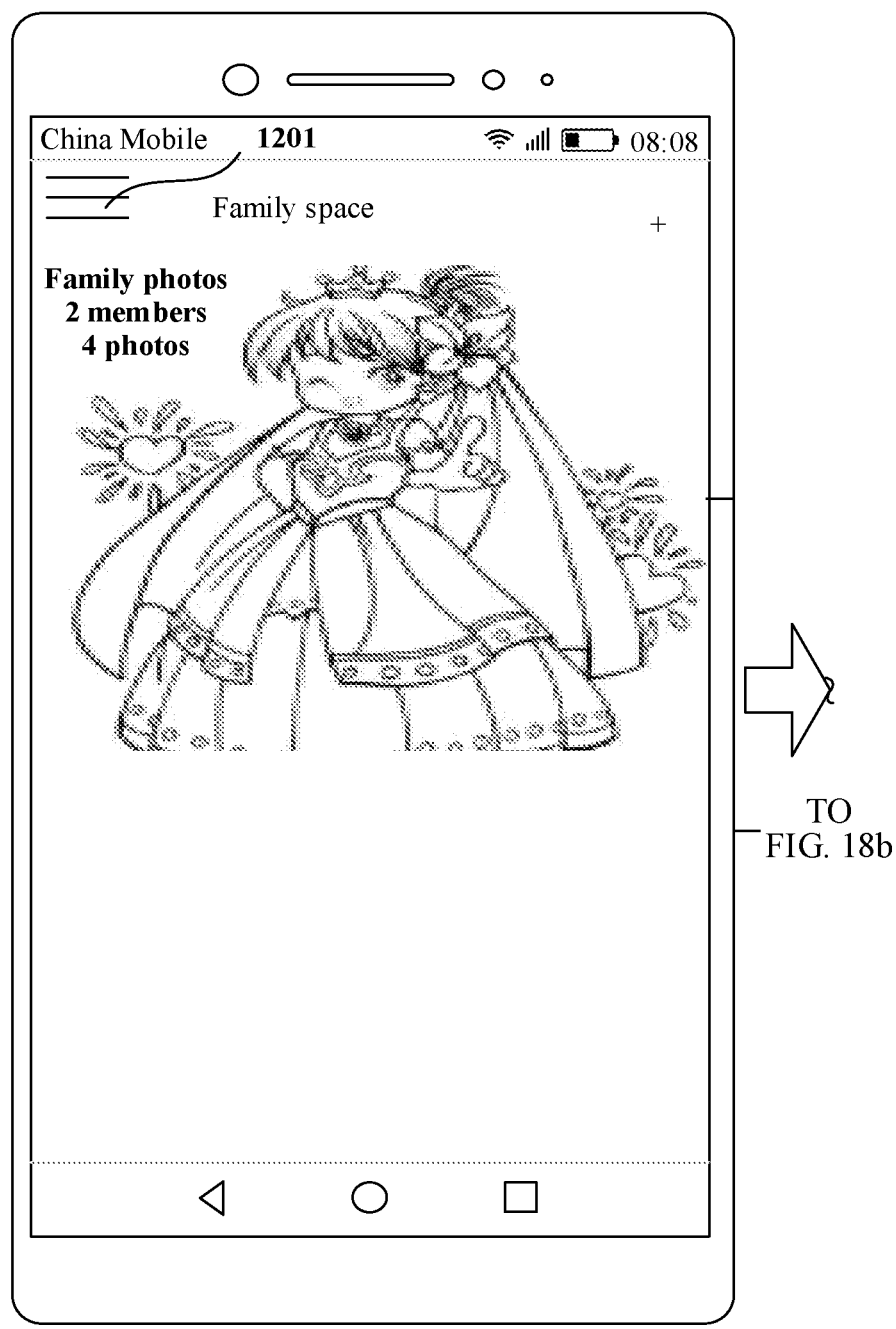
FIG. 18a and FIG. 18b are a schematic diagram of another group of interfaces according to an embodiment of this application.
Figure 18B:
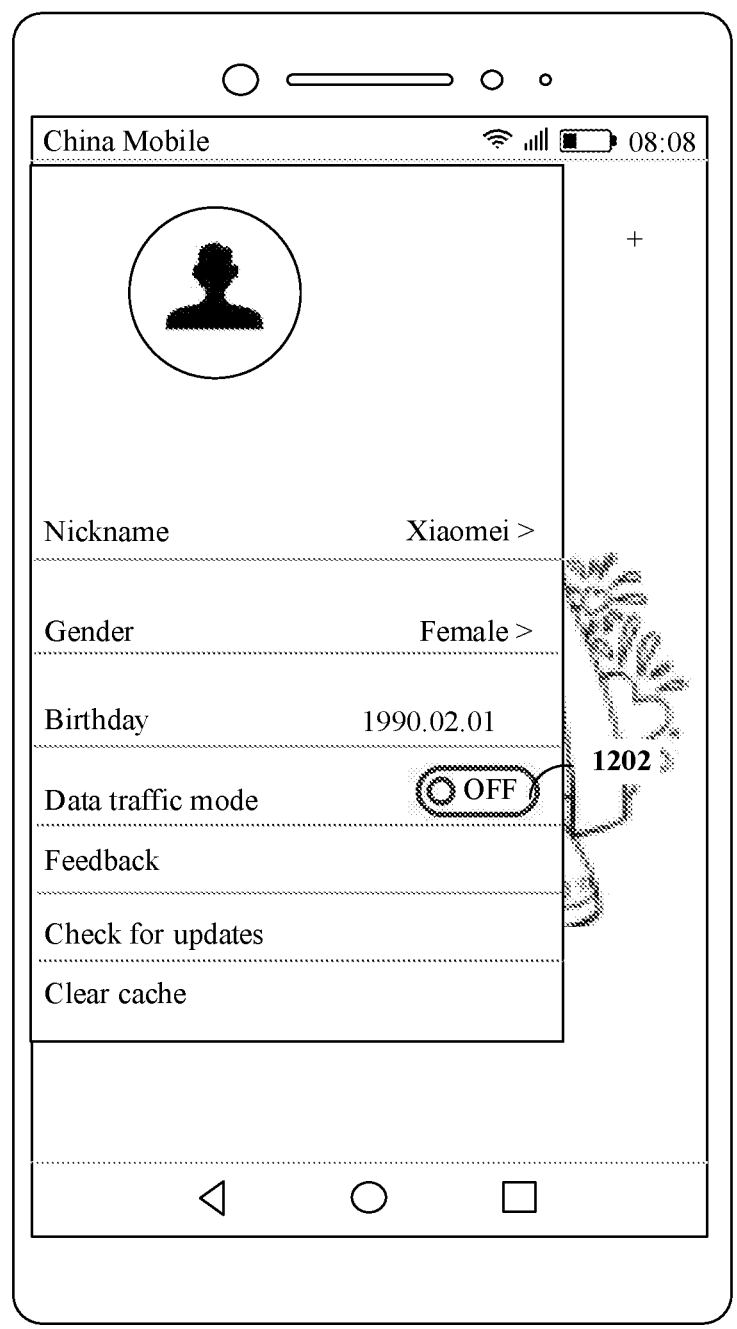

In a possible design, as shown in FIG. 18a and FIG. 18l), when the electronic device 1 detects an operation (for example, a tap operation) performed by the user 1 on family space 1201 shown in FIG. 18a, in response to the operation, the electronic device 1 displays a list shown in FIG. 18b, and the list displays information such as a nickname, a gender, a birthday, a data flow mode, a feedback, check for updates, and clear cache in the "family space" that are of the user 1 of the electronic device 1. When the electronic device 1 detects an operation (for example, a tap operation) performed by the user 1 on a data flow mode 1202 shown in FIG. 18b, in response to the operation, the electronic device 1 turns on or turns off a data traffic switch. When the electronic device 1 turns on the data traffic switch, photo information of another member in the "family space" is synchronized. Certainly, when the electronic device 1 turns off the data traffic switch, but turns on a WiFi hotspot, photo information of another member connected to the WiFi hotspot may also be synchronized.

In a case, the electronic device 1 in the space "family photos" may be equivalent to a central node in a blockchain network, and another member is equivalent to an ordinary node in the blockchain network. If the electronic device 2 accesses a network, but the electronic device 1 does not access the network, the electronic device 2 cannot obtain photo information of all members of the "family photos" from the electronic device 1, and consequently the electronic device 2 cannot synchronously update photo information of another member.

With reference to the blockchain technology provided in this embodiment of this application, it can be learned that the creator of the space "family photos" in the foregoing scenario is equivalent to the central node in the blockchain network, and another member is equivalent to the ordinary node in the blockchain network. For example, the electronic device 1 is equivalent to the node 2 in FIG. 4a, and the electronic device 2 is equivalent to the node 1 or the node 3 in FIG. 4a. Photo information of Xiaomei in the space "family photos" is equivalent to a private blockchain of the electronic device 1, and photo information of Xiaoming in the space "family photos" is equivalent to a private blockchain of the electronic device 2. Finally, after the electronic device 1 and the electronic device 2 synchronize data, space "family photos" with same photo information is generated. This space is equivalent to a public blockchain. Data uploaded by each electronic device each time constitutes a sub-block in a private blockchain corresponding to the electronic device. Each time authentication performed by the electronic device 1 succeeds, all authenticated data constitutes a main block in the public blockchain.

In other words, the electronic device 1 and the electronic device 2 may upload a photo to respective private blockchains in an offline state. When the electronic device 2 accesses the network, the electronic device 2 may send an authentication request to the electronic device 1 to request to perform authentication on a photo uploaded in an offline state. If the authentication performed by the electronic device 1 succeeds, the photo information uploaded by the electronic device 2 is synchronized to the public blockchain. Finally, the "family space" on the electronic device 1 also includes the photo uploaded by the electronic device 2. Therefore, members in the group may share a photo anytime and anywhere, and record photo information in respective private blockchains of the members, and the electronic device 1 (the central node) does not need to be always online or respond in time for photo sharing. For each electronic device, when authentication fails, the electronic device only needs to roll back to a last authenticated block, for example, to a last successfully uploaded state.

In another case, in the space "family photos", the electronic device 1 and the electronic device 2 may be equivalent to ordinary nodes. The electronic device 1 and the electronic device 2 each may generate, in an offline or online state, a hash value and a thumbnail of an uploaded photo, and add a new sub-block to the private blockchain of each of the electronic device 1 and the electronic device 2. Information about the sub-block stores the hash value, the thumbnail, and a correspondence between the hash value, the thumbnail, and the uploaded photo. The cloud server may establish a network connection to the electronic device 1 and the electronic device 2. When the cloud server establishes the network connection to the electronic device 1, the electronic device 1 reports the information about the newly added sub-block in the private blockchain of the electronic device 1 to a cloud server side. After the cloud server side has authenticated the sub-block, the information about the sub-block is stored in a newly added main block in the public blockchain. Similarly, when the cloud server establishes the network connection to the electronic device 2, the electronic device 2 reports information about the newly added sub-block in the private blockchain of the electronic device 2 to the cloud server side. After the cloud server side has authenticated the sub-block, the cloud server side stores the information about the sub-block in the newly added main block in the public blockchain.

Figure 19:
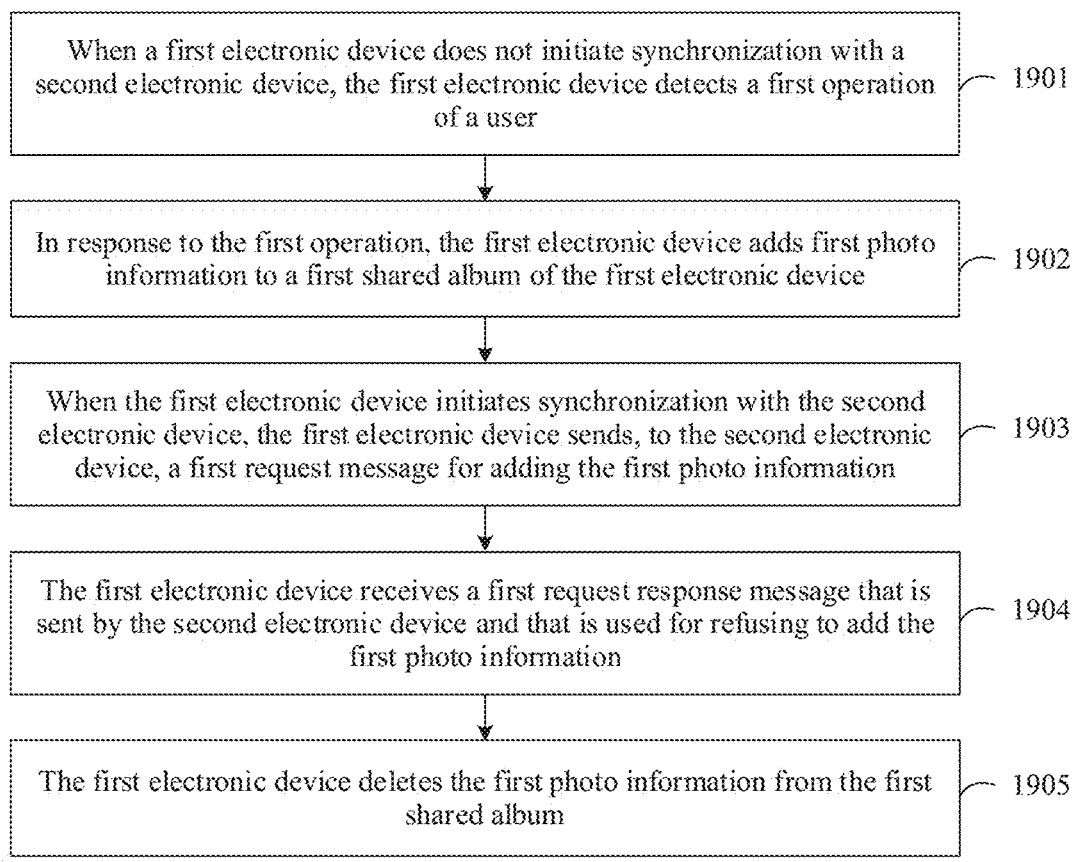
FIG. 19 is a schematic flowchart of a photo sharing method according to an embodiment of this application.

An embodiment of this application further provides a photo sharing method. As shown in FIG. 19, the method may include the following steps.

1901: When a first electronic device does not initiate synchronization with a second electronic device, the first electronic device detects a first operation of a user.

1902: In response to the first operation, the first electronic device adds first photo information to a first shared album of the first electronic device.

The first shared album includes photo information added by the first electronic device.

1903: When the first electronic device initiates synchronization with the second electronic device, the first electronic device sends, to the second electronic device, a first request message for adding the first photo information.

1904: The first electronic device receives a first request response message that is sent by the second electronic device and that is used for refusing to add the first photo information.

1905: The first electronic device deletes the first photo information from the first shared album.

With reference to the foregoing scenarios in FIG. 11*a* to FIG. 11*f* and FIG. 12*a* and FIG. 12*b*, the first electronic device is equivalent to the electronic device 2 in the figures, and the second electronic device is equivalent to the electronic device 1 in the figures. In addition, the first photo information may be directly the first photo, or may be index information corresponding to the first photo, for example, link information or the thumbnail of the first photo. With reference to FIG. 12*a* and FIG. 12*b*, the first photo information is equivalent to the third photo in FIG. 12*a* and FIG. 12*b*.

When the electronic device 2 does not initiate synchronization with the electronic device 1, the electronic device 2 uploads the third photo in the "family photos" to an album (that is, the first shared album) used to store photo information of the user Xiaoming of the electronic device 2. That the electronic device 2 does not initiate synchronization with the electronic device 1 may mean that the electronic device 2 does not establish a network connection to the electronic device 1, or may mean that the electronic device 2 establishes a network connection to the electronic device 1, but the electronic device 2 is currently in a time period in which the electronic device 2 does not initiate synchronization with the electronic device 1.

When the electronic device 2 initiates synchronization with the electronic device 1, the electronic device 1 may receive an authentication request that is sent by the electronic device 2 and that is used for the third photo, and the authentication request is equivalent to the first request message for adding the first photo information in step 1903. When the electronic device 1 determines that the third photo has an excessively large amount of data, and the third photo fails to be authenticated and the third photo is not added to the "family photos", the electronic device 1 sends the first request response message to the electronic device 2, in other words, notifies the electronic device 2 that the third photo fails to be authenticated and the electronic device 1 refuses to add the third photo. In this way, the electronic device 2 deletes the third photo from the first shared album. As shown in FIG. 12*b*, there are only two pieces of photo information in the album of Xiaoming.

In a possible embodiment, after the first electronic device deletes the first photo information from the first shared album, the photo sharing method further includes: synchronizing, by the first electronic device, photo information in a fourth shared album of the second electronic device to the first electronic device, where the fourth shared album includes the photo information in the first shared album, photo information in a second shared album of the second electronic device, and photo information in a third shared album of a third electronic device, and the photo information in the first shared album does not include the first photo information.

Figure 20A:
FIG. 20a and FIG. 20b are a schematic diagram of another group of interfaces according to an embodiment of this application.
Figure 20B:
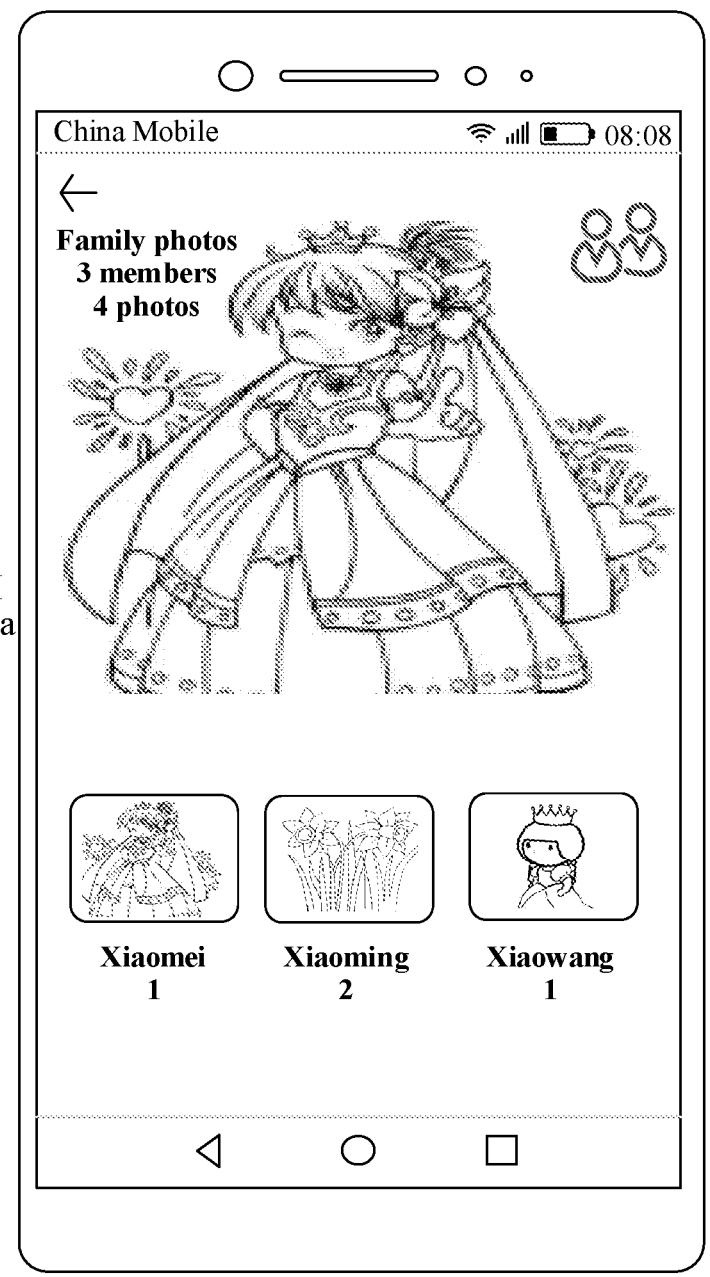

With reference to FIG. 20*a* and FIG. 10*b*, it is assumed that a new member electronic device 3 is added to the space "family photos", a user nickname of the electronic device 3 is Xiaowang, and Xiaowang successfully adds a photo to an album of Xiaowang in the space. In this case, after the electronic device 2 synchronizes the "family photos" of the electronic device 1, "family photos" of the electronic device 2 includes a photo of the electronic device 1, a photo of the electronic device 2, and a photo of the electronic device 3. In other words, the fourth shared album is equivalent to the space "family photos" in FIG. 20*a* and FIG. 20*b*, the second shared album is equivalent to an album used to store photo information of the user Xiaomei of the electronic device 1, and the third shared album is equivalent to an album used to store photo information of the user Xiaowang of the electronic device 3. It can be learned from FIG. 20*a* and FIG. 20*b* that, after the synchronization, the album of Xiaoming of the electronic device 2 does not include the third photo that fails to be authenticated.

Further, in a possible embodiment, before detecting the first operation of the user, when the first electronic device does not initiate synchronization with the second electronic device, the first electronic device detects a second operation of the user; in response to the second operation, the first electronic device adds second photo information to the first shared album; when the first electronic device initiates synchronization with the second electronic device, the first electronic device sends, to the second electronic device, a second request message for adding the second photo information; and the first electronic device receives a second request response message that is sent by the second electronic device and that indicates that the second photo information is successfully added. In this way, the second photo information in the first shared album of the first electronic device is successfully added.

Still, before detecting the first operation of the user, when the first electronic device does not initiate synchronization with the second electronic device, the first electronic device detects a third operation of the user; in response to the third operation, the first electronic device adds third photo information to the first shared album that includes the second photo information; when the first electronic device initiates synchronization with the second electronic device, the first electronic device sends, to the second electronic device, a third request message for adding the third photo information; and the first electronic device receives a third request response message that is sent by the second electronic device and that indicates that the third photo information is successfully added. In this way, the third photo information in the first shared album of the first electronic device is successfully added.

Figure 21A:
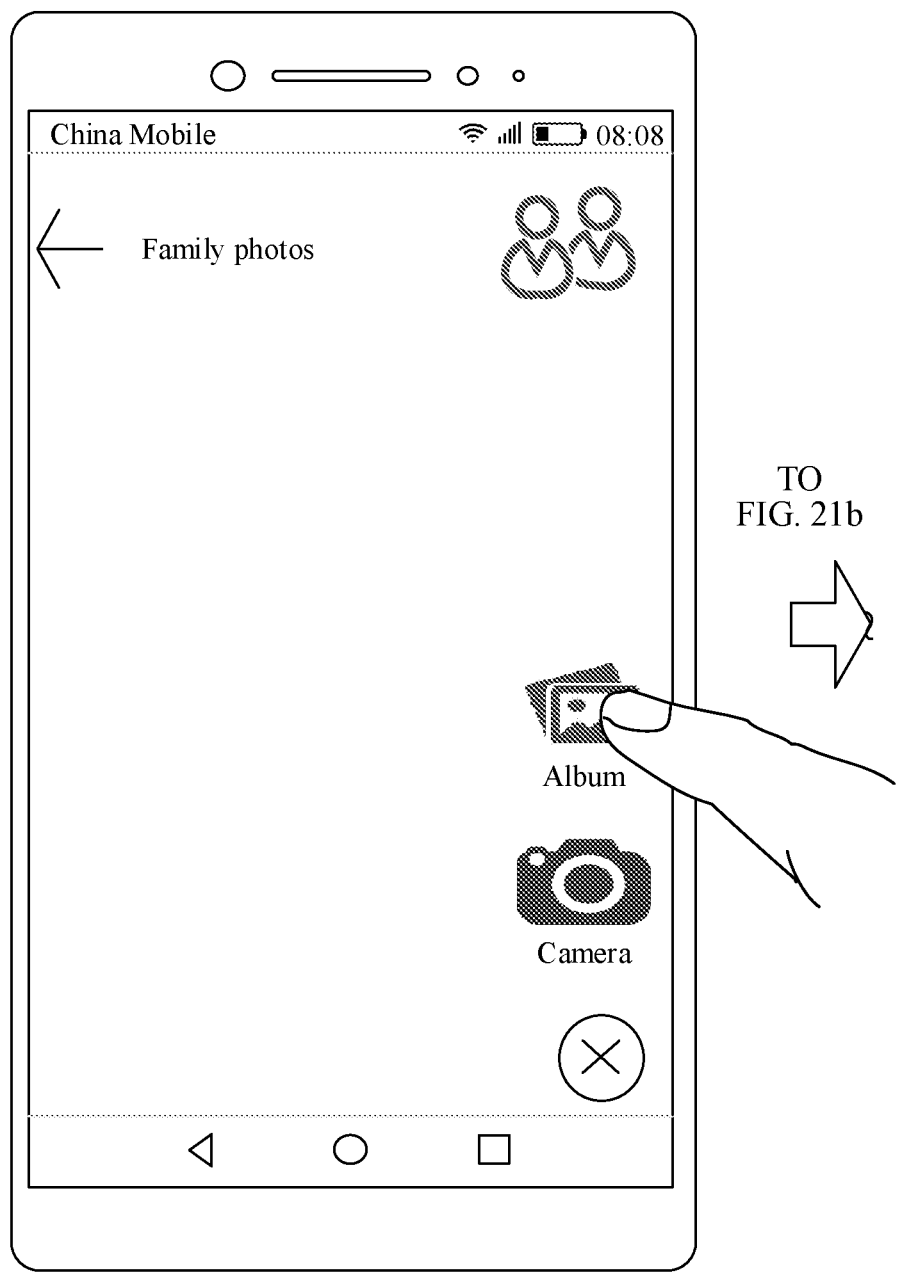
FIG. 21a to FIG. 21f are a schematic diagram of another group of interfaces according to an embodiment of this application.
Figure 21B:
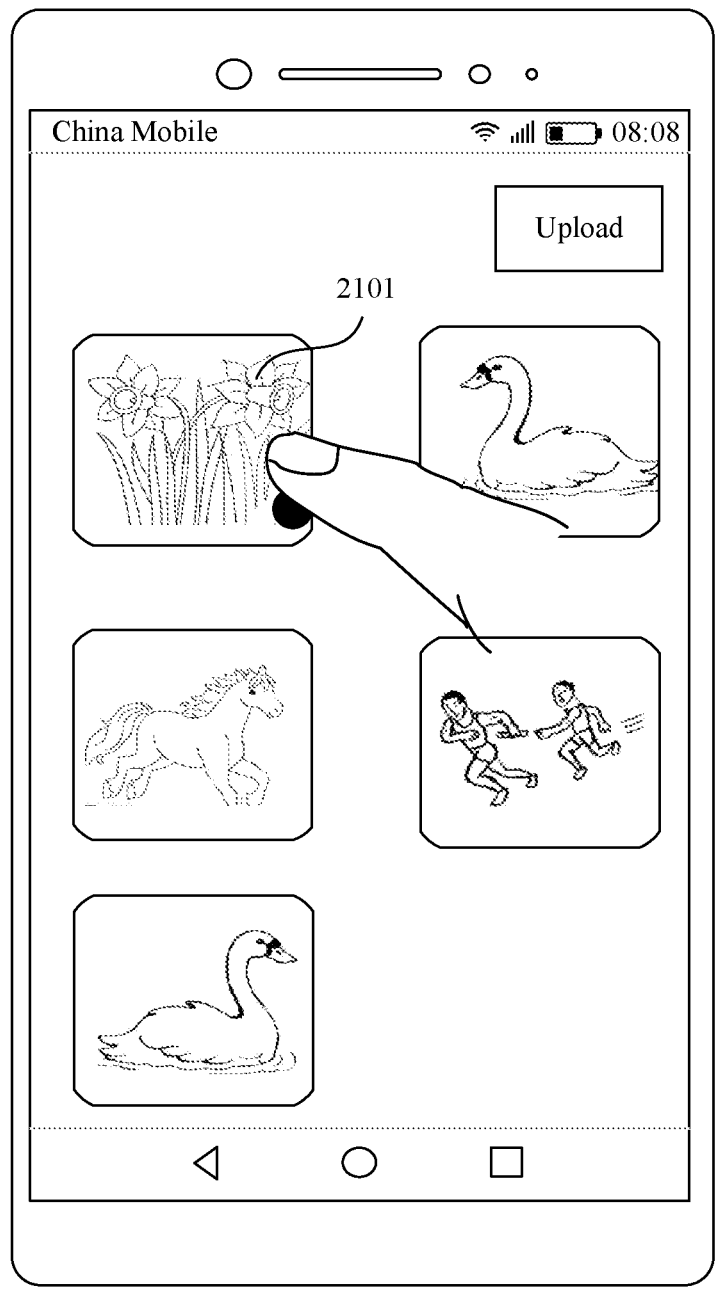
Figure 21C:
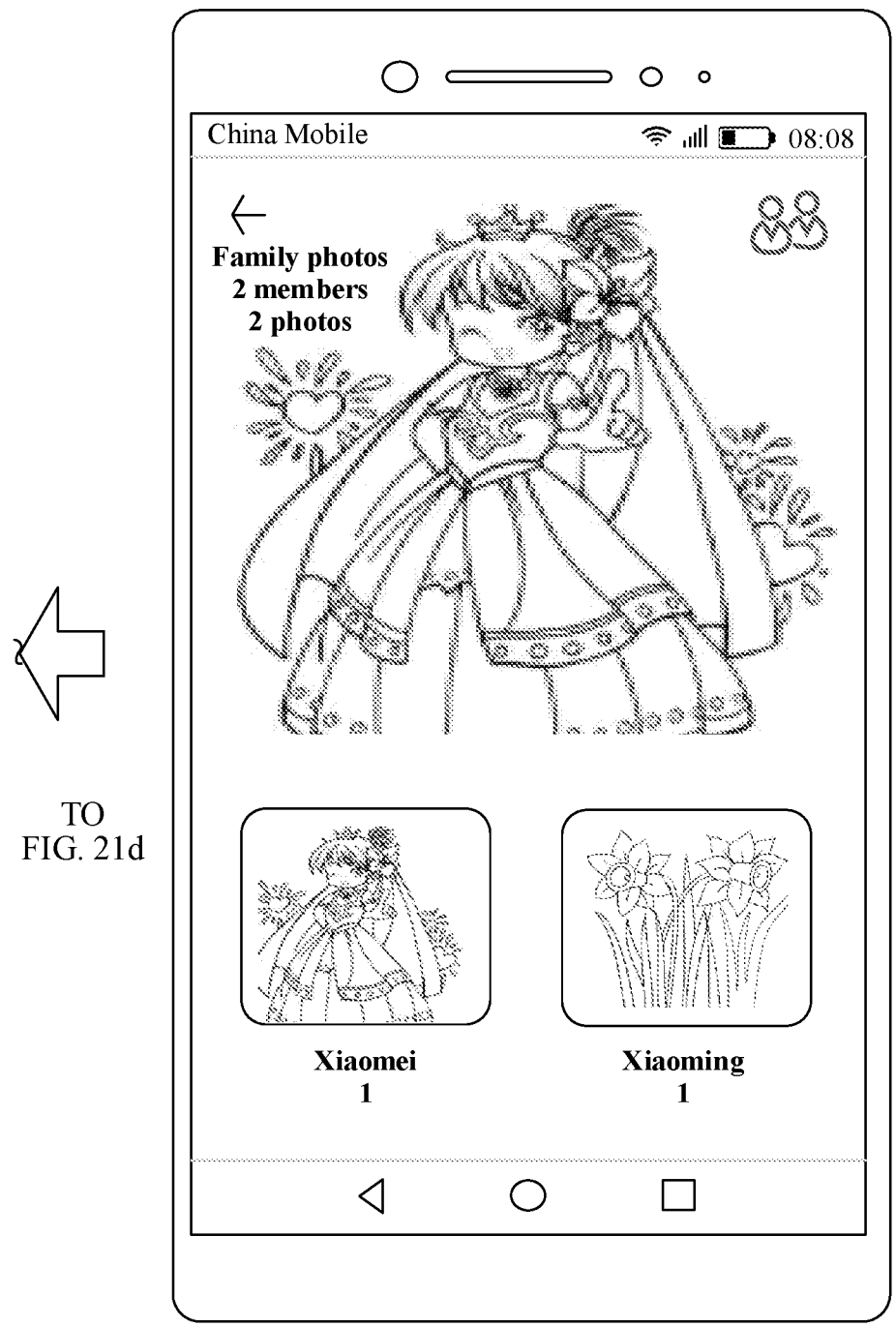
Figure 21D:
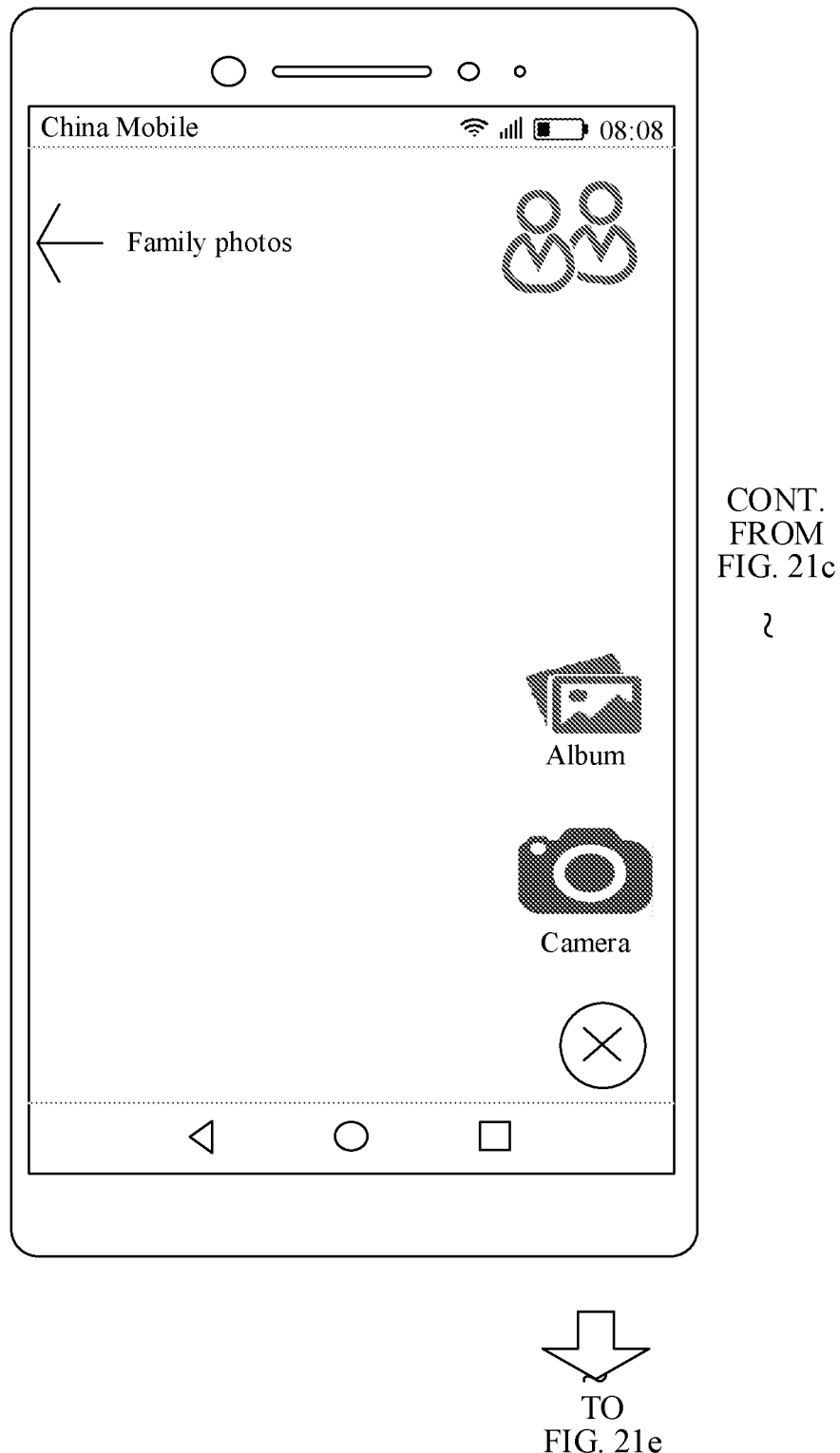
Figure 21E:
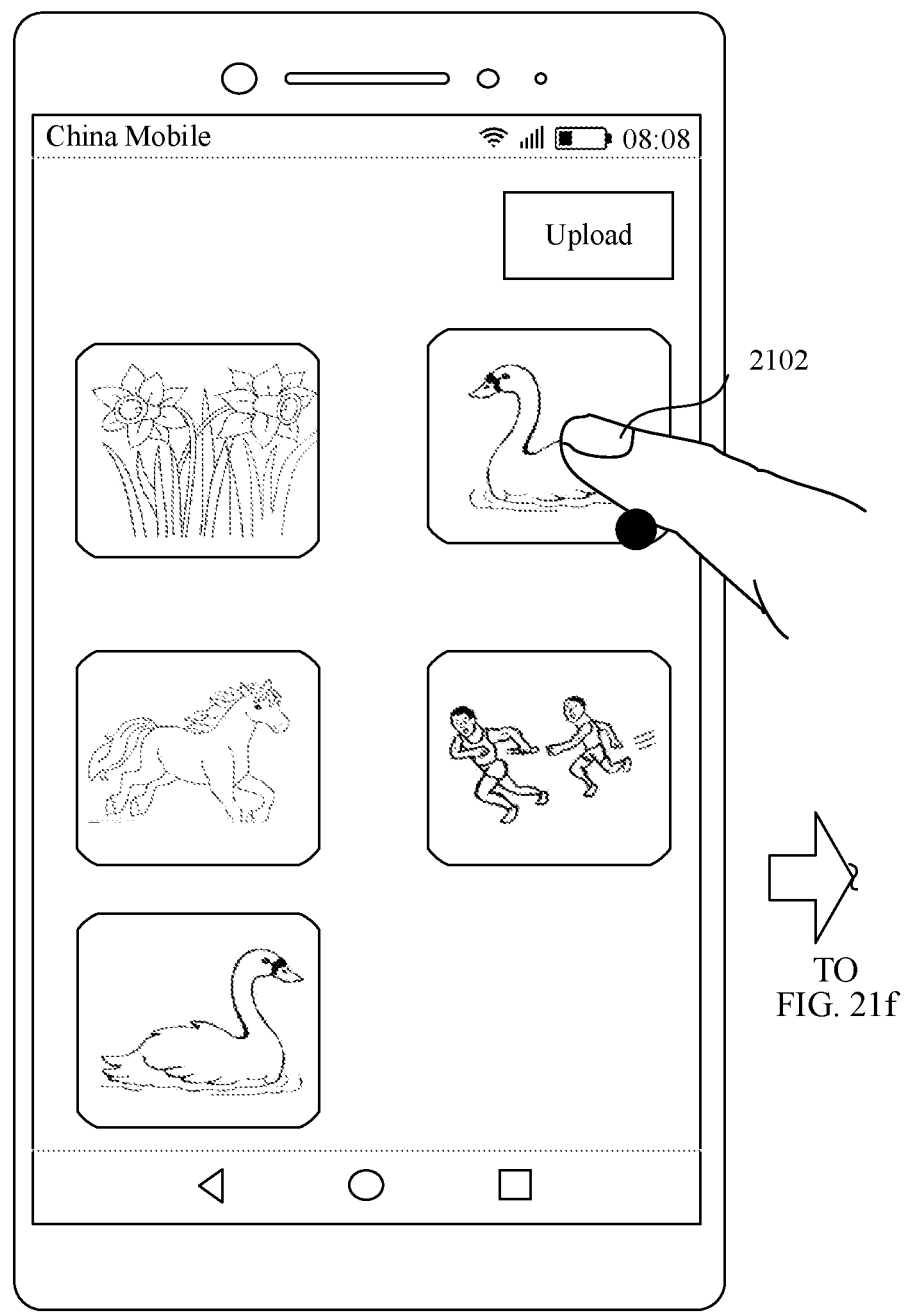
Figure 21F:
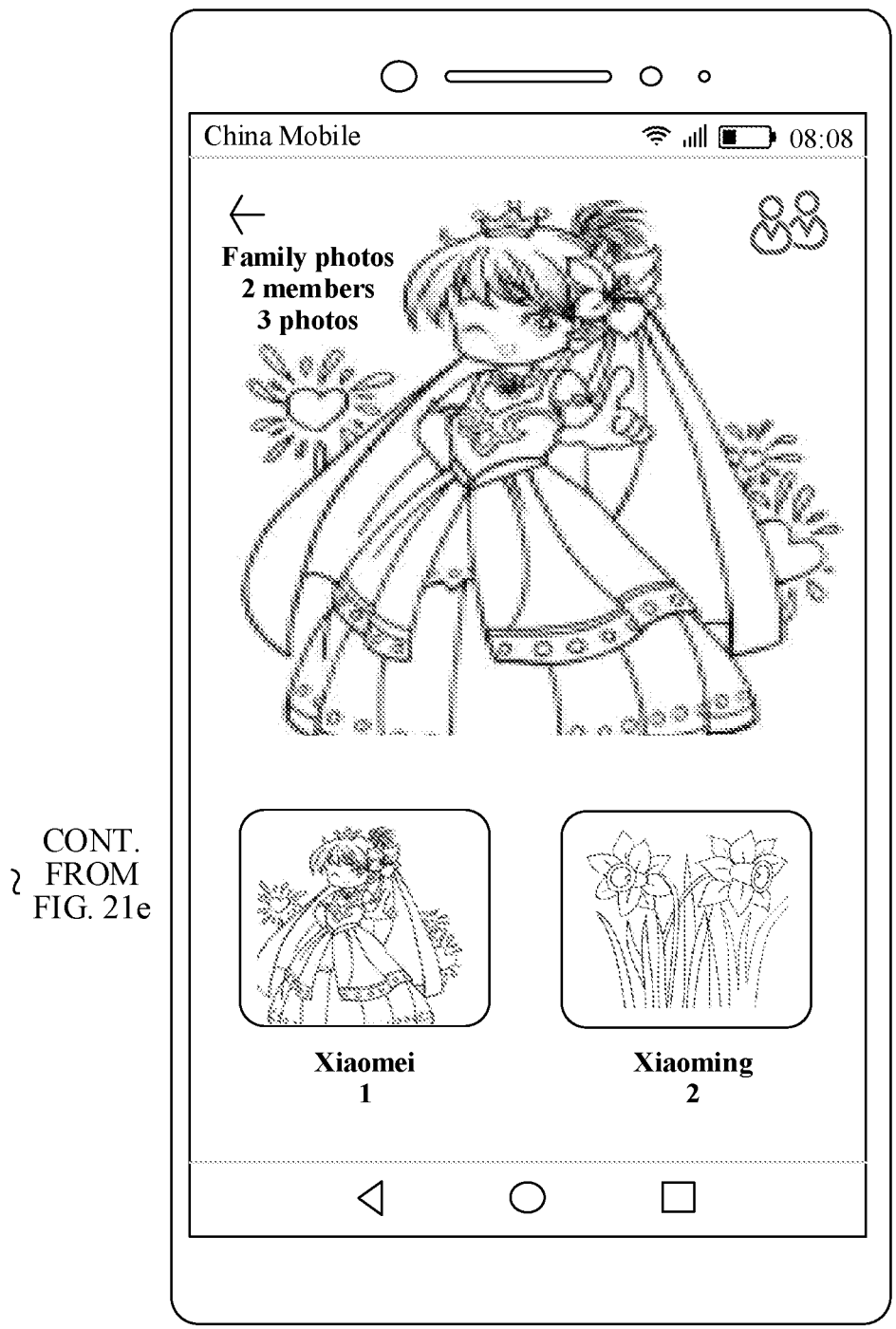

Referring to FIG. 21a to FIG. 21f, the electronic device 2 detects an operation performed by the user 2 on a photo 2101 in the album. Referring to FIG. 21a and FIG. 21b, the electronic device 2 sends, to the electronic device 1, a request message for adding the photo 2101 to the space "family photos". As shown in FIG. 21c, after the photo is successfully added to the electronic device 1, a shared album of Xiaoming corresponding to the electronic device 2 displays one photo. Then, the electronic device 2 detects an operation performed by the user 2 on a photo 2102 in the album. Referring to FIG. 21d and FIG. 21e, the electronic device 2 sends, to the electronic device 1, a request message for adding the photo 2102 to the space "family photos". As shown in FIG. 21f, after the photo is successfully added to the electronic device 1, the shared album of Xiaoming corresponding to the electronic device 2 displays two photos.

With reference to the blockchain technology provided in the embodiments of this application, the first electronic device, the second electronic device, and the third electronic device are devices in a blockchain network. The second electronic device is equivalent to a central node in the blockchain network, and the first electronic device and the third electronic device are equivalent to common nodes in the blockchain network.

Photo information may be added to a shared album in a form of a record. For example, a first record corresponding to the second photo information includes a first identifier, a hash value of the second photo, and content data of the second photo, and a second record corresponding to the third photo information includes a second identifier, the hash value of the second photo, content data of the third photo, and the first identifier. In other words, the second record is associated with the first record. With reference to the blockchain technology provided in the embodiments of this application, for example, the first record is equivalent to the sub-block 11 in FIG. 4b, and the second record is equivalent to the sub-block 12 in FIG. 4b.

In a possible embodiment of this application, when the first electronic device does not initiate synchronization with the second electronic device, the first electronic device detects a fourth operation of the user; in response to the fourth operation, the first electronic device deletes the third photo information from the first shared album; when the first electronic device initiates synchronization with the second electronic device, the first electronic device sends a fourth request message for deleting the third photo information to the second electronic device; and the first electronic device receives a fourth request response message that is sent by the second electronic device and that indicates that the third photo information is successfully deleted.

With reference to the foregoing scenario in FIG. 13a to FIG. 13d, when the electronic device 2 does not establish a network connection to the electronic device 1, the electronic device 2 deletes a photo 802 in FIG. 13b. When the electronic device 2 establishes a network connection to the electronic device 1, the electronic device 2 sends, to the electronic device 1, a request message for deleting the photo 802. After successfully deleting the photo 802 from the "family photos", the electronic device 1 returns, to the electronic device 2, a response message that indicates that the photo 802 is successfully deleted. In this way, the photo 802 is deleted from the space "family photos".

Figure 22:
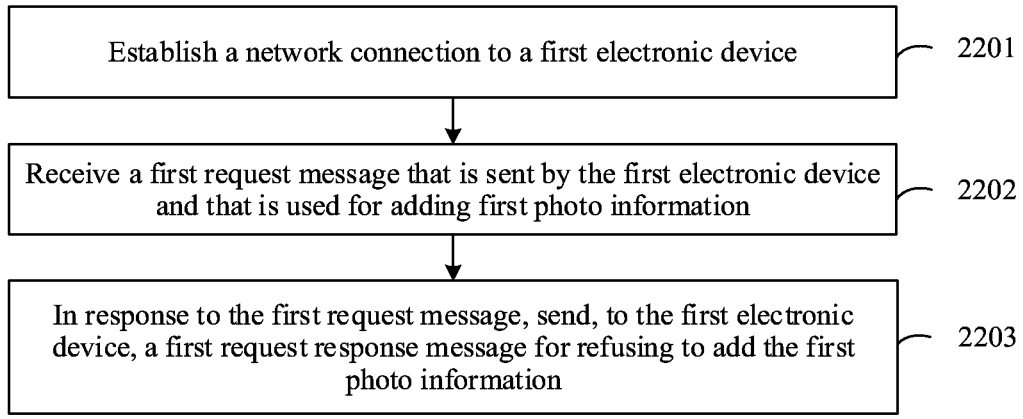
FIG. 22 is a schematic flowchart of another photo sharing method according to an embodiment of this application.

Some other embodiments of this application provide another photo sharing method. As shown in FIG. 22, the method includes the following steps: 2201: A second electronic device establishes a network connection to a first electronic device. For example, the first electronic device may establish a short-distance connection to the second electronic device based on a communications network such as a Wi-Fi hotspot, Wi-Fi direct, Bluetooth, zigbee, or NFC. 2202: The second electronic device receives a first request message that is sent by the first electronic device and that is used for adding first photo information. 2203: In response to the first request message, the second electronic device sends, to the first electronic device, a first request response message for refusing to add the first photo information.

With reference to the foregoing scenarios in FIG. 11a to FIG. 11f and FIG. 12a and FIG. 12b, the first electronic device is equivalent to the electronic device 2 in the figures, and the second electronic device is equivalent to the electronic device 1 in the figures. In addition, the first photo information may be directly the first photo, or may be index information corresponding to the first photo, for example, link information or the thumbnail of the first photo. With reference to FIG. 12a and FIG. 12b, the first photo information is equivalent to the third photo in FIG. 12a and FIG. 12b. The foregoing execution steps of the second electronic device correspond to those of the first electronic device. Therefore, for specific content, refer to the foregoing descriptions. Details are not described again in this embodiment.

Figure 23:
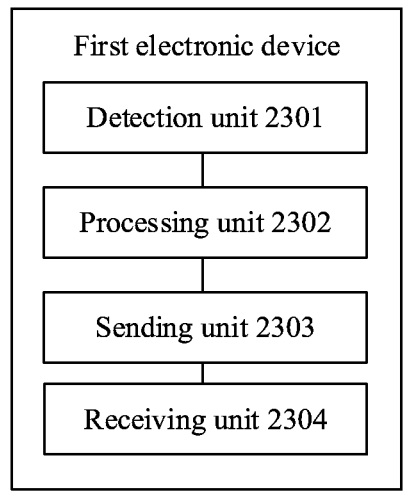
FIG. 23 is a schematic structural diagram of another electronic device according to an embodiment of this application.

In some embodiments of this application, an embodiment of this application discloses a first electronic device. As shown in FIG. 23, the first electronic device is configured to implement the methods recorded in the foregoing method embodiments. The first electronic device includes a detection unit 2301, a processing unit 2302, a sending unit 2303, and a receiving unit 2304. The detection unit 2301 is configured to support the first electronic device in performing step 1901 in FIG. 19. The processing unit 2302 is configured to support the first electronic device in performing step 1902 and step 1905 in FIG. 19. The sending unit 2303 is configured to support the electronic device in performing step 1903 in FIG. 19. The receiving unit 2304 is configured to support the electronic device in performing step 1904 in FIG. 19. All related content of the steps in the foregoing method embodiments may be cited in function descriptions of corresponding function modules. Details are not described herein again.

Figure 24:
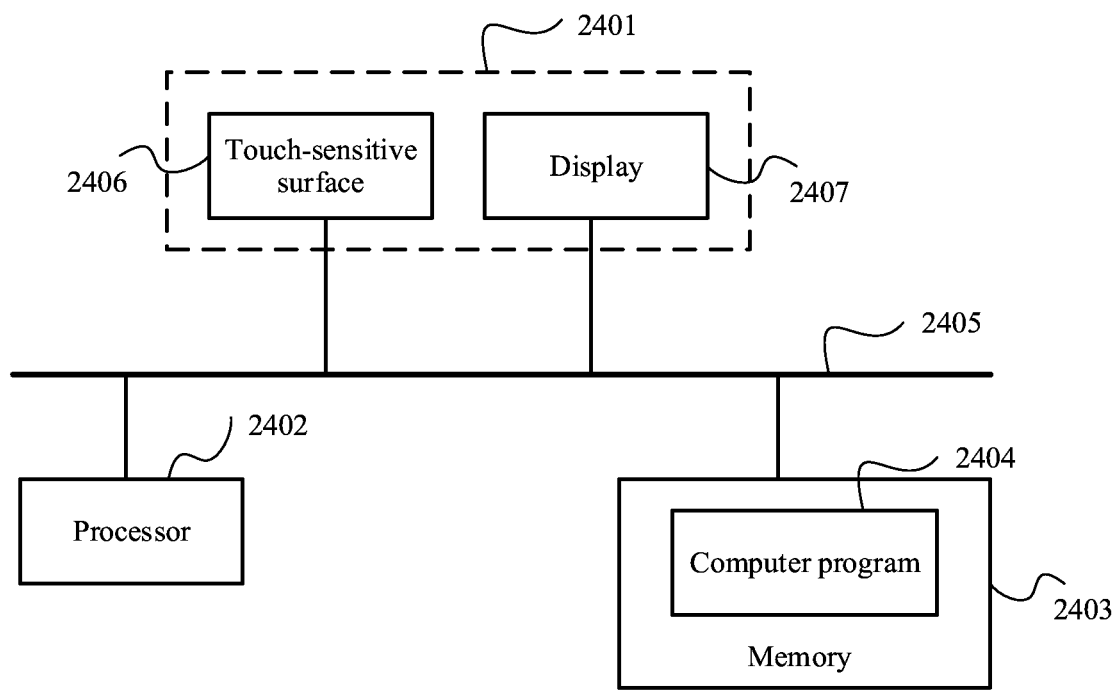
FIG. 24 is a schematic structural diagram of another electronic device according to an embodiment of this application.

In some other embodiments of this application, an embodiment of this application discloses a first electronic device. As shown in FIG. 24, the electronic device may include a touchscreen 2401, one or more processors 2402, a memory 2403, one or more applications (not shown), and one or more computer programs 2404. The touchscreen 2401 includes a touch-sensitive surface 2406 and a display 2407. The foregoing components may be connected by using one or more communications buses 2405. The one or more computer programs 2404 are stored in the memory 2403, and are configured to be executed by the one or more processors 2402. The one or more computer programs 2404 include an instruction, and the instruction may be used to perform the steps in FIG. 19 and the corresponding embodiment.

Figure 25:
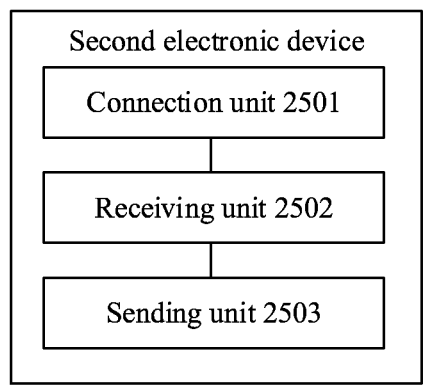
FIG. 25 is a schematic structural diagram of an electronic device according to an embodiment of this application.

In some embodiments of this application, an embodiment of this application discloses a second electronic device. As shown in FIG. 25, the second electronic device is configured to implement the methods recorded in the foregoing method embodiments. The second electronic device includes a connection unit 2501, a receiving unit 2502, and a sending unit 2503. The connection unit 2501 is configured to support the second electronic device in performing step 2501 in FIG. 22. The receiving unit 2502 is configured to support the second electronic device in performing step 2202 in FIG. 22. The sending unit is configured to support the second electronic device in performing step 2203 in FIG. 22. All related content of the steps in the foregoing method embodiments may be cited in function descriptions of corresponding function modules. Details are not described herein again.

Figure 26:
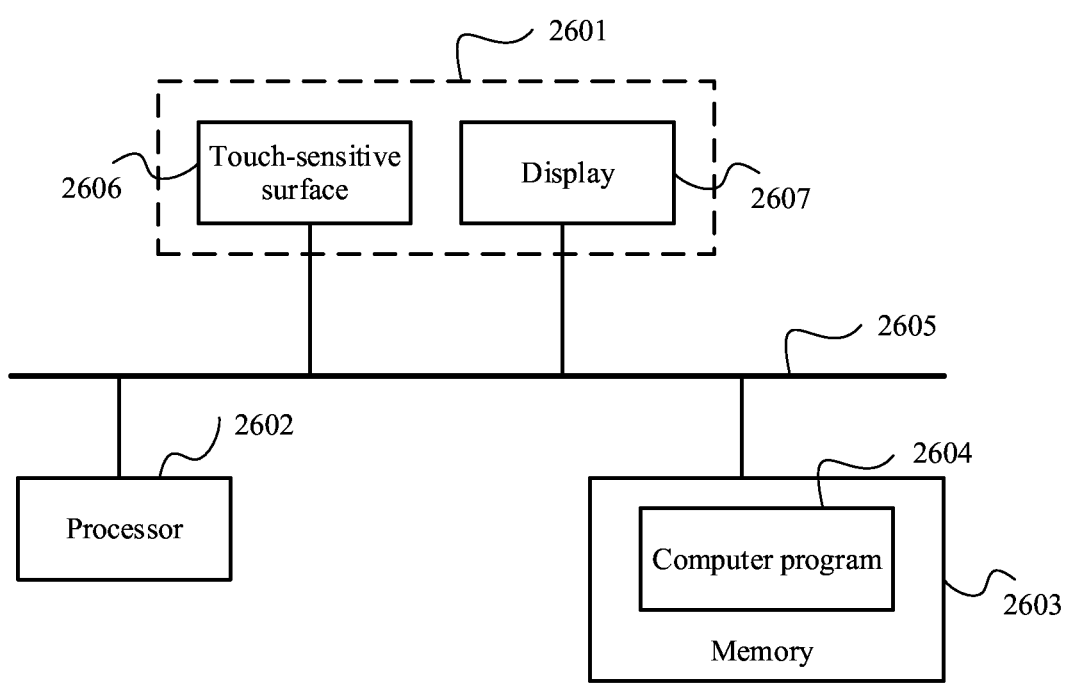
FIG. 26 is a schematic structural diagram of another electronic device according to an embodiment of this application.

In some other embodiments of this application, an embodiment of this application discloses a second electronic device. As shown in FIG. 26, the electronic device may include a touchscreen 2601, one or more processors 2602, a memory 2603, one or more applications (not shown), and one or more computer programs 2604. The touchscreen 2601 includes a touch-sensitive surface 2606 and a display 2607. The foregoing components may be connected by using one or more communications buses 2605. The one or more computer programs 2604 are stored in the memory 2603, and are configured to be executed by the one or more processors 2602. The one or more computer programs 2604 include an instruction, and the instruction may be used to perform the steps in FIG. 22 and the corresponding embodiment.

An embodiment of this application further provides a computer storage medium. The computer storage medium stores a computer instruction. When the computer instruction is run on an electronic device, the electronic device is enabled to perform the foregoing related method steps, to implement the photo sharing methods in the foregoing embodiments.

An embodiment of this application further provides a computer program product. When the computer program product is run on a computer, the computer is enabled to perform the foregoing related steps, to implement the photo sharing methods in the foregoing embodiments.

In addition, an embodiment of this application further provides an apparatus. The apparatus may be specifically a chip, a component, or a module. The apparatus may include a processor and a memory that are connected. The memory is configured to store a computer-executable instruction. When the apparatus runs, the processor may execute the computer-executable instruction stored in the memory, to enable the chip to perform the photo sharing methods in the foregoing method embodiments.

The electronic device, the computer storage medium, the computer program product, or the chip provided in the embodiments of this application is configured to perform the corresponding method provided above. Therefore, for beneficial effects that can be achieved, refer to the beneficial effects in the corresponding method provided above. Details are not described herein again.

The foregoing descriptions about implementations allow a person skilled in the art to understand that, for the purpose of convenient and brief description, division of the foregoing function modules is used as an example for description. During actual application, the foregoing functions can be allocated to different modules and implemented according to a requirement, in other words, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected according to actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   when a first electronic device is not synchronizing with a second electronic device, detecting, by the first electronic device, a first operation of a user;
   in response to the first operation, adding, by the first electronic device, first photo information to a first shared album of the first electronic device, wherein the first shared album comprises photo information added by the first electronic device;

after the first electronic device initiates synchronization with the second electronic device, sending, by the first electronic device to the second electronic device, a first request message for adding the first photo information;

receiving, by the first electronic device from the second electronic device, a first request response message indicating refusal to add the first photo information; and deleting, by the first electronic device, the first photo information from the first shared album.

2. The method according to claim 1, wherein the method further comprises:

after the deleting the first photo information:

synchronizing photo information in a fourth shared album of the second electronic device to the first electronic device, wherein the fourth shared album comprises the photo information in the first shared album, photo information in a second shared album of the second electronic device, and photo information in a third shared album of a third electronic device, and the photo information in the first shared album excludes the first photo information.

3. The method according to claim 2, further comprising:

before the detecting the first operation of the user, when the first electronic device is not synchronizing with the second electronic device, detecting a second operation of the user;

in response to the second operation, adding second photo information to the first shared album;

after the first electronic device initiates second synchronization with the second electronic device, sending, to the second electronic device, a second request message for adding the second photo information;

receiving, from the second electronic device, a second request response message that indicates that the second photo information is successfully added;

when the first electronic device is not synchronizing with the second electronic device, detecting a third operation of the user;

in response to the third operation, adding third photo information to the first shared album that comprises the second photo information;

after the first electronic device initiates third synchronization with the second electronic device, sending, to the second electronic device, a third request message for adding the third photo information; and receiving, from the second electronic device, a third request response message that indicates that the third photo information is successfully added.

4. The method according to claim 3, wherein the first electronic device and the second electronic device are in a blockchain network, wherein a first record corresponding to the second photo information comprises a first identifier, a hash value of a second photo, and content data of the second photo, and wherein a second record corresponding to the third photo information comprises a second identifier, the hash value of the second photo, content data of a third photo, and the first identifier.

5. The method according to claim 3, further comprising:

when the first electronic device is not synchronizing with the second electronic device, detecting a fourth operation of the user;

in response to the fourth operation, deleting the third photo information from the first shared album;

after the first electronic device initiates fourth synchronization with the second electronic device, sending a fourth request message for deleting the third photo information to the second electronic device; and receiving, from the second electronic device, a fourth request response message that indicates that the third photo information is successfully deleted.

6. The method according to claim 1, wherein the photo information added by the first electronic device forms a blockchain.

7. The method according to claim 2, the synchronizing the photo information in the fourth shared album comprising:

locally synchronizing the photo information in the fourth shared album so that the second electronic device ensures sequential growth of a blockchain corresponding to the first shared album.

8. A first electronic device, comprising:

one or more processors; and one or more memories coupled to the one or more processors, the one or more memories storing programming for execution by the one or more processors, the programming including instructions to:

when the first electronic device is not synchronizing with a second electronic device, detect a first operation of a user;

in response to the first operation, add first photo information to a first shared album of the first electronic device, wherein the first shared album comprises photo information added by the first electronic device;

after the first electronic device initiates synchronization with the second electronic device, send, to the second electronic device, a first request message for adding the first photo information;

receive, from the second electronic device, a first request response message indicating refusal to refusing to add the first photo information; and delete the first photo information from the first shared album.

9. The first electronic device according to claim 8, the programming further including instructions to:

after deleting the first photo information:

synchronize photo information in a fourth shared album of the second electronic device to the first electronic device, wherein the fourth shared album comprises the photo information in the first shared album, photo information in a second shared album of the second electronic device, and photo information in a third shared album of a third electronic device, and the photo information in the first shared album excludes the first photo information.

10. The first electronic device according to claim 9, the programming further including instructions to:

before detecting the first operation of the user, when the first electronic device is not synchronizing with the second electronic device, detect a second operation of the user;

in response to the second operation, add second photo information to the first shared album;

after the first electronic device initiates second synchronization with the second electronic device, send, to the second electronic device, a second request message for adding the second photo information;

receive, from the second electronic device, a second request response message that indicates that the second photo information is successfully added;

when the first electronic device is not synchronizing with the second electronic device, detect a third operation of the user;

in response to the third operation, add third photo information to the first shared album that comprises the second photo information;

after the first electronic device initiates third synchronization with the second electronic device, send, to the second electronic device, a third request message for adding the third photo information; and receive, from the second electronic device, a third request response message that indicates that the third photo information is successfully added.

11. The first electronic device according to claim 10, wherein the first electronic device and the second electronic device are in a blockchain network, wherein a first record corresponding to the second photo information comprises a first identifier, a hash value of a second photo, and content data of the second photo, and wherein a second record corresponding to the third photo information comprises a second identifier, the hash value of the second photo, content data of a third photo, and the first identifier.

12. The first electronic device according to claim 10, the programming further including instructions to:

when the first electronic device is not synchronizing with the second electronic device, detect a fourth operation of the user;

in response to the fourth operation, delete the third photo information from the first shared album;

after the first electronic device initiates fourth synchronization with the second electronic device, send a fourth request message for deleting the third photo information to the second electronic device; and receive, from the second electronic device, a fourth request response message that indicates that the third photo information is successfully deleted.

13. The first electronic device according to claim 8, wherein the photo information added by the first electronic device forms a blockchain.

14. The first electronic device according to claim 9, the instructions to synchronize the photo information in the fourth shared album comprising:

locally synchronizing the photo information in the fourth shared album so that the second electronic device ensures sequential growth of a blockchain corresponding to the first shared album.

15. A non-transitory computer storage medium, having instructions stored thereon that, when executed by a first electronic device, cause the first electronic device to perform operations, the operations comprising:

when the first electronic device is not synchronizing with a second electronic device, detecting a first operation of a user;

in response to the first operation, adding first photo information to a first shared album of the first electronic device, wherein the first shared album comprises photo information added by the first electronic device;

after the first electronic device initiates synchronization with the second electronic device, sending, to the second electronic device, a first request message for adding the first photo information;

receiving, from the second electronic device, a first request response message indicating refusal to add the first photo information; and deleting the first photo information from the first shared album.

16. The non-transitory computer storage medium according to claim 15, the operations further comprising:

after the deleting the first photo information:

synchronizing photo information in a fourth shared album of the second electronic device to the first electronic device, wherein the fourth shared album comprises the photo information in the first shared album, photo information in a second shared album of the second electronic device, and photo information in a third shared album of a third electronic device, and the photo information in the first shared album excludes the first photo information.

17. The non-transitory computer storage medium according to claim 16, the operations further comprising:

before the detecting the first operation of the user, when the first electronic device is not synchronizing with the second electronic device, detecting a second operation of the user;

in response to the second operation, adding second photo information to the first shared album;

after the first electronic device initiates second synchronization with the second electronic device, sending, to the second electronic device, a second request message for adding the second photo information;

receiving, from the second electronic device, a second request response message that indicates that the second photo information is successfully added;

when the first electronic device is not synchronizing with the second electronic device, detecting a third operation of the user;

in response to the third operation, adding third photo information to the first shared album that comprises the second photo information;

after the first electronic device initiates third synchronization with the second electronic device, sending, to the second electronic device, a third request message for adding the third photo information; and receiving, from the second electronic device, a third request response message that indicates that the third photo information is successfully added.

18. The non-transitory computer storage medium according to claim 17, wherein the first electronic device and the second electronic device are devices in a blockchain network, wherein a first record corresponding to the second photo information comprises a first identifier, a hash value of a second photo, and content data of the second photo, and wherein a second record corresponding to the third photo information comprises a second identifier, the hash value of the second photo, content data of a third photo, and the first identifier.

19. The non-transitory computer storage medium according to claim 17, the operations further comprising:

when the first electronic device is not synchronizing with the second electronic device, detecting a fourth operation of the user;

in response to the fourth operation, deleting the third photo information from the first shared album;

when the first electronic device initiates fourth synchronization with the second electronic device, sending a fourth request message for deleting the third photo information to the second electronic device; and receiving, from the second electronic device, a fourth request response message that indicates that the third photo information is successfully deleted.

20. The non-transitory computer storage medium according to claim 16, the synchronizing the photo information in the fourth shared album comprising:

locally synchronizing the photo information in the fourth shared album so that the second electronic device ensures sequential growth of a blockchain corresponding to the first shared album.

\* \* \* \* \*